United States Patent [19]

Daughton et al.

[11] 4,183,089

[45] Jan. 8, 1980

[54] DATA COMMUNICATIONS SYSTEM FOR A REPRODUCTION MACHINE HAVING A MASTER AND SECONDARY CONTROLLERS

[75] Inventors: John W. Daughton, Perinton, N.Y.; Kenneth Gillett, Redondo Beach; Frank M. Nelson, Sherman Oaks, both of Calif.

[73] Assignee: Xerox Corporation, Stamford, Conn.

[21] Appl. No.: 829,013

[22] Filed: Aug. 30, 1977

[51] Int. Cl.² .................. G06F 3/04; G06F 9/06; G03G 15/00
[52] U.S. Cl. .................. 364/900; 364/104
[58] Field of Search ... 364/900 MS File, 200 MS File, 364/104, 107; 355/14

[56] References Cited

U.S. PATENT DOCUMENTS

| | | | |
|---|---|---|---|
| 3,690,760 | 9/1972 | Banks et al. | 355/14 X |
| 3,876,106 | 4/1975 | Powell et al. | 355/14 X |
| 3,940,210 | 2/1976 | Donohue | 355/14 |
| 4,016,549 | 4/1977 | Hutner | 364/900 |
| 4,054,380 | 10/1977 | Donohue et al. | 355/14 |
| 4,058,850 | 11/1977 | Sheikh | 364/900 |
| 4,062,061 | 12/1977 | Batchelor et al. | 364/900 |

*Primary Examiner*—Melvin B. Chapnick

[57] ABSTRACT

A data communications system for an electrophotographic type reproduction machine or copier. The system includes a programmable master controller with memory and a command byte generator. A plurality of secondary controllers provide input data bytes reflecting the machine status to the master controller and receive command bytes from the master controller for operating the machine components. The secondary controllers are each connected to the master controller such that corresponding data bits of the secondary controller are ORed together to provide simultaneous transmission of input data bytes from the secondary controllers to the master controller while assuring that corresponding bits of the simultaneously transmitted bytes have mutually exclusive data therein.

6 Claims, 71 Drawing Figures

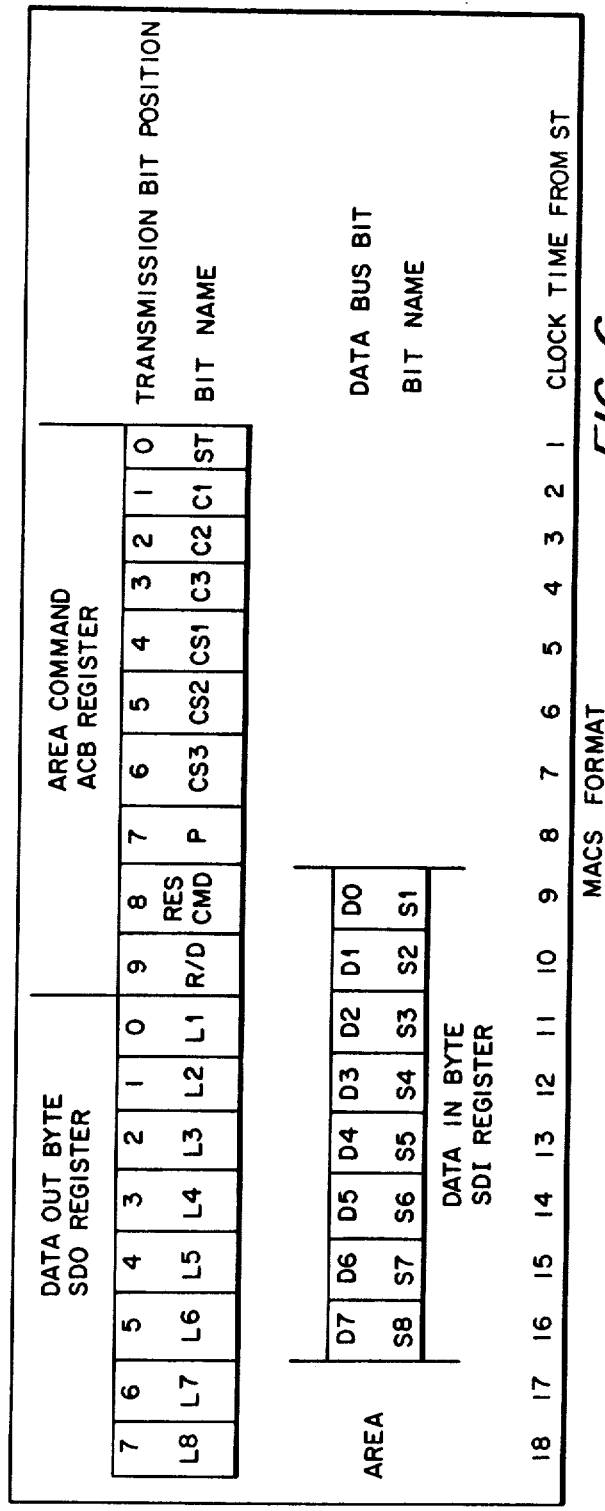
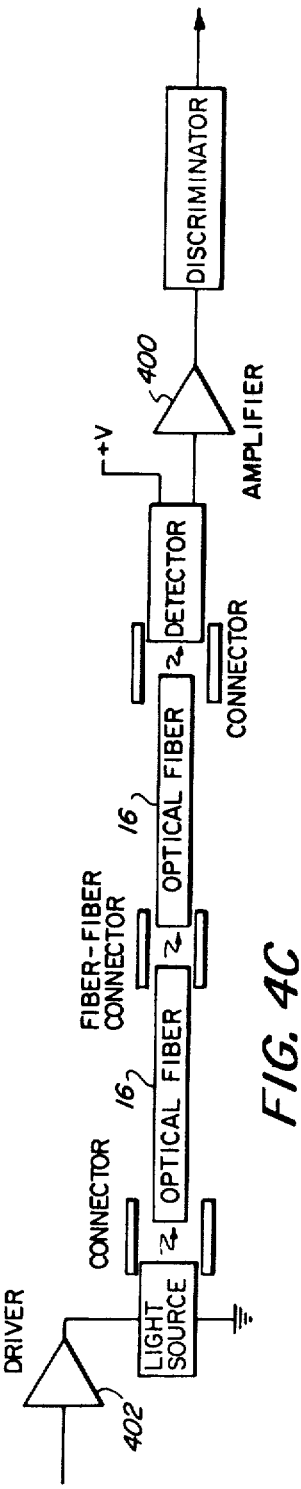
FIG. 6
FIG. 4C

TO FIG. 18B

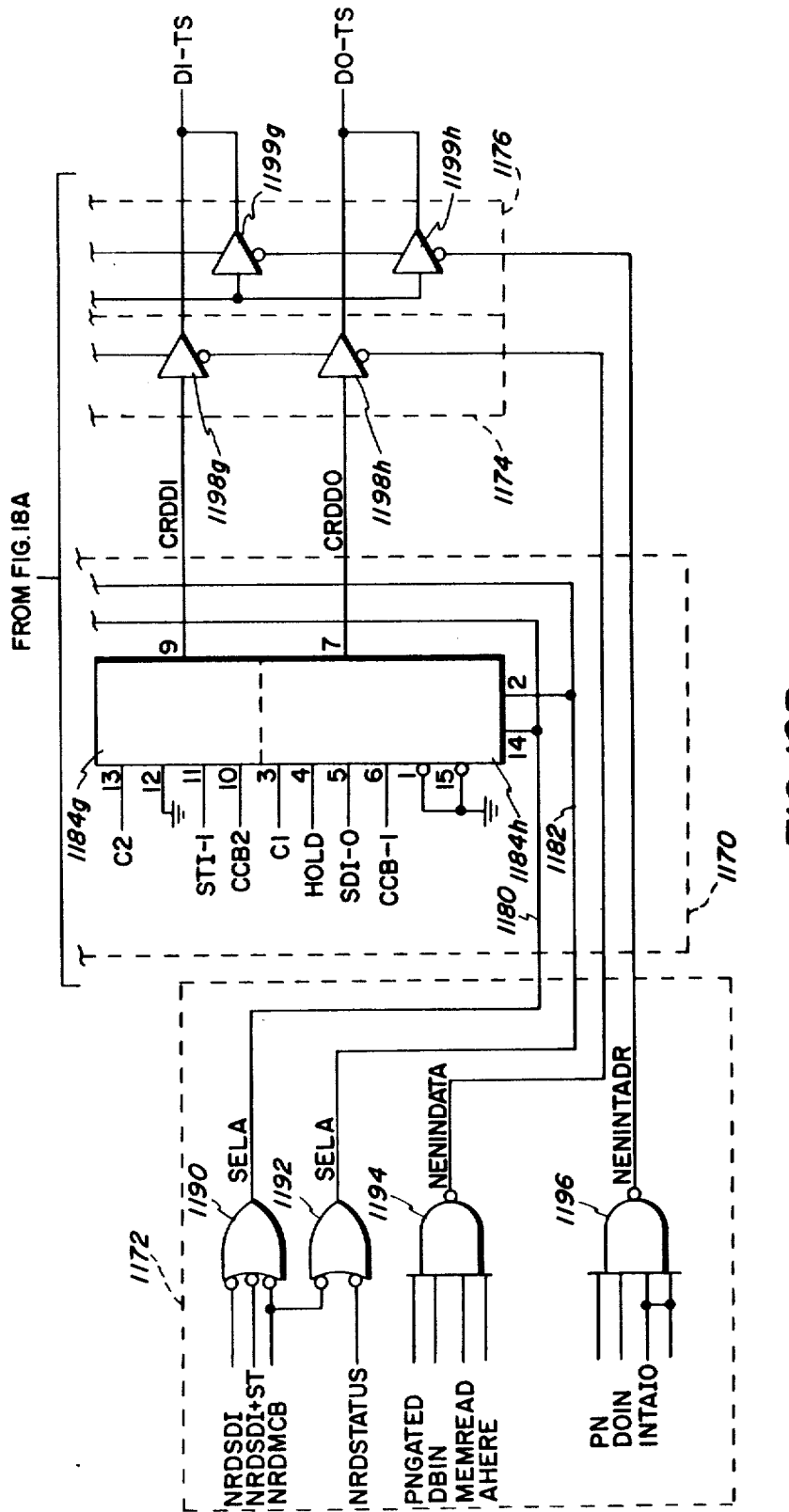

A/D READING RESPONSE DATA
PITCH EVENT FILTERING
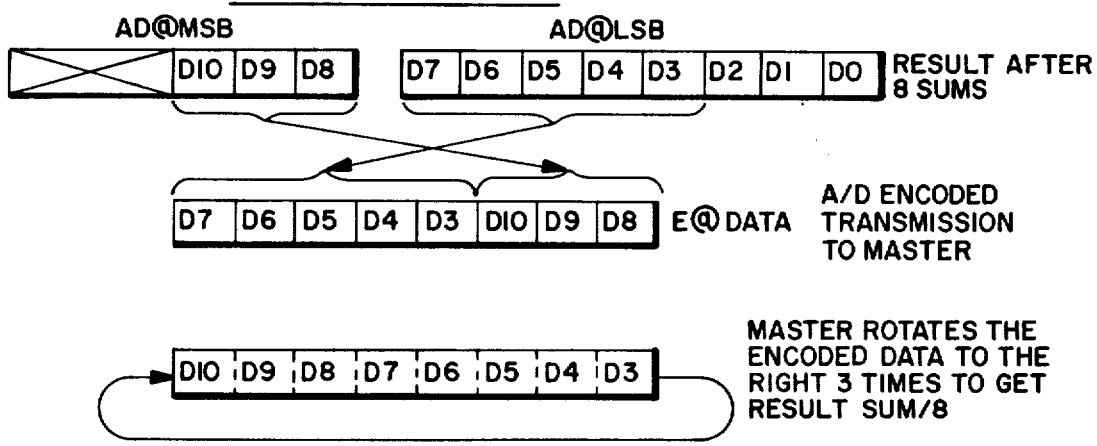
NOISY SIGNAL FILTER
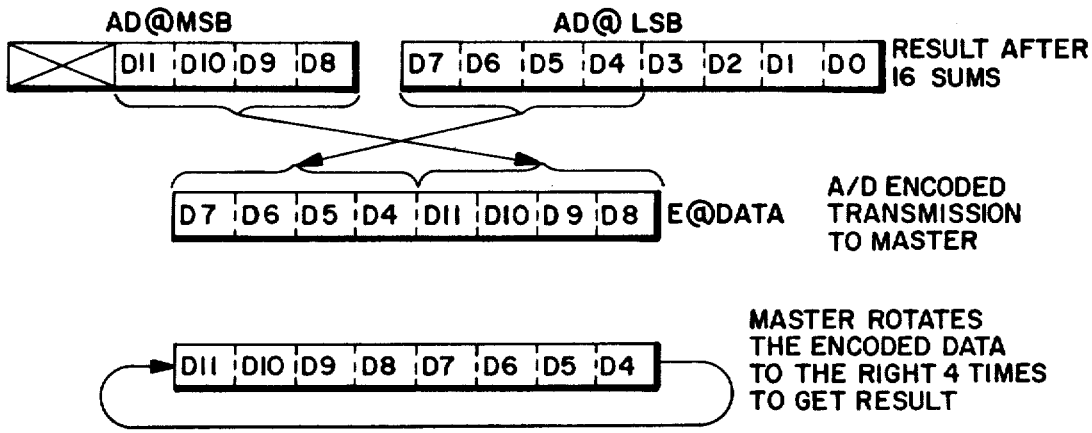
FAST READ AND NEGATIVE PEAK DETECTOR
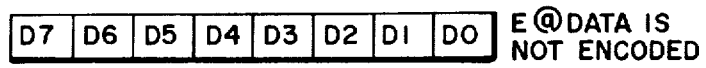
FIG. 57

DATA COMMUNICATIONS SYSTEM FOR A REPRODUCTION MACHINE HAVING A MASTER AND SECONDARY CONTROLLERS

RELATED APPLICATIONS

Ser. No. 829,011 filed Aug. 30, 1977
Ser. No. 829,012 filed Aug. 30, 1977
Ser. No. 829,014 filed Aug. 30, 1977
Ser. No. 829,015 filed Aug. 30, 1977.

TABLE OF CONTENTS

Subject
BACKGROUND OF THE INVENTION
 Field of the Invention
 Description of the Prior Art
SUMMARY OF THE INVENTION
BRIEF DESCRIPTION OF THE DRAWINGS
DETAILED DESCRIPTION OF THE PREFERRED EMBODIMENT
 System Overview
 Machine Description
 Master/Area Communication System
 MACS Optical Link
 MACS I/O Instructions and Operational Overview
 Table 1
 Simultaneous Area Operation
 Status Read and Write Commands
 TABLE 2
 TABLE 3
 TABLE 4
 Master Controller
 Master I/O Interface
 Parity Generator
 Clock Generator
 Shift Controls
 Address Decoder
 Status Input and Output Control
 Interrupt Flip-Flop
 Area I/O Interface
 Area Controller Operation
 Port Structure
 Area Microprocessor and Interface
 Pseudo-Interrupt Operation
 TABLE 5
 TABLE 5A
 Machine Clock Interrupt
 Real Time Interrupt
 Software Description and Organization
 State Checker
 TABLE 6
 Interrupt Handler
 Paper Path Area Controller
 TABLE 7
 RDH/ADF Control Console—Controller 8
 TABLE 8
 RDH/Platen Servos—Controller 10
 TABLE 9
 Master/Servo Software Communications
 TABLE 10
 Phase Lock Loop Control
 Servo Controller Software
 Process Controller 12
 Master/PCR Software Communication
 TABLE 11
 TABLE 12
 PCR Software

BACKGROUND OF THE INVENTION

1. Field of the Invention

The invention is in the field of electrophotographic reproduction machines, and particularly those machines controlled by digital computers.

2. Description of the Prior Art

Electrophotographic copying machines are well known within the prior art and typically employ mechanical or combinations of mechanical and electrical control logic for system control. Such control means is responsible for maintaining synchronism between the various operational stations of the reproduction machine and to ensure proper operation of the machine during the various operating modes. These control devices have become increasingly complex as the level of sophistication has increased within the reproduction machine itself. With the advent of variable magnification machines and color copiers are logical control means necessary to achieve proper synchronization and operation has become increasingly complex and expensive. Consequently, attempts to obtain efficient operation of these machines has developed utilizing digital computing device controllers which are programmed to carry out a sequence of operational tasks. Some of these digital device controls are quite specialized and govern only particular localized tasks or operations of the machine such as disclosed in U.S. Pat. No. 3,876,106. System operation as a whole has also been achieved in the prior art utilizing computers with relatively large CPU and memory storage units. Examples of these prior art devices are disclosed in U.S. Pat. Nos. 3,936,182, 3,914,047 and 3,940,210.

With the advent of larger and more complex photoreproduction machines the various tasks needed to be performed by the machine have become increasingly large. Particularly, an operator may select from a variety of modes of operation, each one designating a particular sequence of operations which must be stored in the computer control means. In some cases the advantages of speed and efficiency of the computer control system has been outweighed by its prohibited cost and large physical dimensions required to store and execute programs defining the desired number and permutations of operational tasks. Still further cost and size restraints come into play when system flexibility is desired by way of expanding the computer control to various other controlled devices or operating stations as would be typical in the offering of a single model copier with various optional attachments. Thus, special purpose hardware may typically be employed as an alternative or addition to the utilization of the central digital computing controller.

Yet another disadvantage of the prior art in computer control devices lies in malfunctioning of the computers due to noise and radio frequency interference resulting primarily from the computer being exposed to the various electrical transients produced by operation of solenoids, motors, relays and the like. Consequently, there exists a need for an ever expanding digital computer capability and at the same time a need to isolate and remove the central controller from the environment of the reproduction machine to achieve error free operation.

SUMMARY OF THE INVENTION

Consequently, it is an object of the invention to eliminate the disadvantages of the prior art by providing an electrophotographic reproduction machine utilizing a distributed microprocessor controller.

Another object of the invention is to provide a reproduction machine having a central or master micro-controlled processor operable in conjunction with an area micro-controlled processor wherein certain system tasks are allocated in the master microprocessor and certain other particular device oriented tasks are allocated to the area microprocessor.

Yet another object of the invention is to provide a micro-controlled photographic reproduction machine utilizing an optical communication link between a central master controller and the various controlled devices so as to achieve an effective error free operation of the master microprogram controller from radio frequency interference generated within the reproduction machine.

Yet another object of the invention is to provide a computer controlled electrophotographic reproduction machine utilizing a single interrupt scheme for enabling simultaneous monitoring of a plurality of control devices in a bit serial communication fashion.

Yet a further object of the invention is to provide a computer controlled photographic reproduction machine wherein a central master controller is interconnected via optical links to at least one passive area controller and at least one active area controller wherein each active controller incorporates a separate microprocessor for controlling specific device tasks, and the passive and active controllers operate together in operative relationship with the master controller to maintain a synchronous control of the entire machine.

The foregoing and other objects of the present invention are attained utilizing a master microprogram controller which is operatively connected to various devices within the operating stations of the photographic reproduction machine and an active microprogrammed controller for controlling a particular device of devices (or portions thereof) such as those devices associated with a particular operating station. The master and active controller are interconnected via an optical link which serves to isolate the master controller from the direct I/O environment. Additional optical links may be provided to interface the master controller with a plurality of passive controllers which serve to latch the output of the master controller to the various controlled devices and serve to forward sensed output data from the operating station to the master controller for processing. The master, passive, and active controllers are all operably connected to one another to control the various devices of the machine.

More generally, the invention provides a reproduction machine having a plurality of operating stations and a plurality of devices for controlling operational tasks within the operating stations. The machine comprises a master programmable controller for controlling some of the devices and an area programmable controller for controlling other of the devices. The master and area controllers are cooperatively operative to control the operating task of the operating stations.

A further object of the invention is to provide a data communications system comprising a programmable master controller having memory storage means and command byte generating means and a plurality of area controllers each having means for receiving command bytes from the master controller and means for providing input data bytes to the master controller. The additional controllers are interconnected to the master controller and have corresponding input data bits of their input data bytes ORed together. The additional controllers simultaneously transmit bytes in response to a predetermined command byte from the master controller and corresponding bits of the simultaneously transmitted bytes have mutually exclusive data therein. The communications system may be utilized in a reproduction machine or more generally for data communications or for control of other types of machines. The simultaneous transmission technique may be utilized to quickly poll a plurality of additional controllers, and the programmable controller may be configured such that the simultaneously received bytes serve to interrupt the master programmable controller in response to the bits received to cause program interrupt jumps to sub-routines servicing the additional controllers.

The invention is additionally directed to a reproduction machine having a plurality of operating stations and a plurality of devices for controlling operational tasks of the operating stations wherein are provided means for sensing various operational parameters associated with said devices, a master controller having an arithmetic and logic control means for controlling the devices in accordance with the sensed operational parameters and a stored operation program and interface means connected in a communication path between the master controller and the devices, the interface means comprising a fiber-optic communication path which isolates the master controller from electrical noise and transients associated with said devices.

The invention is also directed to a copier/duplicator machine having a plurality of devices for controlling different operations within the machine and comprising a programmable controller including program memory storage means, addressing means, arithmetic and logic means, and means for generating data words for controlling some of the machine devices. The machine utilizes a first document exposure station, means for imaging the document along a first optical path, a second document exposure station which is distinct from the first exposure station, means for imaging the document at the second exposure station along a second optical path, and means for imaging the document along both the first and second optical paths onto a receiving means. The first and second optical paths have at least some portions thereof distinct from one another and the optical imaging means is controlled by the programmable controller.

Yet another feature of the invention is directed to a control system for a reproduction machine which comprises a programmable controller having program storage means for storing an operational program controlling at least some portion of the machine, means for sensing analog data from the machine, analog-to-digital conversion means for generating digital data for processing in said controller in accordance with said operational program, digital-to-analog conversion means for converting the process data into analog signals, and means for controlling at least some portion of said machine in response to the analog signals.

BRIEF DESCRIPTION OF THE DRAWINGS

Other objects and advantages of the instant invention will become clear in reference to the following specification taken in conjunction with the drawings wherein:

FIG. 4C shows a fiber optic interconnection link utilized for the communication channels;

FIGS. 5 and 6 illustrate the transmission format for data communicated between the master and area controllers;

FIGS. 14A and 14B are schematic diagrams of further timing and control circuits utilized in the master I/O interface;

FIGS. 18A and 18B are schematic diagrams of the status read register utilized in the master I/O interface;

FIG. 57 illustrates the different filtering techniques utilized in performing the analog-to-digital readings utilizing the process controller.

DETAILED DESCRIPTION OF THE PREFERRED EMBODIMENT

System Overview

Figure 1:
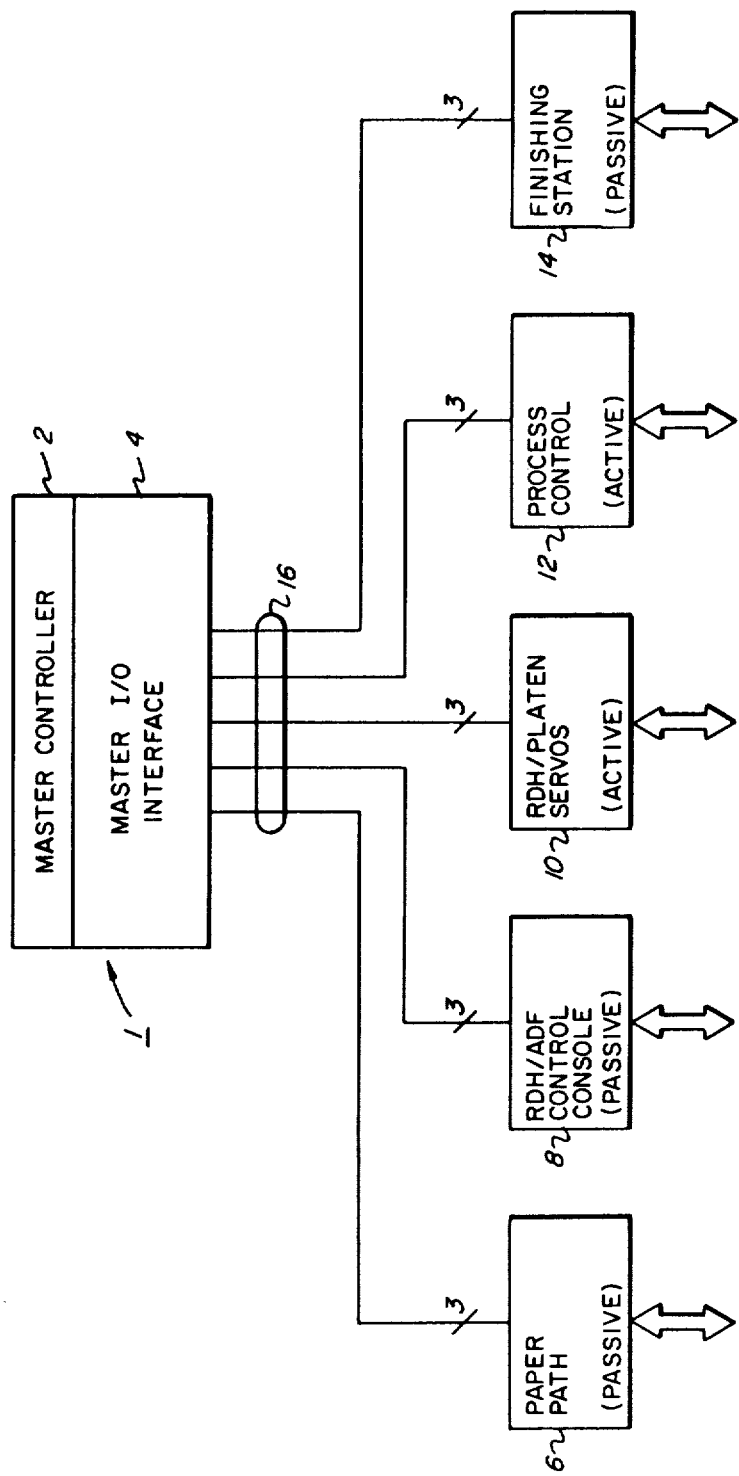
FIG. 1 is a block diagram of the overall master/area communication system.

FIG. 1 is a block diagram of the overall Master/Area Communication System (MACS) utilized in controlling the copier/duplicator in accordance with the instant invention. MACS comprises a master unit 1 including a master controller 2 in combination with a master I/O interface 4. The master controller 2 contains a microprocessor and memory units which govern the various tasks and operational procedures utilized in operating the copier/duplicator. The master I/O interface 4 is responsible for interconnecting the various address and data bytes from the master controller 2 to a plurality of area controllers 6, 8, 10, 12, and 14 which are responsible for specific tasks in the operation of the copier/duplicator. Each area controller 6, 8, 10, 12 14 is dedicated to performing a group of functions which are physically and/or logically related. The area controllers take on two general forms, an active controller which has its own processor control capabilities and a passive controller which has no processing capabilities per se and is simply utilized to latch outputs from the master controller and feed inputs thereto on the command of the master controller. FIG. 1 illustrates five area controllers but it is within the scope of the invention to utilize any number of area controllers consistent with the address capabilities of the master controller. Illustrated in FIG. 1 are three passive area controllers, namely, the paper path controller 6, RDH/ADF control console controller 8 and finishing station controller 14. Two active controllers are illustrated, namely, the RDH/platen servo controller 10 and processor controller 12. The master controller 2 is responsible for the majority of system control processing tasks whereas the area controller are responsible for the machine control functions. Input and output data are transmitted between the master controller 2 and the area controllers 6, 8, 10, 12, 14 in a serial communications path via Master/Area Communication Channels 16 which may take the form of a plurality of fiber optic connections. The utilization of fiber optics interconnection for the MACS transmission channels greatly reduces control susceptibility to electromagnetic interference generated in the machine. Typically, it is desirable to physically position the area controllers in close proximity to the particular device or devices controlled thereby.

Machine Description

Figure 2:
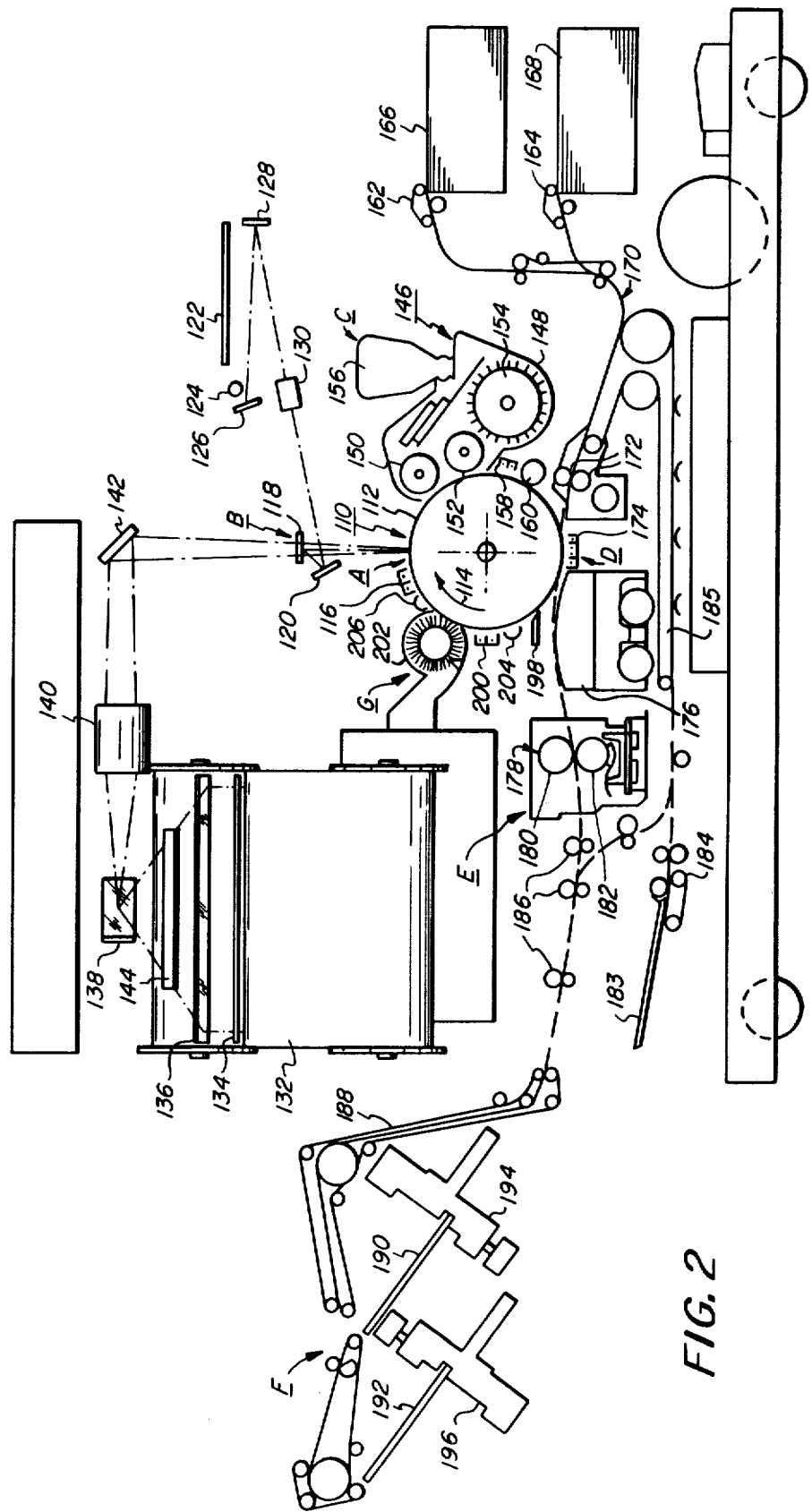
FIG. 2 is a schematic illustration of various mechanical components of the copier/duplicator.

For a general understanding of an electrophotographic printing machine in which the features of the present invention may be incorporated, reference is had to FIG. 2 which depicts schematically the various components thereof. Although the control logic employed in the electrophotographic printing machine of FIG. 2 is particularly well adapted for use therein, it should become evident from the following discussion that it is equally well suited for use in a wide variety of printing machines and is not necessarily limited in its application to the particular embodiment shown herein.

Inasmuch as the practice of electrophotographic printing is well known in the art, the various processing stations for producing a copy of an original document are herein represented schematically. Each processing station will be briefly discussed hereinafter.

As in all electrophotographic systems of the type illustrated, a drum 110 having a photoconductive surface 112 entrained about and secured to the exterior circumferential surface of a conductive substrate is rotated, in the direction of arrow 114, through the various processing stations. One type of suitable photoconductive material is a selenium alloy such as described in U.S. Pat. No. 2,970,906 issued to Bixby in 1961. Preferably, the conductive substrate is aluminum.

Initially drum 110 rotates a portion of photoconductive surface 112 through charging station A. Charging station A employs a corona generating device, indicated generally by the reference numeral 116, to sensitize a portion of photoconductive surface 112. Corona generating device 116 is positioned closely adjacent to photoconductive surface 112. When energized, corona generating device 116 charges the portion of photoconductive surface 112 therebeneath to a relatively high substantially uniform potential. A suitable corona generating device may be of the type described in co-pending application Ser. No. 748,805 filed in December 8, 1976, now U.S. Pat. No. 4,086,650, issued Apr. 25, 1978, the relevant portions thereof being hereby incorporated into the present application. As described therein, the corona generating device includes a corona discharge electrode having a conductive shield located adjacent thereto. The electrode is coated with a relatively thick dielectric material so as to substantially prevent the flow of conductive current therethrough. Photoconductive surface 112 is charged by means of a displacement current of capacitive coupling through the dielectric material. The flow of the charge to photoconductive surface 112 is regulated by means of a D.C. bias applied to the shield.

Thereafter, drum 110 rotates the charged portion of photoconductive surface 112 to exposure station B. Exposure station B is arranged to produce a light image of an original document or series of documents being reproduced. In the electrophotographic printing machine depicted in FIG. 2, exposure station B operates in one of two modes. In one mode, a plurality of original documents are recirculated in an automatic document handling system (ADH) so that sets of collated copies may be formed by the printing machine. In the other mode of operation, a single original document is placed on the platen and reproduced by the printing machine. If the platen scan optics are used, mirrors 118 and 120 are moved into the operative position depicted in FIG. 2. An original document is placed face down upon a transparent platen 122, such as a glass plate or the like. Lamp 124 illuminates the original document disposed on platen 122. Lamp 124 moves across the original document disposed on platen 122 to illuminate incremental portions thereof. The light rays transmitted from the original document are reflected by full rate mirror 126 to half rate mirror 128. Half rate mirror 128 reflects the light rays through lens 130 onto mirrors 118 and 120. These mirrors reflect the light image of the original document onto the charged portion of photoconductive surface 112. Drum 110 rotates in synchronism with the movement of the platen scanning optics. Thus, the charged portion of photoconductive surface 112 is irradiated to record an electrostatic latent image thereon corresponding to the information areas of the original document disposed to the informational areas of the original document disposed on platen 122.

In the automatic document handling system for making pre-collated copy sets, the repeated collated imaging of a set of original documents is obtained by placing and retaining the original documents on an elongated windable document holding web 132. This web is wound between two spaced web scrolls positioned and wound so as to obtain the document between the turns of the web scrolls. The web is repeatedly wound and unwound from one scroll to the other scroll (recirculated) to repeatedly expose individual documents thereon in an exposed portion of the web extending between the scrolls. The documents are optically exposed on the web between scrolls for copying. The details of the automatic document handling system are more fully disclosed in U.S. Pat. No. 4,008,956 issued to Stemmle et al in 1977, the relevant portions thereof being hereby incorporated into the present application. During the forward movement of web 132, a lamp (not shown) illuminates the original documents disposed thereon. Mirror 134 reflects the light rays toward stationary mirror 136 which, in turn, reflects the light rays toward rotatable mirror 138. Rotatable mirror 138 transmits the light rays through lens 140. The light image transmitted through lens 140 is reflected by mirror 142 onto the charged portion of photoconductive surface 112. In the ADH mode of operation, mirrors 118 and 120 are positioned remotely from the optical light path.

In the reverse scan mode, i.e. web 132 advances in the opposite direction to the forward movement, mirror 134 rotates 90° about its axis and reflects the light rays transmitted from the original document onto mirror 144. Mirror 138 also rotates 90° about its axis to receive the light rays transmitted from light rays 144. Thus, mirror 138 directs the light rays received from mirror 144 through lens 140. Once again, the light image transmitted through lens 140 is reflected by mirror 142 onto the charged portion of photoconductive surface 112. At this time, mirrors 118 and 120 are positioned remotely from the optical light. The foregoing optical system for the ADH system is disclosed in U.S. Pat. No. 4,008,958 issued to Kingsland in 1977, the relevant portions thereof incorporated hereby into the present application. Thus, in either mode or operation, an electrostatic latent image is recorded on photoconductive surface 112.

As drum 110 continues to rotate in the direction of arrow 114, the electrostatic latent image recorded thereon is advanced to development station C. Development station C includes a developer unit 146 having a housing 148 with a supply of developer mix contained therein. The developer mix comprises carrier granules having toner particles adhering triboelectrically thereto. Preferably, the carrier granules are formed from a magnetic material with the toner particles being made from a heat settable plastic. Developer unit 146 preferably is a magnetic brush development system. In a system of this type, the developer mix is brought through a directional flux field to form a brush thereof. As depicted in FIG. 2, developer unit 146 includes a pair of developer rollers 150 and 152. Each developer roller includes a stationary magnetic member having a non-magnetic, rotatable tubular member interfit telescopically thereover. The tubular member is rotated to advance the developer material into contact with the electrostatic latent image recorded on photoconductive surface 112. The developer material is advanced to developer roller 150 and 152 by paddle wheel 154 disposed in the sump of housing 148. Developer rollers 150 and 152 advance the developer mix into contact with the electrostatic latent image and the toner particles are attracted electrostatically thereto forming a toner powder image on photoconductive surface 112. As successive electrostatic latent images are developed, the toner particles within the developer mix are depleted. Additional toner particles are stored in toner cartridge 156. A sample electrostatic latent image is recorded on photoconductive surface 112 and developed. The density of the toner particles adhering thereto is detected via an ADC sensor 157 (not shown) and compared to a reference density. The error signal developed thereby controls the dispensing of toner particles from cartridge 156. In this manner, the concentration of toner particles within the developer mix is maintained substantially constant. Developer rollers 150 and 152 are electrically biased to a suitable voltage. This voltage is adjustable and depends upon the original document as well as the duration of time that the printing machine is activated. After the toner powder image has been developed on photoconductive surface 112, corona generating device 158 applies a charge thereto so as to pre-condition toner powder image for transfer. Preferably, corona generating device 158 is also of the type described in copending patent application Ser. No. 748,805 filed in 1976, the relevant portions thereof being hereby incorporated into the present application.

Ideally, carrier granules remain in housing 148 of developer unit 146. However, inasmuch as the sealing arrangement is imperfect, carrier granules may adhere to photoconductive surface 112 of drum 110. A scavenging roller 160 is provided for removing these carrier granules. Scavenging roller 160 comprises a magnetic member and a rotatable, non-magnetic tubular member interfit telescopically thereover. The tubular member rotates relative to the magnetic member. In this manner, the magnetic carrier granules are attracted from photoconductive surface 112, while the toner powder images remain undisturbed thereon.

With continued reference to FIG. 2, a sheet of support material is advanced by sheet feeding apparatus 162 or 164 from either tray 166 or tray 168. Conveyor system 170 advances the sheet of support material to transfer station D. Rollers 172 speed up or slow down the advancing sheet of support material so as to ensure that it moves into contact with drum 110 in a timed sequence so that the toner powder image developed thereon contacts the advancing sheet of support material at transfer station D.

Transfer station D includes a corona generating device 174 which charges the backside of the sheet of support material to a level sufficient to attract the toner powder image from photoconductive surface 112. Preferably, corona generating device 174 is also of a type described in copending U.S. patent application Ser. No. 748,805 filed in 1976, the relevant portions thereof being hereby incorporated into the present application.

After transfer of the toner powder image to the sheet of support material, a vacuum stripping system 176 separates the sheet from photoconductive surface 112 and advances it to fusing station E. If vacuum stripper 176 fails to separate the sheet from photoconductive surface 112, a redundant mechanical finger, i.e. stripper finger 198 activated by solenoid 199 (not shown), is provided to ensure separation of the sheet therefrom.

Fusing station E includes a fuser assembly, indicated generally by the reference numeral 178. Fuser assembly 178 fuses the transferred toner powder image to the sheet of support material. A suitable fuser comprises a heated fuser roll 180 and a resilient backup roll 182 in contact therewith. In this manner, the sheet of support material advances between fuser roller 180 and backup roller 182 with the toner powder image contacting fuser roller 180. Preferably, fusing assembly 178 is of a type described in U.S. Pat. No. 3,912,901 issued to Strella et al in 1975.

After the toner powder image is permanently affixed to the sheet of support material at fusing station E, a series of rollers advance the copy sheet either to finishing station F or to duplex tray 183. When duplex copies are being reproduced, the sheet of support material with the toner powder image permanently affixed on one side thereof is advanced to duplex tray 183. In the ADH mode of operation, a plurality of sheets are stored in duplex tray 183 having the corresponding toner powder images permanently affixed to one surface thereof. After web 132 with the original documents thereon has advanced through one pass, the odd numbered sheets are copied. During the next forward scan, the even numbered sheets are copied and the information contained therein placed on the reverse side of the copy sheet. This sequence may be reversed. Tray 183 is arranged to hold a plurality of sets of copies therein. Each sheet of support material having the toner powder image permanently affixed to one surface thereof is advanced from tray 183 by sheet feeding apparatus 184 onto duplex conveyor 185. Duplex conveyor 185 advances the copy sheet to conveyor system 170 where the sheet once again is advanced to transfer station D so as to receive the toner powder image corresponding to the second side thereof. Once again, the reverse side of the copy sheet passes through transfer station D and fusing station E. However, at this time the copy sheet is advanced to finishing station F. This duplexing arrangement is described more fully in copending application Ser. No. 767,012 filed in Feb. 9, 1977, the relevant portions thereof being hereby incorporated into the present application.

After the toner powder image has been permanently fused to the copy sheet, either the duplex or simplex copy sheets are advanced by a series of rollers 186 to finishing conveyors 188. Finishing conveyors 188 advance the copy sheets to trays 190 or 192. The sheets are stacked in one tray, e.g. tray 190 with the odd sides up and the even sides face down, while in the other tray, e.g. tray 192 with the even sides up and the odd sides down. This orientation is required because of the forward and reverse movements of web 132. After the requisite number of copies have been stacked in the appropriate tray, i.e. sufficient copies to define a collated set thereof, staplers 194 and/or 196 are actuated to permanently secure the sheets to one another. In this manner, sets of collated copies are stored in trays 190 and 192 with each set having the copies thereof stapled to one another.

Invariably, after the sheet of support material is separated from photoconductive surface 112, some residual toner particles remain adhering thereto. These residual toner particles are removed from photoconductive surface 112 at cleaning station G.

Initially, discharge lamp 204 floods photoconductive surface 112 to assist in the dissipation of any electrostatic charge remaining thereon prior to the cleaning thereof. Residual toner particles are then brought under the influence of a corona generating device 200 adapted to neutralize the remaining electrostatic charge on photoconductive surface 112 and that of the residual toner particles. Preferably, corona generating device 200 is of a type described in copending U.S. application Ser. No. 748,805 filed in 1976, the relevant portions thereof being hereby incorporated into the present application. The neutralized toner particles are cleaned from photoconductive surface 112 by a rotatably mounted fibrous brush 202 in contact therewith. In addition, subsequent to cleaning, a discharge lamp 206 illuminates photoconductive surface 112 to dissipate any residual electrostatic charge remaining thereon prior to the charging thereof for the next successive imaging cycle.

It is believed that the foregoing description is sufficient for purposes of the present application to illustrate the general operation of an electrophotographic printing machine. Referring now to the specific subject matter of the present invention, FIGS. 3 through 27 describe the control system for the electrophotographic printing machine of FIG. 2 in greater detail.

Master/Area Communication System

Figure 3:
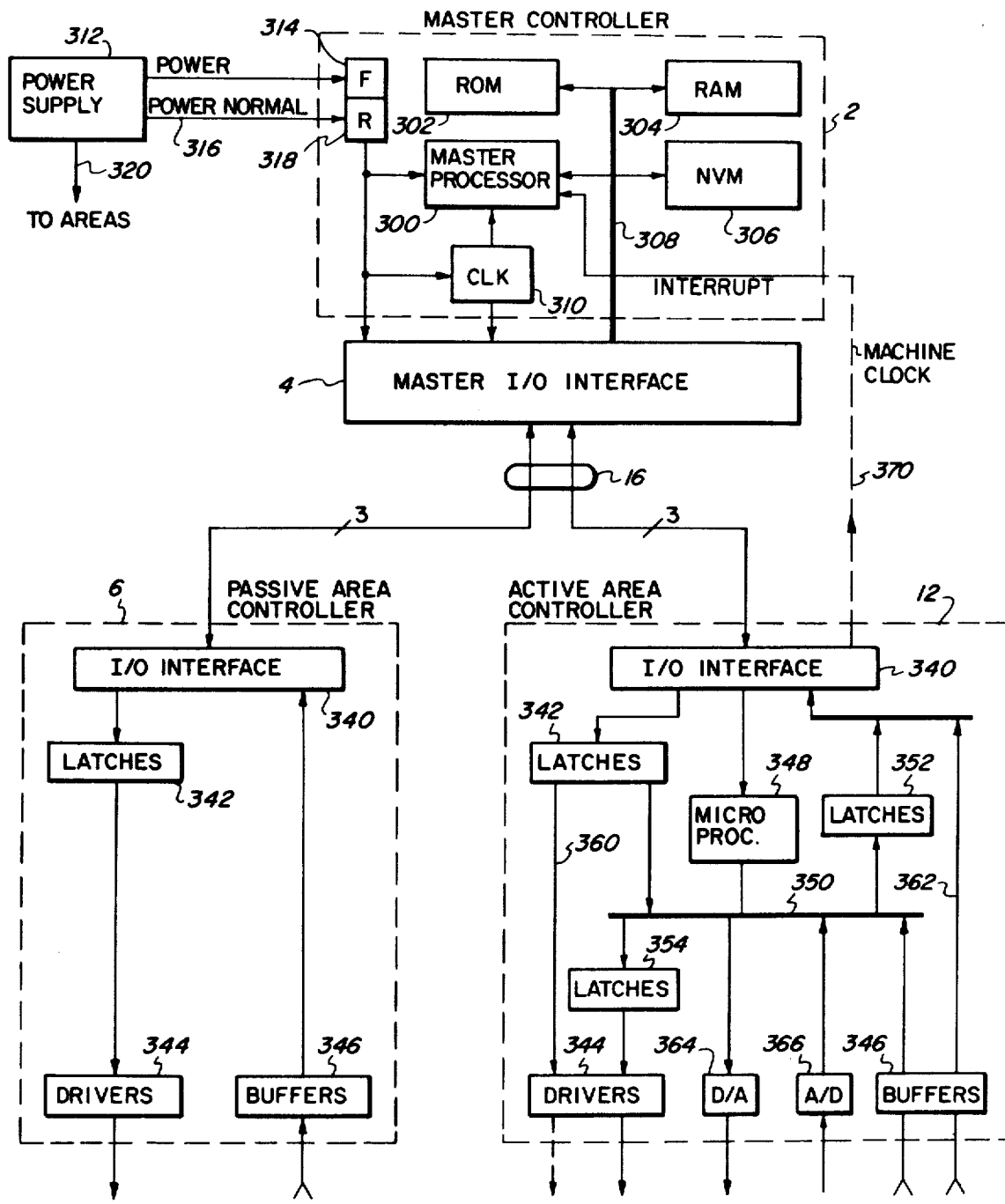
FIG. 3 is a block diagram showing the major components of the master unit and an active and passive area controller.

FIG. 3 illustrates a more detailed block diagram of the master controller and the active and passive area controllers of FIG. 1. For simplicity of illustration only one passive area controller such as the paper path controller 6 and a single active controller such as the process control controller 12 is illustrated. The master controller 2 comprises a central processing unit and system controller identified as a master microprocessor 300. A number of existing microprocessor systems may be utilized to practice the present invention and the detailed description herein utilizes the INTEL 8080A-2 CPU and INTEL 8238 System Controller. The master microprocessor 300 is shown connected to memory units utilized to store program memory and for temporary storage of various control and sense parameters. The memory units comprise a read only memory (ROM) 302, a random access memory (RAM) 304 and a non-volatile memory (NVM) 306. The ROM memory may be for example a 48KB (bytes) mask programmable ROM, while the RAM may comprise a 2KB (byte) static MOS scratch pad memory and a 1 KB (bit) flag storage MOS RAM (bit D7 of RAM). The ROM may be fabricated, for example, using 2K×8 ROM chips model No. 8316A, and the RAM memory may be implemented using 1K×1 chips, model No. 2102. The NVM may be fabricated using 512×1 RAM chips model No. 52222 (American Microsystems Inc.). Equivalent chips may of course be utilized as for example the NVM may be fabricated from 256×4 chips (model No. 5101L) if desired. The memory units are interconnected to the master microprocessor 300 by means of a tri-state master system bus 308 which is also interconnected to the master I/O interface 4. The tri-state master system bus comprises eight data lines D0-TS through D7-TS, sixteen address lines A0-TS through A15-TS and a number of control and clock lines. The master microprocessor 300 is supplied with clock signals from the clock source 310 (INTEL clock generator 8224 for example) and is powered by an external power supply 312. Power for the various circuits in the master controller 2 as well as the master I/O interface 4 is first filtered by means of a filter circuit 314. A power normal signal is also fed to the master controller along line 316 from the power supply to indicate that power is up to normal operating levels. A reset signal from reset circuitry 318 is utilized to reset the various registers throughout the master controller and master I/O interface during a power up or initialization sequence. The power supply 312 also supplies power to the various remote controllers by means of lines 320.

A more detailed description of the master controller 2 may be found in copending application Ser. No. 758,117, filed Jan. 10, 1977, entitled Direct Memory Access for Refresh of a Programmably Controlled Machine, assigned to Xerox Corporation.

The passive area controller exemplified by the paper path controller 6 comprises an area I/O interface circuit 340, latches 342 and drivers 344 which provide outputs to one or a plurality of machine controlled devices. Sense data is supplied from various sensing means to represent the current device operational state whose function is governed by the particular passive controller of interest. The sensed data is fed to buffers 346 and subsequently to the area I/O interface 340 for transmission along the master area communication channel 16 to the master unit 2. The active area controllers are similar in function to the passive area controllers and likewise contain an area I/O interface 340, latches 342 and drivers 344. Sensed data may be provided to the master unit 2 through buffers 346, the I/O interface 340 and the communication channel 16. Additionally, however, the active area controller contains an area microprocessor/interface 348 which is separate and distinct from the master microprocessor 300. Shown in FIG. 3 the area microprocessor/interface 348 is connected by means of an area system bus 350 to a plurality of latches 354 which feed drivers 344 to control various machine parameters. The area microprocessor/interface 348 may additionally provide input information to latches 352 for subsequent feeding to the master unit 2 via the area I/O interface 340. The area microprocessor/interface 348 may also be utilized to control analog data to various machine devices and to sense analog data from various machine sensing means utilizing D/A converters 364 and A/D converter 366 respectively. Data which is not controlled by the area microprocessor/interface 348 may be fed to and from the master unit 2 by means of the direct paths 360 and 362 as illustrated in FIG. 3.

The servo control area controller 10 is similar to the process controller 12 and supplies a machine clock signal to the master unit 2 along channel 370 (see dotted line in FIG. 3). This signal is derived from the photoreceptor drum of the copier/duplicator and is passed along a fiber optic link of channel 370 to provide an interrupt signal to the master microprocessor 300. The machine clock signal thus enables a synchronization of the master microprocessor 300 to the actual copier/duplicator machines operation.

The Master Area Communication System utilizes a set of bi-directional communication channels 16 which independently couple each area controller 6, 8, 10, 12, 14 to the master unit 1. Each channel 16 comprises three groups of signal lines, namely, data-in, data-out and clock. The data-in and data-out lines are defined relative to the master controller and in the description set forth herein this terminology has been maintained throughout even in relation to data in area controllers 6, 8, 10, 12, 14. Data transfers between the master and area controllers is in bit serial form in eight bit increments (bytes). An I/O transaction may be an input only transaction or a combined input/output transaction as specified by an initiating command byte from the master unit 1. All transmissions are in synchronism with and at the same rate as the 1.25 MHz clock signal from the master unit 1. All MACS communication is initiated by and under control of the master unit 2. Communication is always between the master unit 1 and the area controllers and communication never takes place directly between the area controllers.

Figure 4A:
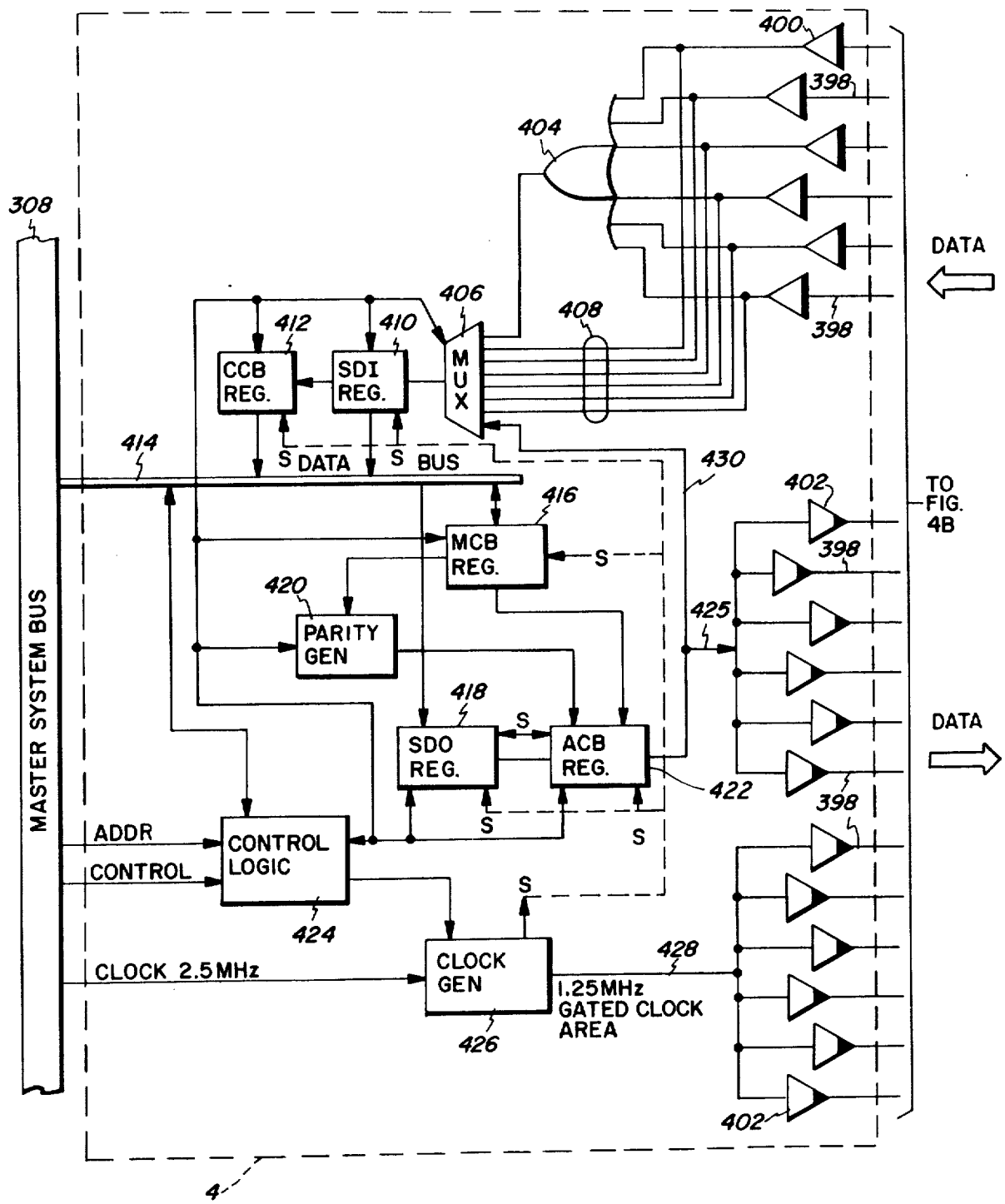
FIGS. 4A and 4B illustrate the master I/O interface and its input and output lines for interconnection to an area controller.
Figure 4B:
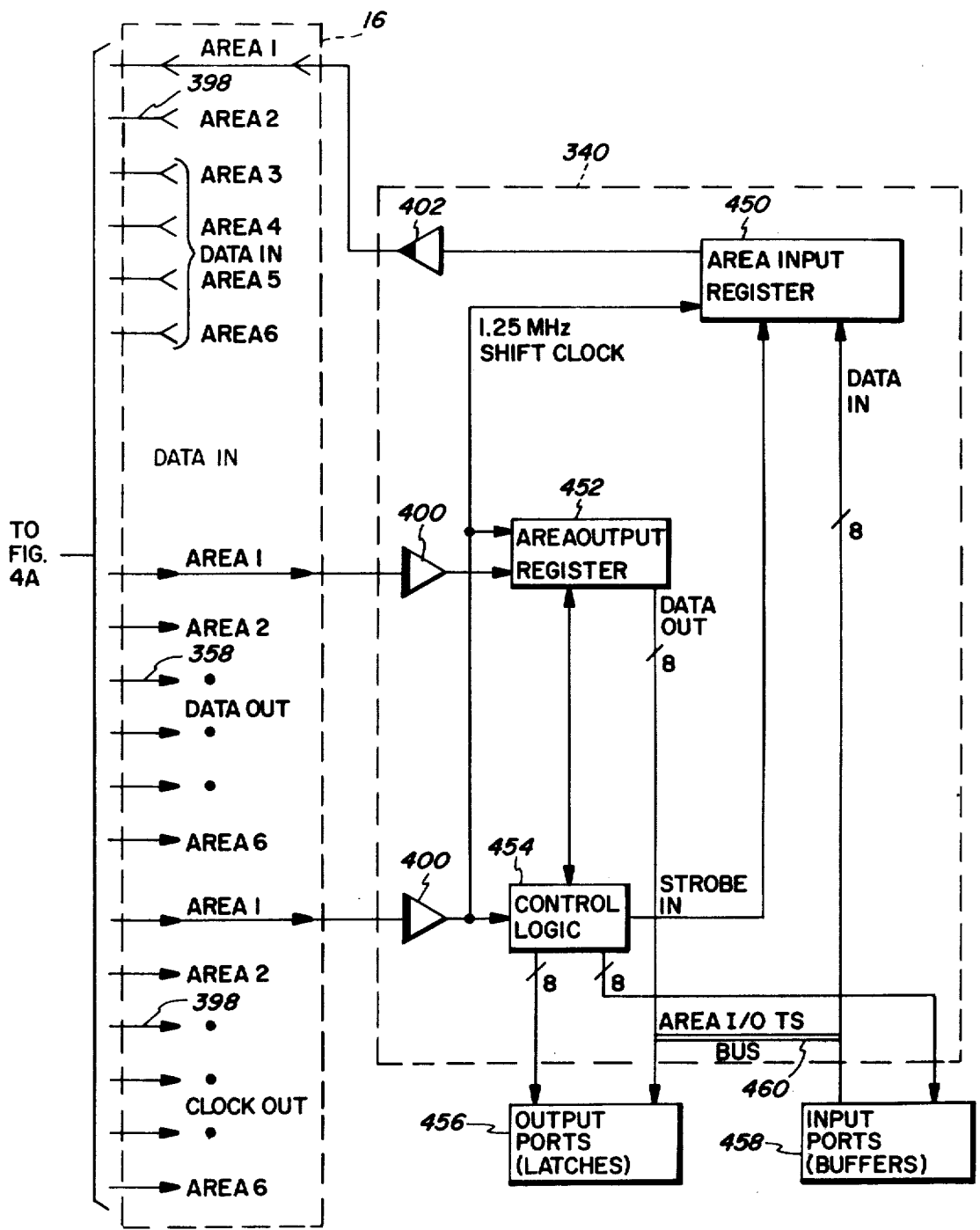

FIG. 4 is an expanded block diagram of the master I/O interface 4, the communication channels 16 and their interconnection with the various area I/O interfaces 340. The data bus 414 forms part of the master system bus 308. For ease of illustration, only one such area I/O interface 340 is drawn although similar components are utilized for all area controllers.

FIG. 4 illustrates input data lines and output data lines for as many as six different area controllers. One fiber optic interconnecting link 398 is provided for input data between each of the area controllers and the master I/O interface 4. Data from the area controllers (input data) is fed to receiver amplifiers 400 interconnected to each of the fiber optic links 398. The received data is "ORed" by means of OR gate 404 and fed as an input to multiplexer 406. In normal operation the data is only received from a particular area controller in response to a command from the master unit and consequently only one area controller will be active in transmitting data at any one time. (An exception to this rule exists in the simultaneous transmit and receive mode which will be explained more fully below). Individual data lines 408 from each of the data-in lines of the area controllers are also fed to multiplexer 406 where they may be selected for particular test modes to isolate faults in a particular area controller. Data received from the OR gate 404 is passed through the receiving mux 406 and fed to a Serial Data Input (SDI) register 410 which in turn feeds the data to a Command Check Byte (CCB) register 412. The SDI and CCB registers provide the input data in parallel form to a master data bus 414 which forms the eight data lines D0-TS through D7-TS of the master system bus 308.

Output address words from the master controller 2 are provided along the master data bus 414 to a Master Command Byte (MCB) register 416. Output data is provided from the data bus 414 directly to a Serial Data Out (SDO) register 418. The MCB register 416 is utilized together with a parity generator 420 to load an Area Command Byte (ACB) register 422. ACB register 422 is ten (10) bits long and holds an area command address word whereas the SDO register 418 is an eight (8) bit register storing the Data Out Byte. Together, these registers provide a serial output data stream of eighteen (18) bits to each of the area controllers via the fiber optic interconnecting links 16. The ACB register 422 effectively provides an addressing means to select a particular area controller and to select a particular group of input or output data lines within the selected area controller. The SDO register 418 provides the actual data to be transmitted to the designated area and output lines (ports). The gating of the various input registers (SDI register 410, and CCB register 412) and output registers (ACB register 422 and SDO register 418) as well as the MCB register 416 are controlled by a control logic circuit 424. The control logic circuit 424 receives address lines A0-TS through A18-TS as well as a plurality of control lines from the master system bus 308 to effectively decode and control the data on the master data bus 414. Shifting of the registers is synchronized with a 1.25 MHz clock signal from clock generator 426 which provides a 1.25 MHz clock signal to each of the area controllers. These clock signals are fed along line 428 to drivers 402 for transmission via fiber optic links 398 to the area controllers.

Output data from ACB register 422 and SDO register 418 is likewise shifted at the 1.25 MHz rate to a master data out line 425 and subsequently to drivers 402 and fiber optic links 398. Output data is also fed via a turnaround test line 430 to multiplexer 406 to optionally provide input data to the CCB register 412 and SDI register 410 in a master test mode of operation.

The control logic 424 decodes the address bits on the master system bus 308 address lines to determine if the address decode corresponds to the master I/O interface 4 so that the input and output registers may be appropriately gated.

The area I/O interface 340 comprises area input register 450, area output register 452 and control logic 454. The control logic 454 decodes the address received from the ACB register 422 of the master I/O interface 4 and selects particular groups of the input and output lines for providing or receiving data respectively. Each area controller is provided with a plurality of output ports 456 and input ports 458. In the preferred embodiment there are eight input ports and eight output ports wherein each port may contain as many as eight separate lines. Consequently, there may be sixty-four separate input signals and sixty-four separate output signals to and from any given area controller. More specifically in terms of the detailed implementation of the control logic, input and output ports may be defined in terms of buffers and latches. Output data bytes are stored in output ports or latches either for direct use by the machine or for use by other circuits in the area controller such as the area microprocessor/interface 348 (FIG. 3). Input data bytes selected for transmittal to the master unit 2 are routed through buffers or input ports. Data is fed to the input ports directly from the host machine. In the case of data from the area microprocessor sent to the master unit 1, the data is fed to latches which are used as input ports.

The particular I/O interface 340 shown in FIG. 3 is common to both active and passive area controllers. The additional circuitry utilized in the active controllers is described in detail in relation to the more detailed implementation set forth hereafter.

MACS Optical Link

The master/area communication channel 16 may comprise data channels implemented by simple wire conductors or, alternately, by fiber optic links as illustrated in FIG. 4C. The fiber optic apparatus shown in FIG. 4C is common to both the clock and data lines, and a separate driver and receiver circuit are utilized for each channel 16. The light source is typically an LED and the received data from amplifier 400 is passed through a discriminator to produce two level logic signals.

MACS I/O Instructions and Operational Overview

Preparatory to all serial communications over MACS, the master microprocessor 300 first generates a Master Command Byte into the MCB register 416 via the master system bus 308 and particularly the master data bus 414 forming part thereof. The Master Command Byte is effectively a ten (10) bit area command address word which specifies which of the six possible area controllers is to participate in the MACS communication. Actual data transfer of the data in the SDO register 418 follows immediately the transfer of the Master Command Byte. The command information specifies both the type of transfer, such as input (read) or input/output (duplex transmission) as well as the specific group of eight bits to be sensed (input operation) or to be sensed and set (duplex operation). The contents of the MCB register 416 are uneffected by the transmission of the Area Command Byte inasmuch as the contents of the MCB register 416 are shifted into the ACB register 422 and then serially shifted from the ACB register 422 to all of the area controllers. The MCB register 416 can only be altered by a subsequent MCB write operation directed by the master microprocessor 300.

In relation to FIGS. 3 and 4, the master microprocessor 300 initiates and controls communication over MACS through the master I/O interface 4 via the master system bus 308. Both control and data transfers are performed through execution by the master microprocessor 300 of a sequence of memory reference instructions to specific, dedicated addresses. These addresses are decoded directly off of the master system bus 308 and interpreted by the master I/O interface 4 to cause a desired I/O operation to occur.

Two memory addresses are dedicated for writing into the MCB register 416 by the master microprocessor 300. The "LOAD MCB" instruction is utilized to load the MCB register with a Master Command Byte in preparation for an I/O transmission. This instruction is utilized together with a subsequent write operation namely, the "LOAD SDO AND START TRANSMISSION" instruction which loads the output data byte from memory (via the master data bus 414) into the SDO register 418. Additionally, the "LOAD SDO AND START TRANSMISSION" instruction constructs and loads the Area Command Byte into the ACB register 422 from the MCB register 416. One bit of the ACB register is set by the parity generator 420 and a second bit of the ACB register is set by a command signal indicating a duplex or read only transmission, the R/D bit. Finally, the "LOAD SDO AND START TRANSMISSION" instruction is effective to start the actual MACS transmission. The Area Command Byte residing in the ACB register 422 is transmitted first followed by the Data Out Byte residing in the SDO register 418.

A second dedicated memory address is utilized for writing into the MCB register. This alternate address is utilized in executing the "LOAD MCB AND START TRANSMISSION" and is effective to load a Master Command Byte from memory (master data bus 414) into the MCB register 416. Additionally, this instruction constructs and loads the Area Command Byte into the ACB register 422 appropriately setting the read/duplex bit and the parity bit. Finally, the instruction is utilized to start the actual MACS transmission. "LOAD MCB AND START TRANSMISSION" consequently eliminates time delays associated with loading the SDO register 418 when initiating input only MACS transmissions (R/D bit equals zero).

The start of a MACS transmission for both the input only or combined input/output (duplex) operation causes the broadcast of the serial bit stream from the least significant bit position of the ACB register 422 simultaneously to all area controllers. Each area output register 452 of the area controllers simultaneously receives the transmitted Area Command Byte from the ACB register 422 followed by the Data Out Byte transferred from the SDO register 418. The Data Out Byte is serially shifted through the ACB register 422.

Figure 5:
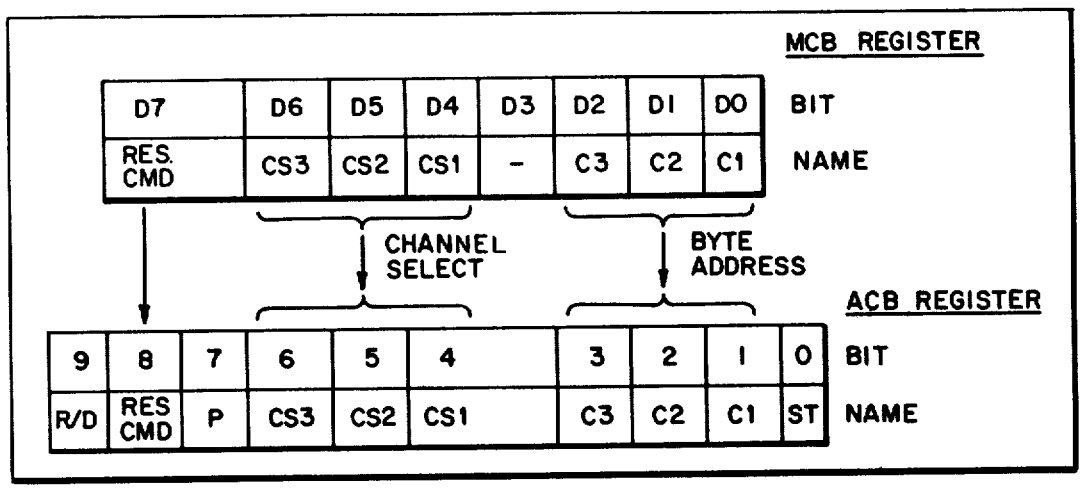

The transmission format for data in the various registers is illustrated in FIGS. 5 and 6. With reference to FIG. 5, the data bits D0-D7 from the master data bus 414 are parallel loaded into the master command bit register 416 during a "LOAD MCB" instruction for example. Bits D0-D2 are termed the Byte Address bits C1-C3 and are utilized to select a group of eight input (sensed) lines as well as a group of eight output signals from a designated input and output port of a designated area controller. The designation of the area controller is made by means of Channel Select bits, CS1-CS3 which correspond to bits D4-D6 respectively from the data bus. Data bits D3 and D7 are not utilized in the MCB register 416 although bit D7 is available as a reserve command bit for special use if desired.

In a typical transmission operation the contents of the MCB register 416 are parallel loaded into the ACB register 422 (with the exception of bit D3). As shown in FIG. 5, Byte Address bits C1-C3 are loaded into bits 1-3 of the ACB register 422, and the Channel Select bits CS1-CS3 are loaded into bits 4-6 of the ACB register 422. The 0th bit of the ACB register 422 is loaded with a "one" bit to indicate a Start of Transmission (ST). Bit 7 of the ACB register 422 is loaded by the parity generator 420 to provide either an even or odd parity over the preceding ACB bits 0-6. Bit 8 of the ACB register 422 is loaded from the reserve command bit D7 of the MCB register 416 whereas bit 9 of the ACB register is loaded with a "R/D" bit indicative of a read only (R) operation or a duplex (D) input/output operation as dictated by the type of instruction being executed by the master microprocessor 300. Consequently, the ACB register 422 contains the necessary byte and channel selection bits supplied by the MCB register and the Area Command Byte is transmitted prior to the actual Data Out Byte from the SDO register 418.

The terminology "Area Command Byte" is utilized to refer to all of the bits in the ACB register 422 even though the register is ten bits long. Typically, however, a byte is eight bits long and in particular, the Data Out Byte is composed of the eight bits L1-L8 stored in the SDO register 418 as shown in FIG. 6. FIG. 6 illustrates the transmission format of data being sent to and from the master unit as would apply, for example, in a typical duplex operation. The Area Command Byte always precedes the Data Out Byte sent from the master I/O interface 4. Upon receipt of the ST bit, each area controller examines the Byte Address C1-C2 for potential selection of a group of eight input lines and eight output lines (the input and output ports). Next, each area controller samples the Channel Select bits CS1-CS3 and compares their value with a three-bit identification value (hard-wired) unique to each area controller. The single area whose unique identification value matches the received channel select value determined by the Channel Select bits CS1-CS3 will remain active and proceed to interpret the data transfer command as an input only or duplex operation and to act upon the Data Out Byte as required. All other areas cease to participate further in the MACS transmission. The active area controller selected transfers the value of the selected group of eight input bits (designated by the Byte Address) to its area input register 450 (see FIG. 4) and shifts this data, as a Data In Byte back to the master unit 1 in a time sequence as illustrated in FIG. 6. As seen therein, the first bit of the Data In Byte is transmitted after the parity bit from the master controller is received in the area controller. The last Data In bit is transmitted while the fifth bit is being received from the Data Out Byte. Consequently, the duplex operation involves the simultaneous transmission and reception of data by the master I/O interface 4. The selected area not only transmits the Data In Byte but also selects the designated group of eight output lines specified by the Data Out Byte received from the master I/O interface 4. Area timing is such that, for duplex operation, the Data In Byte is shifted back to the master unit 1 overlapped in time with the Data Out Byte. An entire duplex transfer requires eighteen shift clocks to be completed as illustrated in FIG. 6.

After the Input Data Byte has been loaded into the SDI register 410 (FIG. 4) the master controller 2 may read the input data by executing a "READ SDI" instruction or alternately "READ SDI AND START TRANSMISSION" instruction. The "READ SDI" instruction completes the I/O operation and transfers the data from the SDI register 410 to the master controller 2 via the master data bus 414. The master I/O interface 4 then waits for the next I/O command. The "READ SDI AND START TRANSMISSION" instruction automatically reinitiates data transfer utilizing the previously established Master Command Byte which remains stored in the MCB register 416. Now, however, the input only mode is selected, e.g. bit R/D of the ACB register is set to "0". In the input only mode, the SDO register 418 contains all zero's inasmuch as it is serially loaded with zero's during a data transfer. The utilization of the "READ SDI AND START TRANSMISSION" instruction is advantageous for rapid multiple readings of input data as required for effective digital filtering of inputs. Typically, for example, software filtering utilizing this rapid multiple reading technique requires three consistent consecutive input data bytes. If three such consistent consecutive bytes are received, the data is taken to be free from error.

The master I/O interface 4 also provides facilities for reading the CCB register 412 and MCB register 416 for interrupt processing and diagnostic purposes.

Table 1 listed below shows the specific addresses utilized by the master microprocessor 300 of the master controller 2 for control and data transfers.

TABLE I

| ADDRESS (HEX) | READ FUNCTION | WRITE FUNCTION |
|---|---|---|
| EDFC | READ MCB | LOAD MCB |
| EDFB | READ SDI & START I/O | LOAD SDO & START I/O |
| EDFA | READ SDI | LOAD MCB & START I/O |
| EDF9 | READ STATUS | WRITE STATUS |
| EFF8 | READ CCB | NO OP |

Simultaneous Area Operation

In addition to communication between the master unit 1 and the specific area controllers 6-14, the master unit 1 may communicate with all of the area controllers simultaneously. To achieve simultaneous communication, the Channel Select bits are set to address 7 (CS3, CS2, CS1 = 111) in the Master Command Byte. Each area controller recognizes channel 7 as a simultaneous mode transmission and consequently a common data byte may be simultaneously transmitted to each area controller. A common Output Data Byte is thus fed to the same output port in all area controllers as specified by the Byte Address bits C1-C3 (C1-C3 = 111 is used in practice). Additionally, this procedure allows the master unit 1 to read inputs for more than one area controller with a single I/O transaction. Inasmuch as the input lines are "ORed" together into a single serial input register, namely, the SDI register 410, mutually exclusive bit positions are assigned within the common Input Data Byte to the area controller during the simultaneous mode transmission. All bit positions within the common Input Data Byte not specifically assigned to an area controller are strapped to a value of "0" to avoid interference at the master unit 1. The simultaneous area operation may be utilized, for example, to effect a psuedo-interrupt procedure which is effectively a polling of various input data lines to the master unit 1 from each (or any desired number) of the area controllers. The master microprocessor 300 has a single interrupt line which is actuated by the machine clock signal along channel 370 (FIG. 3). This interrupt however, initiates a polling of the area controllers under a simultaneous addressing mode (address 7) to sample selected lines of the area controllers as a psuedo-interrupt byte. As a result, a single interrupt line of the master microprocessor 300 may be expanded into a plurality of psuedo-interrupt inputs from the area controllers.

Status Read and Write Commands

In addition to the memory read and write commands listed in Table I, the master microprocessor 300 may execute status read and write instructions (also listed in Table I) to sense and control certain discrete master controller functions. The master microprocessor 300 operating under program control consequently may execute read and write memory reference instructions to address X'EDF9'. Data bytes transferred across the master data bus 414 during status read and write operations are called Master Status Read Bytes and Master Status Write Bytes respectively. The function of each bit in the Status Bytes is set forth in Tables 2, 3 and 4 below.

TABLE 2

Master Status Read Byte

| MASTER DATA BUS BIT POSITION | BIT NAME | FUNCTIONAL DESCRIPTION OF BIT |
|---|---|---|
| 7 | CLKFT | Clock Fault; when set indicates that no shift clock is being transmitted to the areas. If this FLAG is set, the software will inspect bit 6 to determine the polarity of the clock |
| 6 | ASHFTCLK | Area Shift Clock State; direct indication of the state of the CLOCK output to the area controllers. |
| 5 | — | |
| 4 | — | |
| 3 | — | Not defined |
| 2 | — | |
| 1 | — | |
| 0 | HOLD | Transmission incomplete. Equals "1" only when transmission is in process. |

TABLE 3

Master Status Write Byte

| MASTER DATA BUS BIT POSITION | BIT NAME | FUNCTIONAL DESCRIPTION BIT |
|---|---|---|
| 7 | CLKEN | When set to "0", disables the clock to all area controllers. (Forces clock low). When set to a "1", enables the clock to each area controller. |
| 6 | — | Not defined. |
| 5 | RC3 | Receiver Control Bit 3 |
| 4 | RC2 | Receiver Control Bit 2 |
| 3 | RC1 | Receiver Control Bit 1 RC3, RC2, RC1 are defined in Table 4 |
| 2 | CFTOK | Area C/F Test OK Flag. When set to a "1", causes the Area C/F test passed light (LED) to be on, when set to a "0", extinguishes the light. |
| 1 | MTOK | Master Test OK Flag. When set to a "1", causes the "Master test pass" light (LED) to be On, when set to a 0, extinguishes light. |
| 0 | PARTIY | When set to a "1" creates parity error in the parity bit transmission, by complementing correct parity. When set to a "0", correct parity is generated. |

TABLE 4

Master Status Write Byte-Receiver Control Bits

| RC3 | RC2 | RC1 | Input Selected |
|---|---|---|---|
| 0 | 0 | 0 | The 'ORed' serial data input lines from all areas is selected. This setting is for normal MACS operations. |
| 0 | 0 | 1 | The serial data input line from the single Area specified by the RC bits (Area 1, 2 . . . 6) is selected. These RC settings are test modes to isolate a failing Area Controller. |
| . | . | . | |
| . | . | . | |
| . | . | . | |
| 1 | 1 | 1 | The serial data output line from the Master SDO/ACB registers is selected. This is a Master turnaround test mode to isolate Master failures. At the completion of a serial transmission in this mode, the SDI/CCB registers will contain the contents of the SDO/ACB registers. |

Master Controller

Figure 7A:
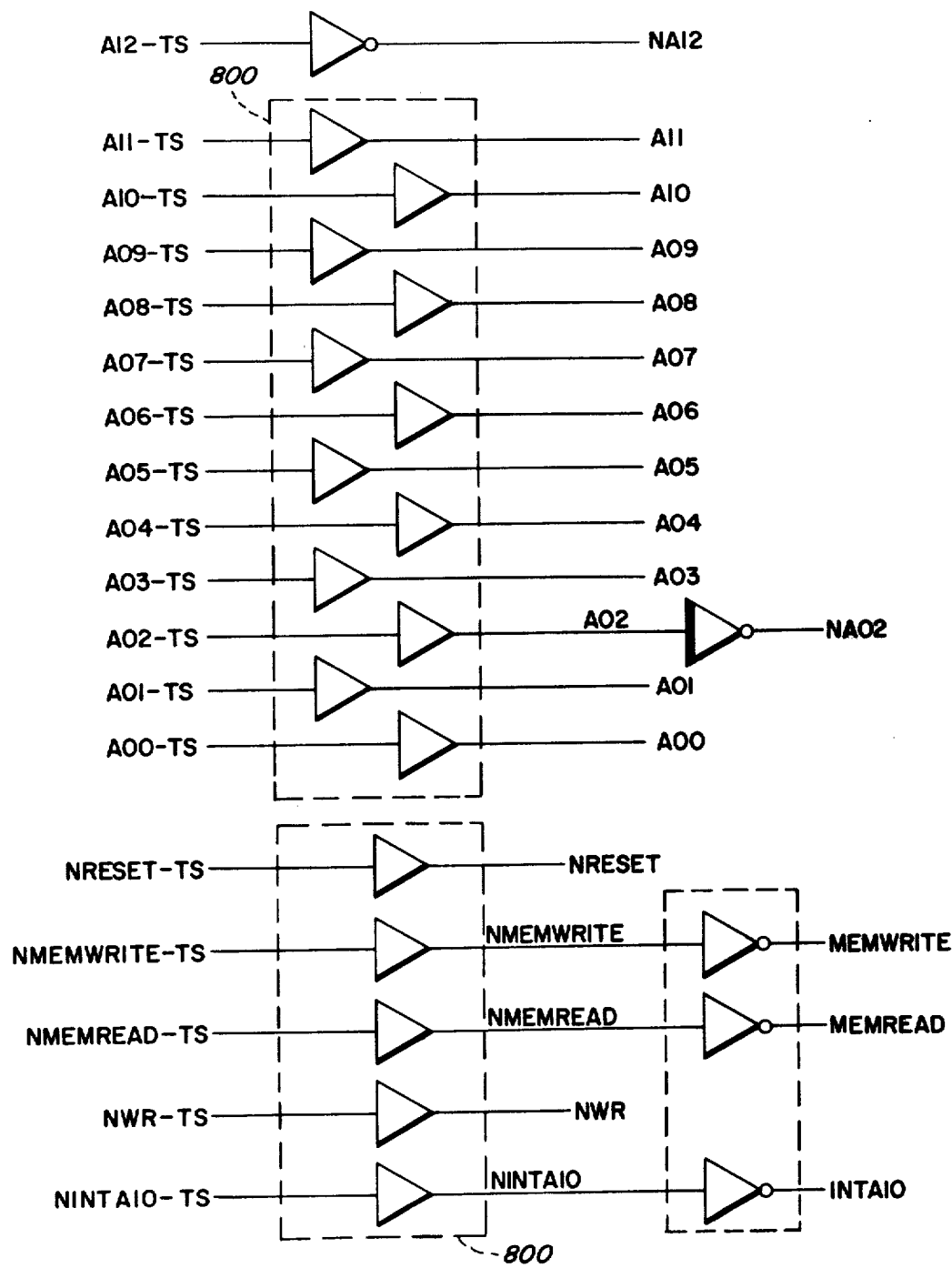
FIGS. 7A and 7B illustrate the interconnection of various data and address lines from the master tri-state bus to the master I/O interface.
Figure 7B:
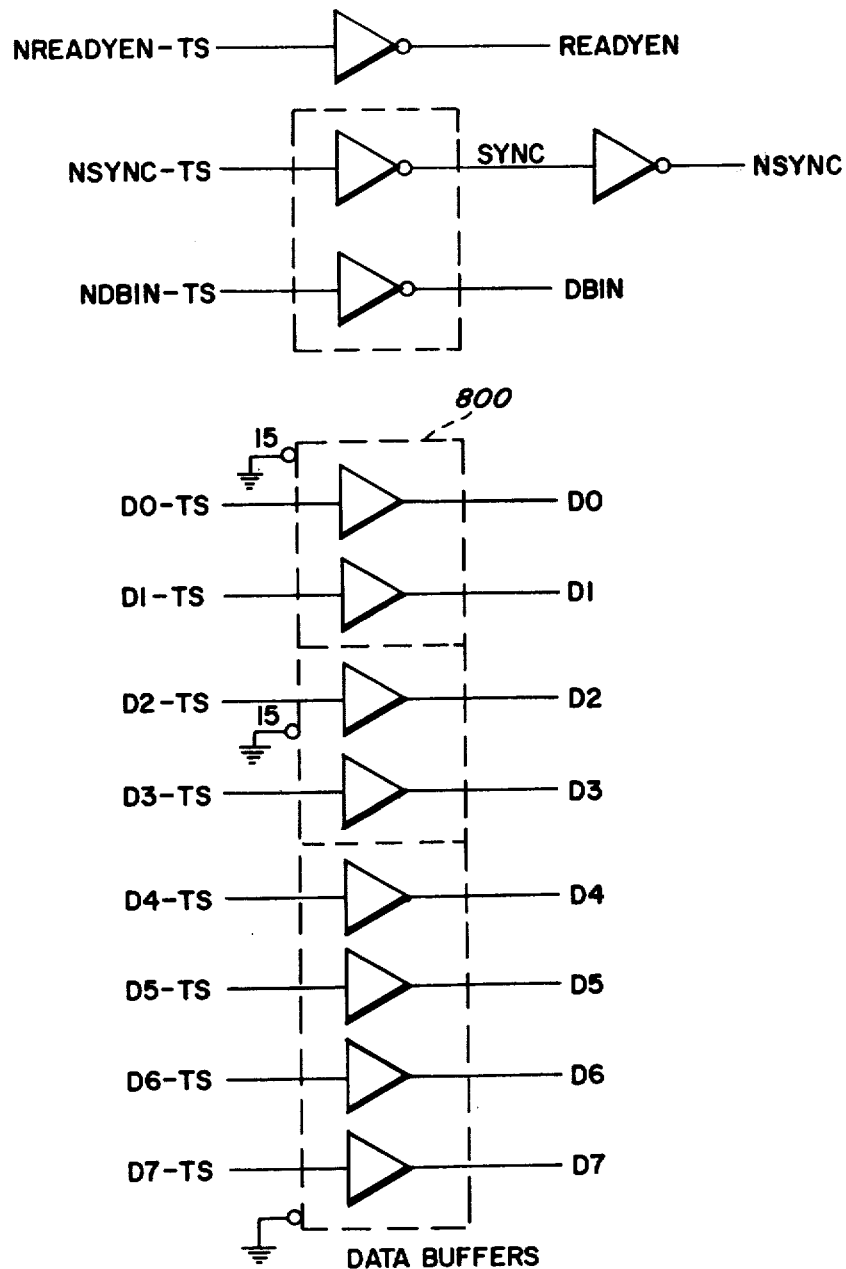

A more detailed description of the master I/O interface 4 and the various area controllers and their interconnection in the Master/Area Communication System is set forth in FIGS. 7-27. The master I/O interface 4 is connected to the master controller 2 by means of the tri-state master system bus 308 which comprises sixteen address lines (A00-TS through A15-TS), eight data lines (D0-TS through D7-TS) and a plurality of control or status lines to be set forth hereinbelow. As indicated in FIG. 7, the address and data lines coming from the tristate master system bus 308 are passed through buffers 800 to provide two-level logic signals for the master I/O interface 4. Various of the signals are inverted as for example the not interrupt acknowledge signal (NINTAIO-TS) which becomes the interrupt acknowledge I/O signal (INTAIO) for use in the master I/O interface 4 logic circuitry. The various control signals are derived from the master controller 2 as explained in detail in the aforementioned copending application entitled "Direct Memory Access for Refresh of a Programmable Control Machine". Most of these signals are derived from the Intel 8080A-2 microprocessor and reference is made to the Intel Users Manual dated September 1975 for detailed description thereof.

A brief description of the various control signals from the master controller 2 is set forth herein. In the following description the letter N preceeding a signal neumonic is indicative of the logical inverse signal or the "bar" signal. Thus, the NDBIN signal is low, and the DBIN signal is high when data is loaded into the data lines D0-D7 of the microprocessor 300.

NRESET-TS is a logical 0 whenever the system is being reset as for example during a power up or initialization process. The NERSET signal is fed to the various shift registers used throughout the master I/O interface 4 and is likewise fed to the microprocessor 300 after the power supplies have settled during an initial power-on operation. In effect, this reset signal is derived from the power normal signal along line 316 of FIG. 3.

The NMEMWRITE-TS and NMEMREAD-TS signals are effectively the memory read and memory write signals utilized in the Intel 8080 CPU during the status portion of the machine cycle. The memory read information is effectively the D7 status bit whereas the memory write signal is effectively D1.$\overline{D4}$. The microprocessor 300 is utilized in a memory mapped I/O architecture such that all I/O is considered in the memory address space of the CPU.

The NWR-TS signal is the not write signal from the microprocessor 300. The NINTAIO-TS signal is the not interrupt acknowledge signal derived from the DO status bit of the status word for the master microprocessor clocked by the microprocessor phase 1 clock (PH1) and enabled by SYNC. The SYNC signal is generated by the microprocessor at the beginning of each machine cycle and is used to synchronize the master I/O interface and peripheral circuits. The NREADYEN-TS (not ready enable) signal is derived from the microprocessor and indicates that the address lines have settled on the master system bus and the read signal to the CPU may be generated if desired. The NDBIN-TS signal is derived from outputs of the microprocessor and indicates that the master data bus is in the data input mode.

Master I/O Interface

The master I/O interface 4 comprises an ACB register 422, MCB register 416 and SDO register 418. These three registers are shown in greater detail in FIG. 8 wherein the ACB register 422 is fabricated, for example, by means of the series combination of an eight bit register 850 and a four bit register 852. The four bit register output line 854 is connected to the serial input line of the eight bit register 850 so that an effective twelve bit parallel input/serial output register may be formed. In effect, only ten bits of this effective twelve bit register are utilized consistent with the area command byte length as shown in FIG. 5. By way of example, the eight bit shift register may be model No. 74166 (Texas Instrument SN 74166) and the four bit register may be model No. 74194. The various clock signals and strobe signals utilized to operate the shift registers are derived from logic circuitry to be discussed hereinbelow. Effectively, however, registers 850 and 852 are operated to parallel load data from the MCB register 416 and to serially shift this data out along the master data out line 425. The Area Command Byte and Data Out Byte are encoded by phase encoder 840 comprising exclusive OR gate 842 and inverter 844. The clock input to exclusive OR gate 842 is the area shift clock pulse from clock generator 426. The data is phase encoded to minimize adverse temperature effects and noise on the fiber optic link, driers and receivers. As a result of the phase encoding, a transmitted logical 1 is in phase with the area shift clock whereas a logical 0 is out of phase.

Figure 8:
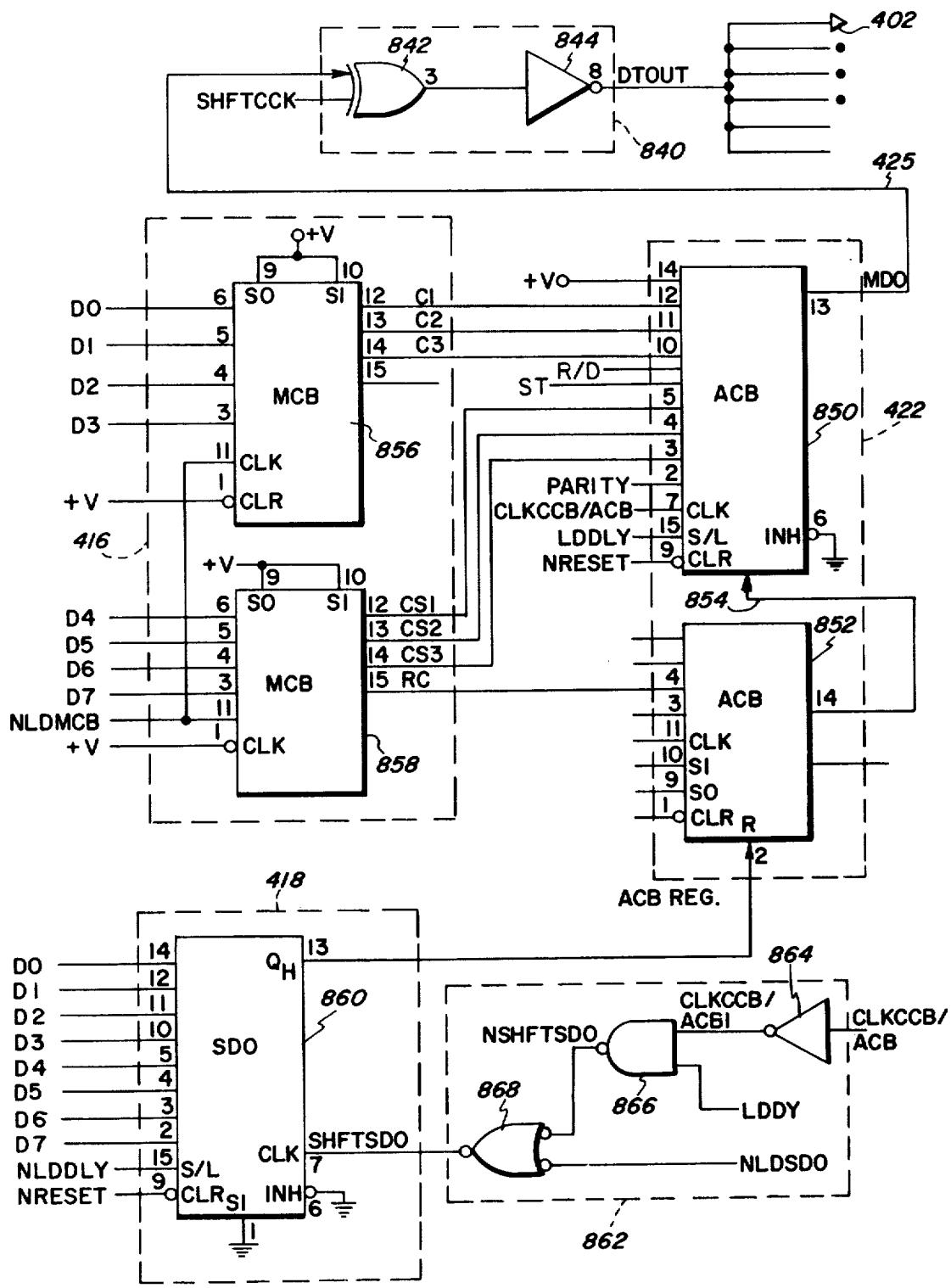
FIG. 8 shows a schematic drawing of key registers utilized in the master I/O interface for transmitting a command and data word.
Figure 9A:
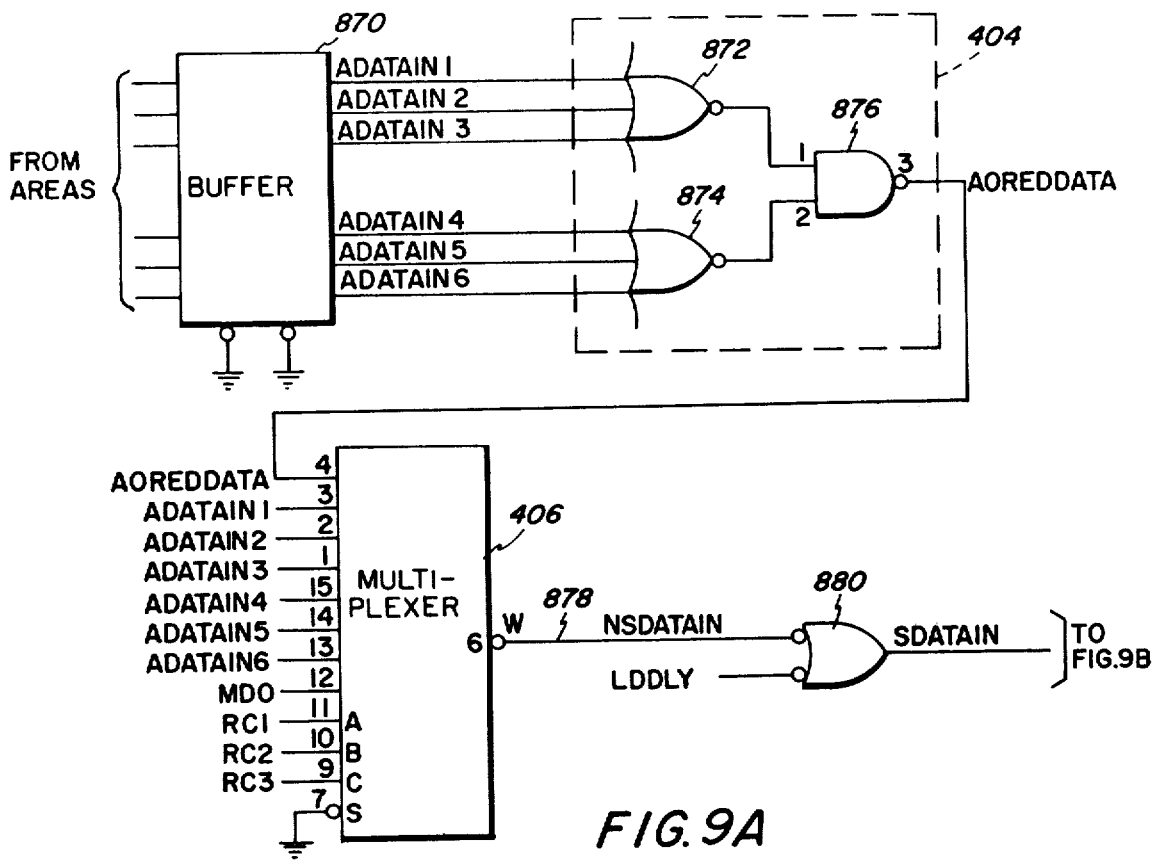
FIGS. 9A and 9B are schematic drawings illustrating the key input registers in the master I/O interface.

The MCB register 416 is also shown in FIG. 8 to comprise two four bit shift registers 856 and 858, each, for example, model 74194 and operable in a parallel in/parallel out mode. The outputs of shift registers 856 and 858 are shown connected to various input lines of the ACB shift registers 850 and 852. The inputs for the MCB register 416 are the data lines D0-07 from the master data bus 414 (via buffers of FIG. 7). The parallel in/parallel out operation of the four bit shift registers 856 and 858 is achieved by holding the mode control lines S0 and S1 to a logical "1" state by means of a conventional pull-up resistor network (indicated in the drawing by +V) which is also utilized to maintain the clear (CLR) input high (logical "1"). Consequently, input data is fed to the output lines of shift registers 856 and 858 upon a positive transition (low to high) of the input clock signal "NLDMCB".

The SDO register 418 is also shown in FIG. 8 to consist of an eight bit shift register 860, model No. 74166, operable in a parallel load/serial output mode. The output of shift register 860 is fed to the input of four bit shift register 852. The various clock signals utilized to load and shift the ACB register 422, MCB register 416 and SDO register 418 are explained more fully below. It may be seen however, that bits D0-07 from the master data bus 414 are loaded into the MCB register 416 and are subsequently parallel loaded into the ACB register 422. With reference to eight bit register 850 of the ACB register 422, the start transmission (ST) bit of shift register 850 is loaded with a high or logical 1 signal from a pull up network into bit position zero. The following six data bits in shift register 850 are loaded from the MCB four bit shift registers 856 and 858. Specifically, the Byte Address bits C1-C3 and the Channel Select bits CS1-CS3 are connected to the inputs of the eight bit shift register 850. A parity signal is also shown fed to an input of eight bit register 850 and derived from a parity generator set forth hereinbelow. The parity bit position occupies the seventh bit position in the ACB register. The eighth bit position is the reserve command bit presently not utilized and is supplied by the four bit register 858 of the MCB register 416 into register 852. The ninth bit position of the ACB register is the "R/D" bit which designates the read (R) or duplex (D) mode of transmission.

It may similarly be seen that the input of the SDO register 418 is simply the data bits D0-D7 from the master data bus 414. The clock inputs to the eight bit register 860 ensure that the SDO register captures the Data Out Byte forming the second word of the transmission sequence whereas the first word or Area Command Byte is captured first by the MCB register 416 and subsequently loaded into the ACB register 422.

The loading and shifting of shift register 860 is controlled, in part, by means of logic circuit 862 which comprises inverter 864, NAND gate 866 and NOR gate 868 as shown.

On the input side for receiving data from the various area controllers, the master I/O interface 4 comprises a multiplexer 406, SDI register 410 and CCB register 412. These elements are shown in greater detail in FIG. 9. The data-in lines from the area controllers are first buffered in buffer 870 (model no. 8097) and fed to an OR gate 404 (FIG. 4) consisting of NOR gates 872 and 874 having outputs connected to the input of a NAND gate 876. The output of NAND gate 876 is termed "AOREDDATA" indicating that it is the area "ORed" data, and this signal is fed as one input to multiplexer 406. Additional inputs to the multiplexers 406 are supplied from the individual area data lines and are identified as "ADATAIN1" through ADATAIN6". Four additional inputs to the multiplexer 406 are shown. One input is simply the master data out MDO signal from the master data out line 425 via 430 which is utilized for turn-around testing, and the remaining three inputs to multiplexer 406 serve as a mode selective code for multiplexer 406. These three bits are simply the Receiver Control bits RC1-RC3 defined in Table 4. In normal operation these bits are 0 and the "ORed" data is selected. The multiplexer 406 may for example be model no. 74151 wherein the strobe signal is grounded and the inverted output data terminal w is utilized.

The output of multiplexer 406 appears on line 878 and is designated "NSDATAIN", the not selected data in signal. The NSDATAIN signal is inverted by means of NOR gate 880 conditioned by a load delay "LDDLY" signal to be explained more fully below. The selected data input signal, SDATAIN, is fed to the input of SDI register 410 illustrated in FIG. 9 as an eight bit shift register 882. Register 882 may, for example, be model no. 74164 utilized in two modes: a serial in/serial out mode and a serial in/parallel output mode as required. Eight bit register 882 outputs data to the CCB register 412 which comprises two additional eight bit registers 884 and 886, each for example, model no. 74164. The outputs of eight bit register 882 of SDI register 410 are designated SDI-0 through SDI-7 indicative of the eight serial data-in bits. Likewise, CCB register 412 has outputs indicated as CCB0 through CCB9 corresponding to the ten bits in the Area Command Byte. Effectively, the CCB register is utilized during turn-around operations to check the bits in the ACB register 422. Consequently, the CCB register 412 is designed to be ten bits long. The CCB register 412 is also utilized as a counter for designating the end of a simplex or duplex transmission as explained more fully below. The loading and shifting of the SDI register 410 and CCB register 412 are controlled, in part, by means of the logic circuit 888. This circuit comprises a NAND gate 890 which is utilized to clock the eight bit registers 884 and 886. Logic circuit 888 additionally comprises serially connected NAND gates 892 and 894 and inverter 896 which are utilized to reset the eight bit registers 882, 884 and 886.

Parity Generator

Figure 10:
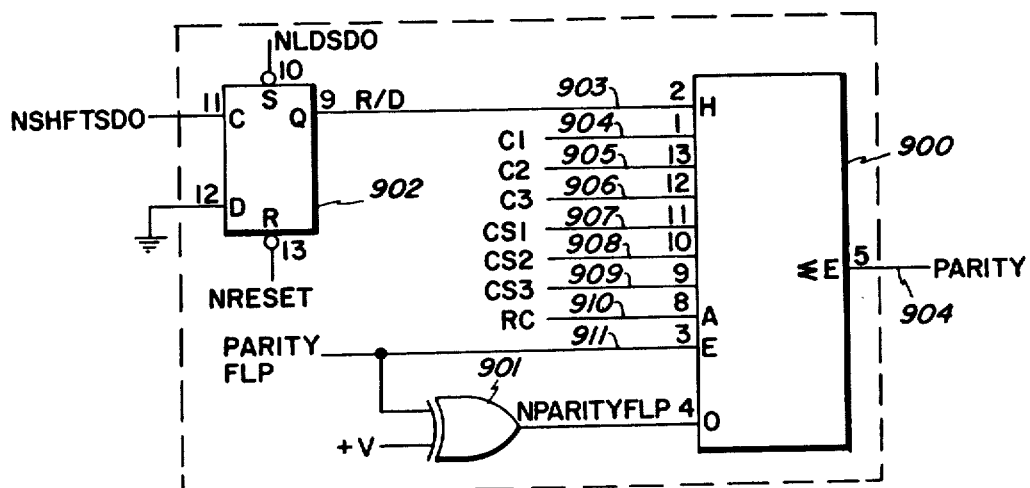
FIG. 10 is a schematic drawing of the parity generator circuit utilized in the master I/O interface.

The parity generator 420 of FIG. 4 is further illustrated in FIG. 10 and is seen to comprise an odd/even parity generator 900, exclusive OR gate 901 and a D-type flip-flop 902. The odd/even parity generator 900 may be, for example, model no. 74180, and provides an output signal along its even sum output line 904. The even sum parity is computed over the input lines 903-910. Line 903 is fed by the R/D signal and is a logical 1 for a duplex mode transmission and a logical 0 for a simplex or read only transmission. Lines 904-906 are fed by bits C1-C3 respectively from the Byte Address portion of the MCB register (outputs of four bit register 856) and input lines 907-909 are fed from the Channel Select bits CS1-CS3 of the MCB register (outputs of four bit register 858). Input line 910 to the odd/even parity generator 900 is supplied by the RC (reverse command) signal from the MCB register 416. The output 904 of the odd/even parity generator 900 is conditioned upon the PARITY FLP (parity flip) signal fed along line 911 to the even input terminal of generator 900 and the logical inverse of this signal which is fed via the exclusive OR gate 901 to the odd input terminal of the generator 900. The second input of the exclusive OR gate is tied to a high voltage or logical 1 signal so that the odd and even inputs to parity generator 900 will always be inverse of one another. The parity flip signal along line 911 is derived from the Status Write Register as will be explained more fully below. The inputs to flip-flop 902 are effectively decodes of the address byte A0-A15 inasmuch as they depend upon whether the transmitted signal is an input only or an input/output transmission. These decode signals are set forth in further discussion below. The output of the parity generator 420 along line 904 is fed as one input to the eight bit shift register 850 of the ACB register 422.

Clock Generator

Figure 11:
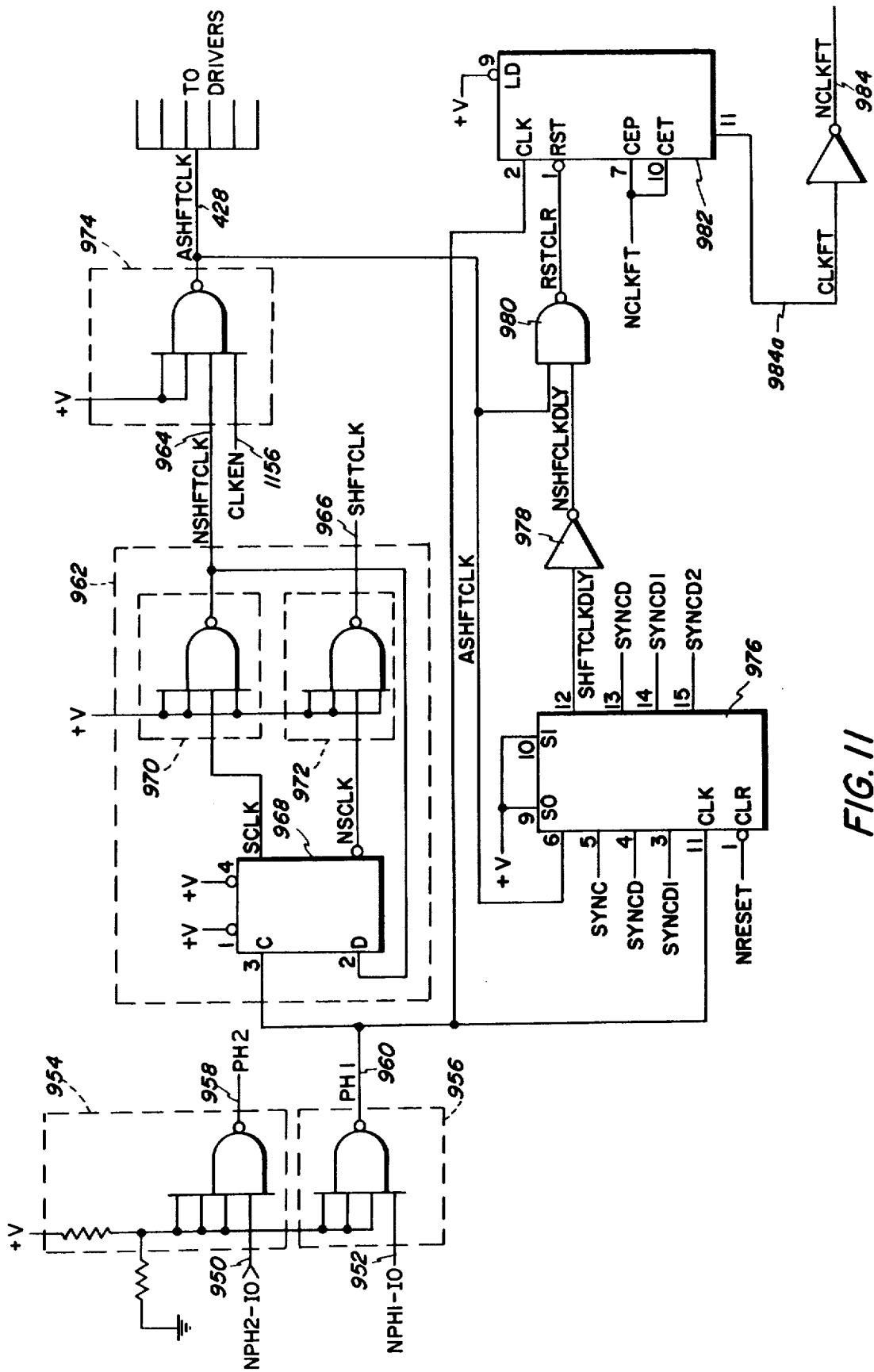
FIG. 11 shows the clock generating circuit utilized in the master I/O interface.

The clock generator 426 of FIG. 4 is shown in detail in FIG. 11. Two MOS level 2.5 MHz clock signals are supplied from the clock oscillator 310 of the master controller 2 and utilized to operate the master microprocessor 300. Two additional TTL 2.5 MHz clock signals are also provided by oscillator 310 and are designated NPH-2-I0 along line 950 and NPH1-I0 along line 952. Each clock signal is fed into a high power driver 954 and 956 which may be, for example, model no. 74H40 so that 2.5 MHz clock signals PH2 and PH1 are provided along lines 958 and 960 respectively. Clock generator 426 is further seen to comprise a dividing network 962 which divides down the 2.5 MHz PH1 clock signal into a 1.25 MHz signal designated "NSHFTCLK" on line 964 and a 1.25 MHz clock signal "SHFTCLK" on line 966. The dividing network 962 comprises a flip-flop 968 (model no. 7474) and two high power drivers 970 and 972 (model no. 74H40). The NSHFTCLK signal along line 964 is fed to NAND gate 974 providing an output clock signal ASHFTCLK corresponding to the area shift clock signal along line 428 (see FIG. 4).

The clock generator 426 further comprises a four bit shift register 976 (model no. 74194 operated with S0 and S1 mode control inputs high) which is clocked by the PH1 signal along line 960 and provides output clock signals synchronized to the PH1 clock and labeled SYNCD, SYNCD1, and SYNCD2 as shown. Additionally, the four bit shift register 976 provides a SHFTCLKDLY signal which is simply a delayed version of the area shift clock signal, ASHFTCLK from line 428. The SYNC signal input to the four bit shift register 976 is derived from the master controller 2 as per FIG. 7. This SYNC signal is tied to the falling edge of the PH2 clock signal in the master microprocessor 300, and the shift register 976 is effective to synchronize this SYNC signal to the PH1 clock. The various outputs of the four bit shift register 976 are utilized for timing and control purposes as explained further below.

The SHFTCLKDLY output signal of the four bit shift register 976 is fed to an inverter 978, NAND gate 980 (conditioned by the ASHFTCLK signal from line 428) to the restart signal of a four bit counter 982 (model no. 74161). The output of counter 982 is utilized to provide a NCLKFT signal along line 984 via an inverted output thereof. The inverse of this signal, namely, the CLKFT signal is the clock fault signal listed in Table 2 and forms part of a Master Status Read byte which is returned to the master microprocessor 300 in response to a memory read to address X 'EDF9'. Consequently, the four bit counter 982 in combination with a memory status read instruction is utilized to determine if the shift clock signal ASHFTCLK (of line 428) is being transmitted to the area controllers.

Shift Controls

The control logic 424 (FIG. 4) is utilized to control the shifting of the input data through the SDI register 410 and CCB register 412. The control logic utilized to accomplish the shifting is shown in detail in FIG. 12 and comprises a four bit shift register 1000 and a second four bit register 1002 (both model no. 74194 for example). These shift registers are utilized as simple flip-flops and the mode control inputs S1 and S0 are tied to logical 1. Consequently, data which appears on the input lines of these registers is fed to the output on the rising edge of the clock signal. Register 1000 is clocked by the PH2 clock signal and produces a F1 signal output whereas register 1002 is clocked by the SHFTCLK signal from line 966 of clock generator 426 (see FIG. 11) and produces a F2 output signal. A number of different clock and control signals are generated by means of the shift control logic of FIG. 12 and these signals are utilized in controlling and clocking the SDI register 410, CCB register 412, SDO register 418 and ACB register 422.

Figure 12:
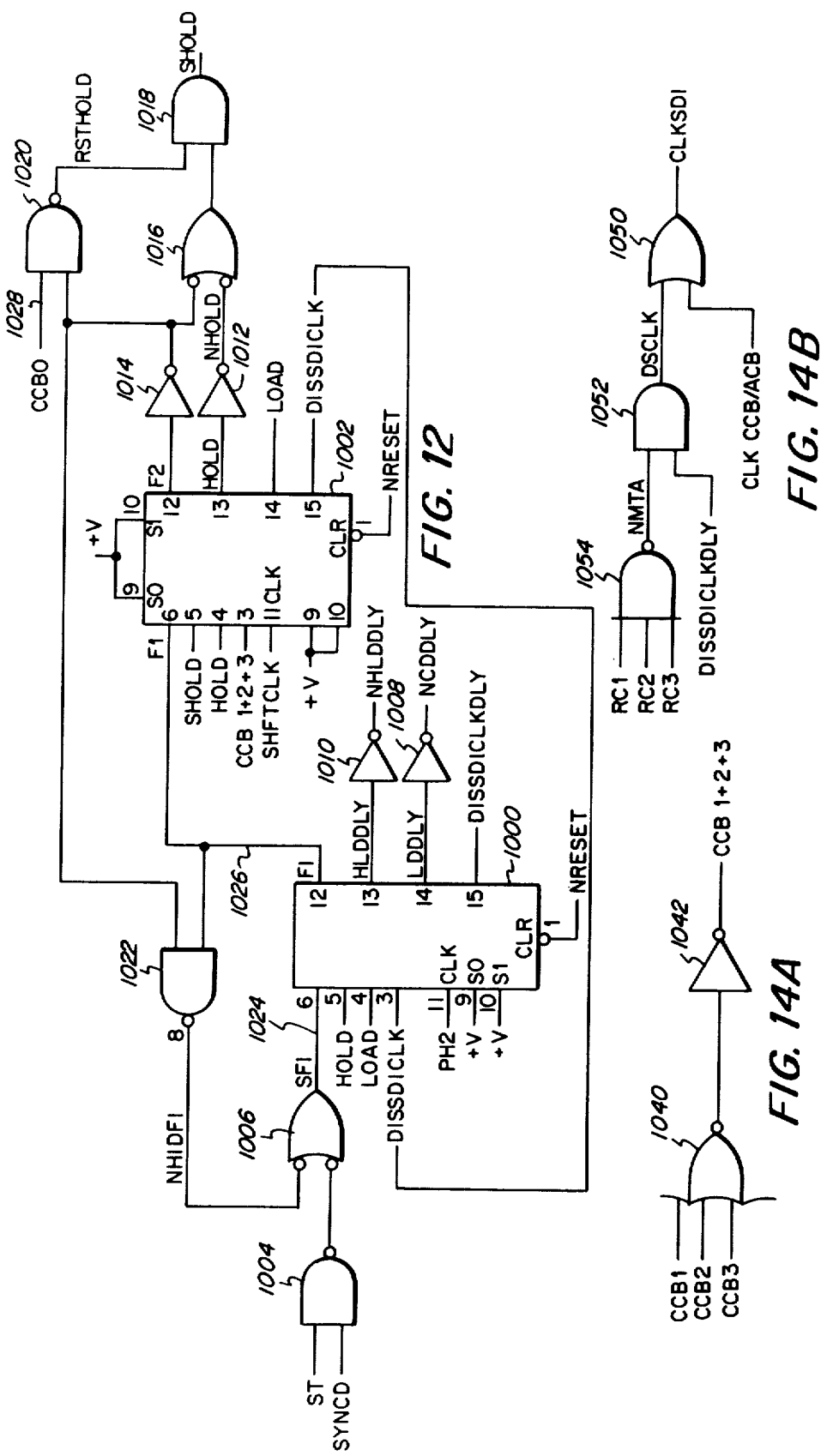
FIG. 12 shows the logic and timing control circuitry utilized in shifting input data into the master I/O interface.

FIG. 12 shows the interconnection of the registers 1000 and 1002 utilizing a NAND gate 1004, NOR gate 1006, inverters 1008, 1010, 1012 and 1014, NOR gate 1016, AND gate 1018, NAND gate 1020 and NAND gate 1022. It may be seen that the shift control logic of FIG. 12 has effectively three control input signals and two external clock signals utilized for its operation. Two of the control signals are the ST or start transmission and SYNC D. The ST signal is fed to the upper input of NAND gate 1004 and results from a decode of the Area Command Byte stored in the ACB register 422. The SYNC D signal is the second input to NAND gate 1004 and is generated from register 976 of the clock generator 426 of FIG. 11. A third input to the shift control logic of FIG. 12 is the CCBO bit of the eight bit shift register 886 forming part of the CCB register 412 (see FIG. 9). The CCBO signal is fed along line 1028 to the upper input of NAND gate 1020. The two clock signals are the PH2 clock and SHFTCLK clock. Utilizing the ST, SYNCD and CCB signals, as well as the PH2 and SHFTCLK clock signals, the shift control logic generates a number of control and timing signals as set forth in the timing charts of FIG. 13.

Figure 13:
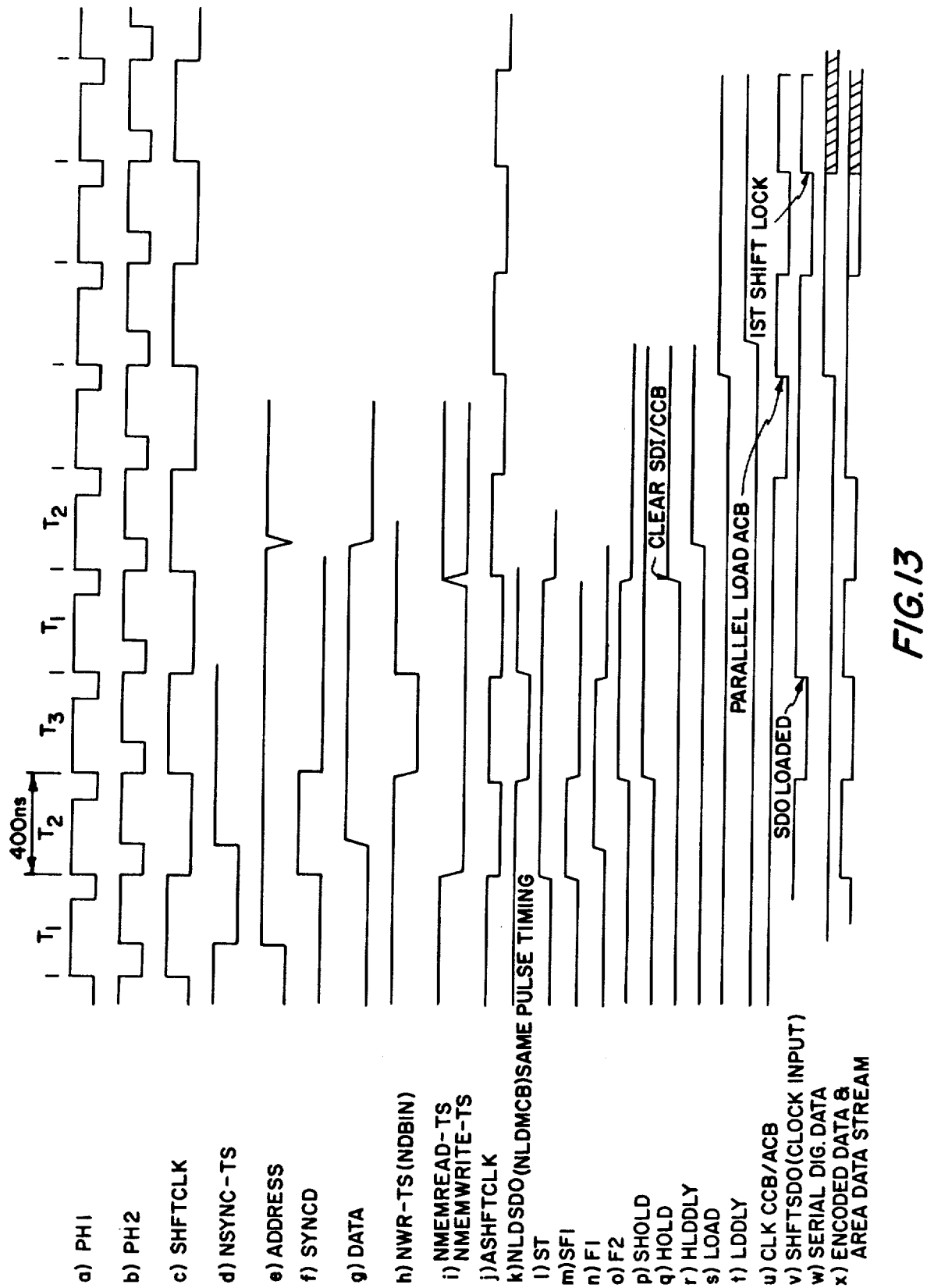
FIG. 13 shows a timing chart illustrating the overall timing sequence for transmitting and receiving data between the master and area controllers.

FIG. 13 itself illustrates a functional timing chart for a "LOAD SDO AND START TRANSMISSION" instruction. The graphs in FIG. 13 are drawn beginning at the last machine cycle of the instruction so that the address has already been fetched from memory by the CPU, and the master controller 2 is now beginning to initiate a memory write instruction. In FIG. 13, for example, graphs (a) and (b) represent the two phase clock signals PH1 and PH2 each at 2.5 MHz from the master controller 2. Graph (c) is the SHFTCLK, or shift clock pulse of 1.25 MHz from the clock generator 426. Graph (f) illustrates the SYNCD pulse which is seen tied to the rising edge of PH1. Graphs (n) and (o) represent signals F1 and F2 as outputs from registers 1000 and 1002 respectively. Registers 1000 and 1002 operate as pairs of flip-flops to synchronize the F2 signal with the rising edge of the SHFTCLK signal. The rising edge of F2 is utilized to generate HOLD, HLDDLY, LOAD, and LDDLY signals which are in turn utilized to shift data in the SDI register 410, CCB register 412 as well as various of the output registers. Consequently, it is essential that the rising edge of signal F2 by synchronized with the rising edge of the shift clock signal SHFTCLK. Inasmuch as the shift clock signal is in itself divided down from the PH1 clock signal it is necessary to insure that F2 is synchronized to the rising edge of the shift clock, SHFTCLK signal, as opposed to the falling edge. Consequently, NAND gate 1022, NOR gate 1006, and inverter 1014 insure that F1 will not reset until after F2 is set. Essentially, F1 is set by a logical 1 provided from NOR gate 1006 which results from the simultaneous occurrence of a start transmission, ST, pulse and the SYNCD pulse. F1 remains set even after the SYNCD pulse goes low inasmuch as F2 is not yet set so that its output is low. The low F2 signal is inverted via inverter 1014 and fed as a high to the upper input of NAND gate 1022. The lower input of NAND gate 1022 is also high inasmuch as F1 is now set. Consequently, after F1 has set and prior to the setting of F2, NAND gate 1022 provides a low output which keeps signal SF1 on input line 1024 to register 1000 as a logical 1. This condition remains until F2 is itself set during an upward transition of the SHFTCLK signal as the clock input to register (flip-flop) 1002. Once F2 is set the upper input of NAND gate 1022 goes low providing a high at its output which is fed via NOR gate 1006 to reset the signal SF1 which resets register 1000 on the next upward transition of PH2. As a result, signal F2 is synchronized to the rising edge of the shift clock signal (SHFTCLK).

The setting of signal F2 to a logical 1 produces a high for the SHOLD signal (set hold) at the output of AND gate 1018, e.g. see graph p). Consequently, F2 and SHOLD are synchronized to transistion from a low to a high state at the same time, namely, on the rising edge of the shift clock pulse SHFTCLK. AND gate 1018 has an upper input fed by the output of NAND gate 1020. The upper input of NAND gate 1020 is fed from the CCBO bit of register 886 via a line 1028. This bit is a 0 after a power-up transition and will remain 0 until the end of a transmission wherein it will transition to a high level. In fact, a marker 1 bit initiated by LDDLY signal to NOR gate 880 (FIG. 9A) is shifted through registers 882 and 884 into register 886. The appearance of the 1 in bit CCBO is used to mark the end of a transmission. The initial 0 value of CCBO insures that the output of NAND gate 1020 is a 1 so that the output of AND gate 1018 will transition to a high value upon the logical high appearing at the lower input thereto. The SHOLD signal is seen to provide an input to register 1002 providing a HOLD signal on the next rising edge of clock SHFTCLK. The HOLD signal is in turn fed back to an input of register 1002 to provide a LOAD signal at the output thereof on the next shift clock pulse (see graphs (c), (q) and (s) of FIG. 13). Both the HOLD and LOAD sigals are in turn fed to register 1000 and are utilized to provide hold delay (HLDDLY) and load delay (LDDLY) signals upon a positive transition of the PH2 clock signal (see graphs (b), (r) and (t) of FIG. 13).

The relationship of F1 to the HOLD, LOAD, HOLD DELAY and LOAD DELAY signals is clearly seen in the graphs (n) through (t) of FIG. 13. It is noted that the HOLD and LOAD signals are each tied to the rising edge of the shift clock pulse whereas the HLDDY and LDDLy signals are tied to the rising edge of PH2 which immediately follows the rising edge of the shift clock pulse. The hold delay and load delay signals are utilized in FIG. 9 to operate the loading and shifting of the SDI register 410 and CCB register 412 as explained more fully below.

FIGS. 14A and 14B illustrate additional logic circuitry utilized to provide further clock signals used to control the shift registers of the master I/O interface 4. FIG. 14A details the generation of the clock signal CCB1+2+3 and comprises a NOR gate 1040 and inverter 1042. The CCB1+2+3 clock signal is essentially conditioned by bits 1 or 2 or 3 of the CCB register 412 identified as bits CCB1, CCB2 and CCB3 respectively. When any one of these bits is a logical 1, a logical 0 is generated at the output of NOR gate 1040 and consequently the output of inverter 1042 goes high. The CCB1+2+3 clock signal is fed as an input to register 1002 of FIG. 12 and generates a "DISSDICLK" (disable SDI clock) signal on the rising edge of the shift clock pulse (SHFTCLK). The DISSDICLK signal is in turn fed to an input of register 1000 and is utilized to generate a "DISSDICKDLY" or delayed DISSDICLk signal on the rising edge of PH2. The DISSDICLK-DLY pulse is utilized in FIG. 14B to disable the CLKSDI pulse (by keeping it high) which clocks the SDI register 410 (eight bit shift register 882 of FIG. 9) during a master turnaround test mode of operation.

As seen in FIG. 14B, the CLKSDI clock signal for shifting the SDI register is supplied by the output of an OR gate 1050 which has a lower input fed by a CLK CCB/ACB clock signal and an upper input fed by a "DSCLK" signal from an AND gate 1052. The lower input of AND gate 1052 is fed from the DSISDICLK-DLY signal from register 1000 (FIG. 12) initially generated from the CCB1+2+3 signal of FIG. 14A. The upper input of AND gate 1052 is fed by the output of a NAND gate 1054 whose inputs are tied to the receiver control bits RC1-RC3 of Tables 3 and 4. The outputs of NAND gate 1054 will be a logical 1 (normal ORed area data operation) unless the receiver control bits are all in a logical 1 state indicating a turn-around test mode of operation. Consequently, during a normal operation in which the data from the area controllers is wire ORed or in which a particular area controller is selected, the upper input to AND gate 1052 will be a logical 1. As a result, the output of AND gate 1052 will be 1 after DISSDICLDDLY goes high thereby inhibiting further transitions of CLKSDI, thus stopping the SDI shift.

The reason for providing a separate CLKSDI pulse to SDI register 410 is simply that the amount of shifting required for the master turn-around test mode of operation is different (larger) than the amount required during normal operations when data is received from the area controllers (see FIG. 6). If in fact the turn-around mode is utilized, then the upper input of AND gate 1052 is low (FIG. 14B) so that the output of AND gate 1052 is low and the SDI register clock is the same as the CLK CCB/ACB clock. In this case, the turn-around bit stream will be shifted through the CCB and SDI registers stopping when CCBO goes to a logical 1. If, however, the normal mode of operation is utilized, then the output of NAND gate 1054 is high and DISSDICLK-DLY (which depends upon CCB1+2+3) will be high whenever a logical 1 is in CCB1 or CCB2 or CCB3 thereby producing a logical 1 at the output of AND gate 1052. Thus, CLKSDI cannot go from low to high but is held at a high state effectively disabling the clock pulse to SDI three SHFTCLK pulses sooner than in turn-around mode. The result, however, is that the Data-In Byte from the selected area controller is now present in bits SDI0-SDI7 as desired at the end of a transmission.

Address Decoder

Figure 15:
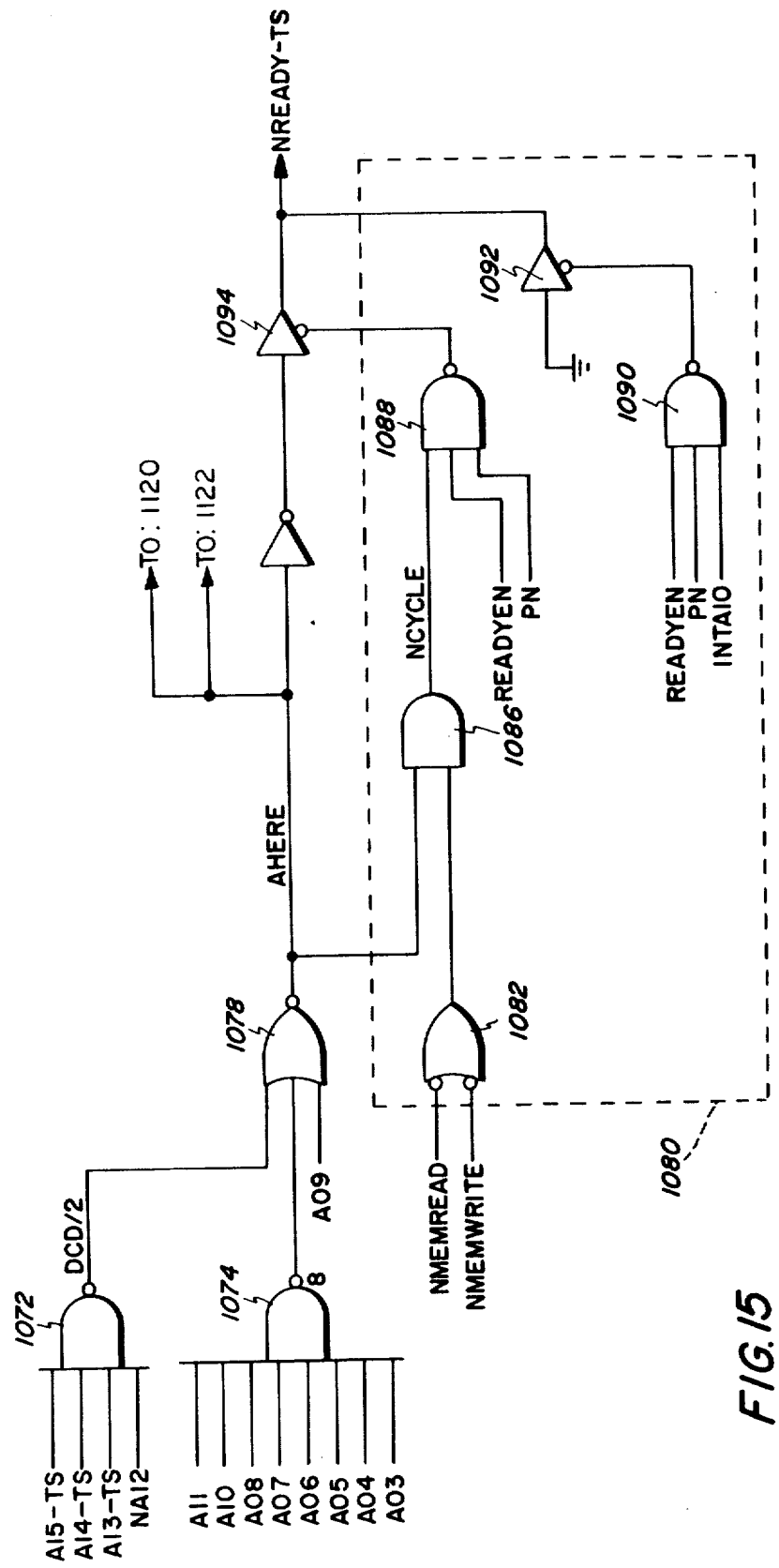
FIGS. 15 and 16 show decode logic for the master I/O interface.

The address decoder which forms part of the control logic 424 of FIG. 4 is illustrated in detail in FIG. 15. Effectively, incoming address lines are decoded to ascertain whether the master I/O interface 4 is required to participate in data control for the instruction being executed. The address range specifically reserved for the master I/O interface and its I/O operations as well as its status read and write operations are HEX addresses EDFC-EDF8 (Table 1). If the address bus contains an address within this range the address decoder will provide an output signal which will permit the appropriate read or write operation to take place within the master I/O interface 4.

The address decoder comprises NAND gates 1072 and 1074 having the respective address line inputs as shown and providing a logical 0 output only if all of the respective inputs are a logical 1. The address decode range is determined by means of the NAND gates 1072-1074 as well as NOR gate 1078. If the decode address is that of the master I/O interface 4 then the output of NOR gate 1078 goes to a logical 1 represented by a high for the signal AHERE. The AHERE signal is then utilized to provide a NREADY-TS signal to the master microprocessor 300 of the master controller 2. This signal is effectively the "READY" signal for the CPU indicating that data in the input registers (such as the SDI register 410) is ready to be read by the master microprocessor 300. The NREADY-TS signal is conditioned by logic circuit 1080 comprising NOR gate 1082, AND gate 1086, NAND gate 1088, NAND gate 1090 and tri-state driver 1092. Input to NOR gate 1082 is provided by the NMEMREAD and NMEMWRITE signals from the master controller 2 and are effectively the memory read and memory write siganls provided during a status indication along the data lines of the master microprocessor 300. The output of NOR gate 1082 is provided to the lower input of AND gate 1086 whose upper input is fed by a signal from NOR gate 1078 indicating that the address is that of the master I/O interface 4. A true output of AND gate 1086 is indicative of a memory cycle to an address allocated to the master I/O interface 4, and this output is fed as an upper input to the three input NAND gate 1088. The second two inputs to NAND gate 1088 correspond to the ready enable signal from the master controller 2 (FIG. 7) and a power normal signal from the power supply 312 (FIG. 3). These two signals, the ready enable signal and power normal signal are also utilized together with the interrupt acknowledge - I/O signal, INTAIO (FIG. 7) as inputs to NAND gate 1090. NAND gate 1090 controls tri-state driver 1092 which is tied to the output of a second tri-state driver 1094 supplying the NREADY-TS signal to the master microprocessor 300. A logical high on the inverted input pin to the tri-state driver effects a high impedance output of the driver, and a 0 on the inverted input pin will enable the output of the driver to logically follow the input signal. Logic circuit 1080 consequently insures that the ready signal sent to the master microprocessor 300 occurs only if power is stabilized (power normal signal true) and the master I/O interface 4 has been properly addressed and received both the ready enable signal and the interrupt acknowledge-I/O signal from the master microprocessor 300.

Figure 16:
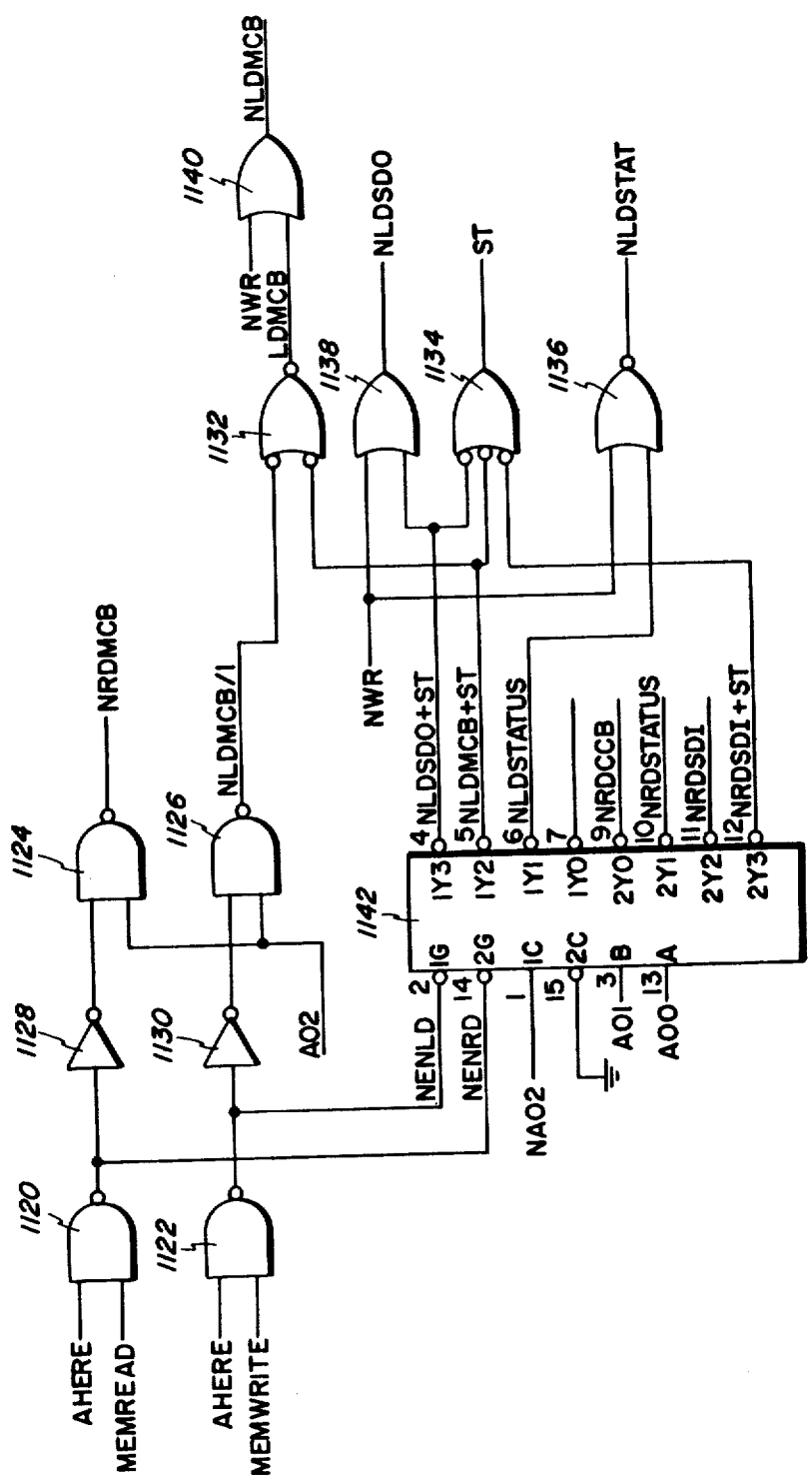

The register decoder is illustrated in FIG. 16 and also forms part of the control logic 424 of FIG. 4. The register decoder is utilized to provide control signals indicative of an address read or address write instruction involving the master I/O interface 4. These control signals are fed to control the loading and shifting of the various registers of FIGS. 8, 9, 10 and 12.

The address decoder of FIG. 16 is seen to comprise NAND gates 1120-1126, inverters 1128 and 1130, NOR gates 1132-1136, OR gates 1138 and 1140 and demultiplexer 1142. The demultiplexer 1142 may be, for example, model no. 74155 and is effectively two demultiplexers, each being a one line-to-four line decoder. The upper input line carrying signal NENLD (not enable load) is passed to one of the selected upper four output lines, and the second input line carrying the NENRD (not enable read) signal is used to feed one of the lower four output lines. The particular output line is governed by the select inputs which are connected to the address bits AO1 and AO0 of the address bus (via buffers of FIG. 7). The demultiplexer is seen to discriminate between two types of signals, those involving memory read functions and those involving memory write functions. In both cases, the memory read and memory write signals are conditioned by the AHERE signal indicative of a master I/O interface address provided from NOR gate 1078 of FIG. 15. The upper three outputs of the demultiplexer 1142 are generated as decodes for the instructions LOAD SDO AND START TRANSMISSION, LOAD MCB AND START TRANSMISSION AND WRITE STATUS. The lower four output signals from the demultiplexer 1142 are generated as decodes for the instructions READ CCB, READ STATUS, READ SDI, and READ SDI AND START TRANSMISSION. In reference to Table 1, the above enumerated seven instructions leave only two address decodes undetermined. These instructions are the READ MCB instruction and the LOAD MCB instruction. Decodes for these instructions are provided by NAND gates 1125 and 1126 respectively. It is noted that one input to each of these NAND gates is supplied by the address line A02 and the other input is provided by the respective read enable or load enable (write enable) signal from inverters 1128 and 1130 respectively.

The ST pulse is generated at the output of NOR gate 1134 and is generated as a consequence of either of three signals being low as follows: (1) NLDSDO+ST, the not LOAD SDO AND START TRANSMISSION, (2) NLDMCB+ST, the not LOAD MCB AND START TRANSMISSION, and (3) NRDSDI+ST, the not READ SDI AND START TRANSMISSION. Consequently, whenever an instruction involving a start transmission is executed the ST signal goes high and the signal is utilized as an input to NAND gate 1004 as seen above in FIG. 12 to initiate the control and clocking of the input and output registers of the master I/O interface 4. Other control signals are generated by the register decoder of FIG. 16. These signals include the not load SDO signal, NLDSDO, fed from OR gate 1138 to the lower input of NOR gate 868 of logic circuit 862 (FIG. 8), and the not load MCB signal NLDMCB from OR gate 1140 fed to the clock input of registers 856 and 858 of MCB register 416 (FIG. 8). NRDMCB (not read MCB) and NLDSTAT (not load status) are also generated in FIG. 16 and these signals are used in status read and write circuitry as set forth hereinafter.

Status Input and Output Control

Figure 17:
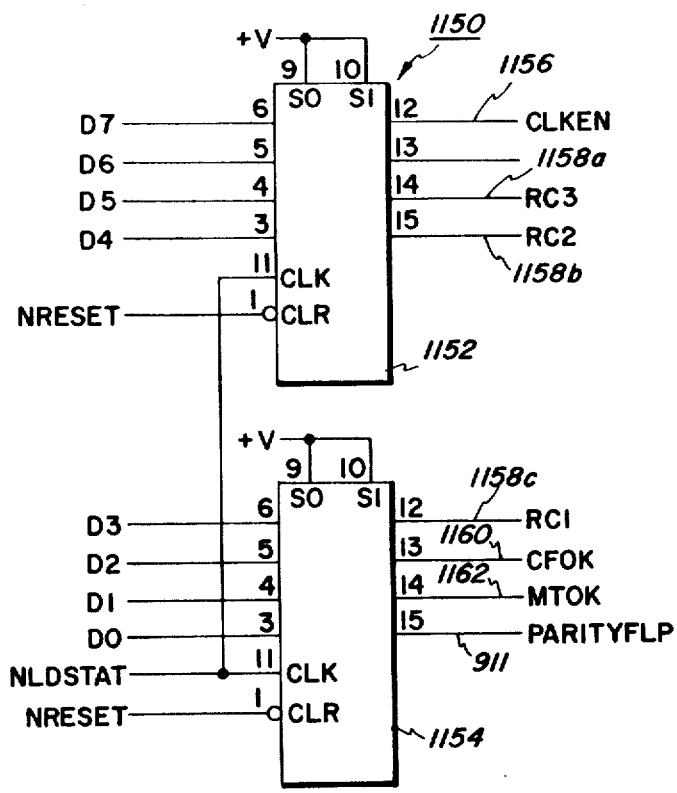
FIG. 17 is a schematic diagram of the status write register utilized in the master I/O interface.

The master I/O interface 4 may be utilized to provide status information to the master microprocessor 300 and additionally to write certain status data for controlling the operation of the MACS system. FIG. 17 illustrates a status write register 1150 which comprises two four bit shift registers (model no. 74194) utilized to store status bytes from the master data bus 414. Bits D7-D4 are fed to four bit register 1152 and bits D3-D0 are fed to four bit register 1154. Each register is clocked to load data bits D0-D7 from the data bus by means of the NLDSTAT signal (the load status signal) coming from NOR gate 1136 of the register decoder shown in FIG. 16. The select terminals S0 and S1 of each of the registers 1152 and 1154 are maintained at a logical 1 level so that data on the output lines follows the input line data on a positive transition of the clock pulse. Each register 1152 and 1154 is reset initially by the NRESET signal during a power-up sequence. The output of registers 1152 and 1154 are seen to correspond to Table 3 wherein the various status write bits are defined. The CLKEN signal along line 1156 is fed to NAND gate 974 of FIG. 11 and inhibits the area shift clock signal ASHFTCLK along line 428 to the area controllers if CLKEN is a logical 0.

Figure 9B:
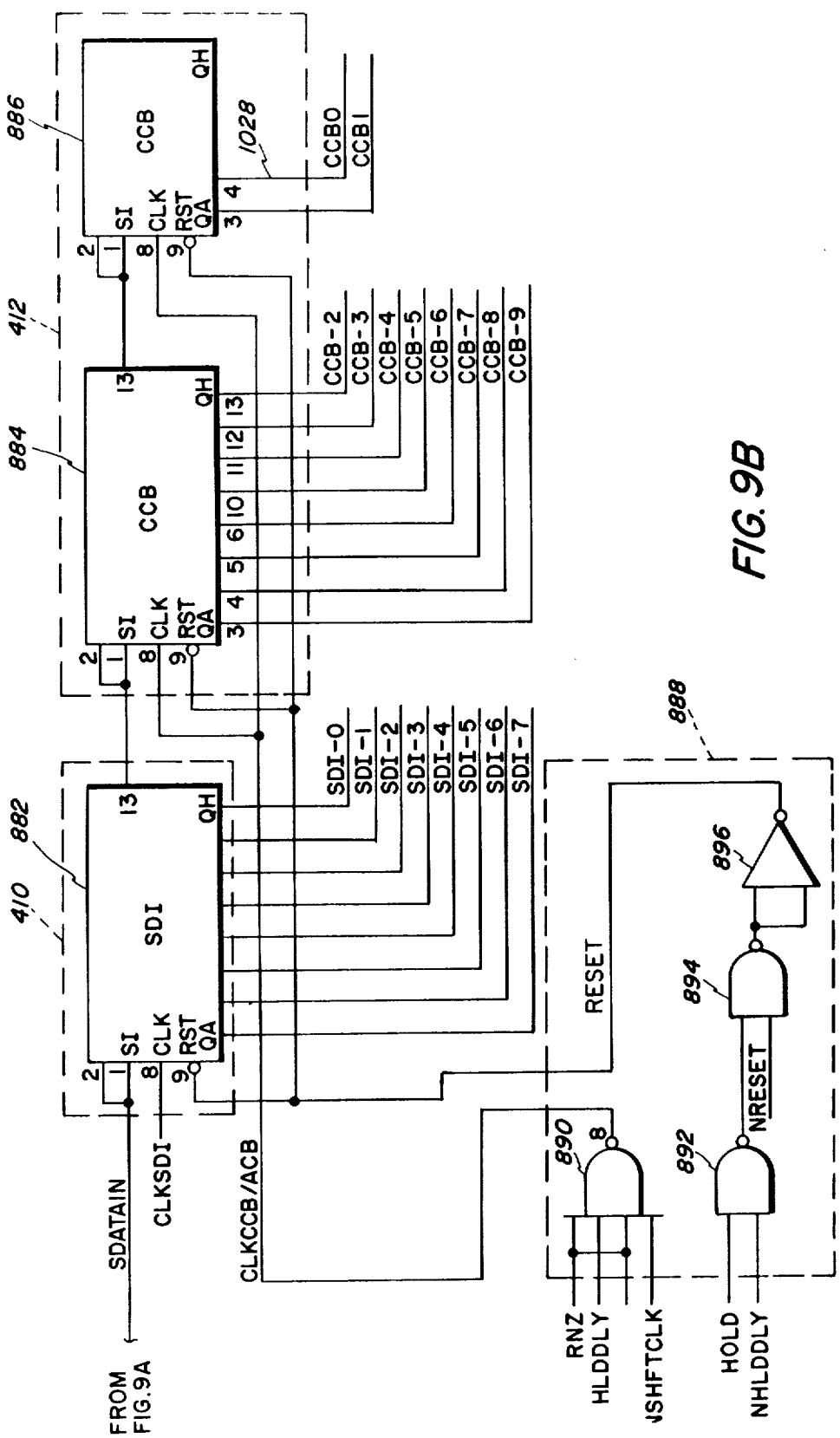

Receiver control bits RC3-RC1 are provided on output lines 1158a-c of registers 1152 and 1154, and are fed to the register select inputs of multiplexer 406 of FIG. 9. The signal CFOK along line 1160 and MTOK along line 1162 are used in area controller and master controller diagnostic tests and are fed to power LED displays on a control panel (not shown) to provide the operator with an indication of a successful diagnostic test as controlled by the diagnostic software. The parity flip (PARITYFLP) signal along line 911 is fed to an input of odd/even parity generator 900 of FIG. 10 as set forth above. The values in registers 1152 and 1154 drive the output lines until these registers are reset when the NRESET pulse goes to 0 or until a new Status Write Byte is generated along the data lines D0-D7 and loaded into the status write register via the NLDSTAT decode from the write status instruction.

Figure 18A:
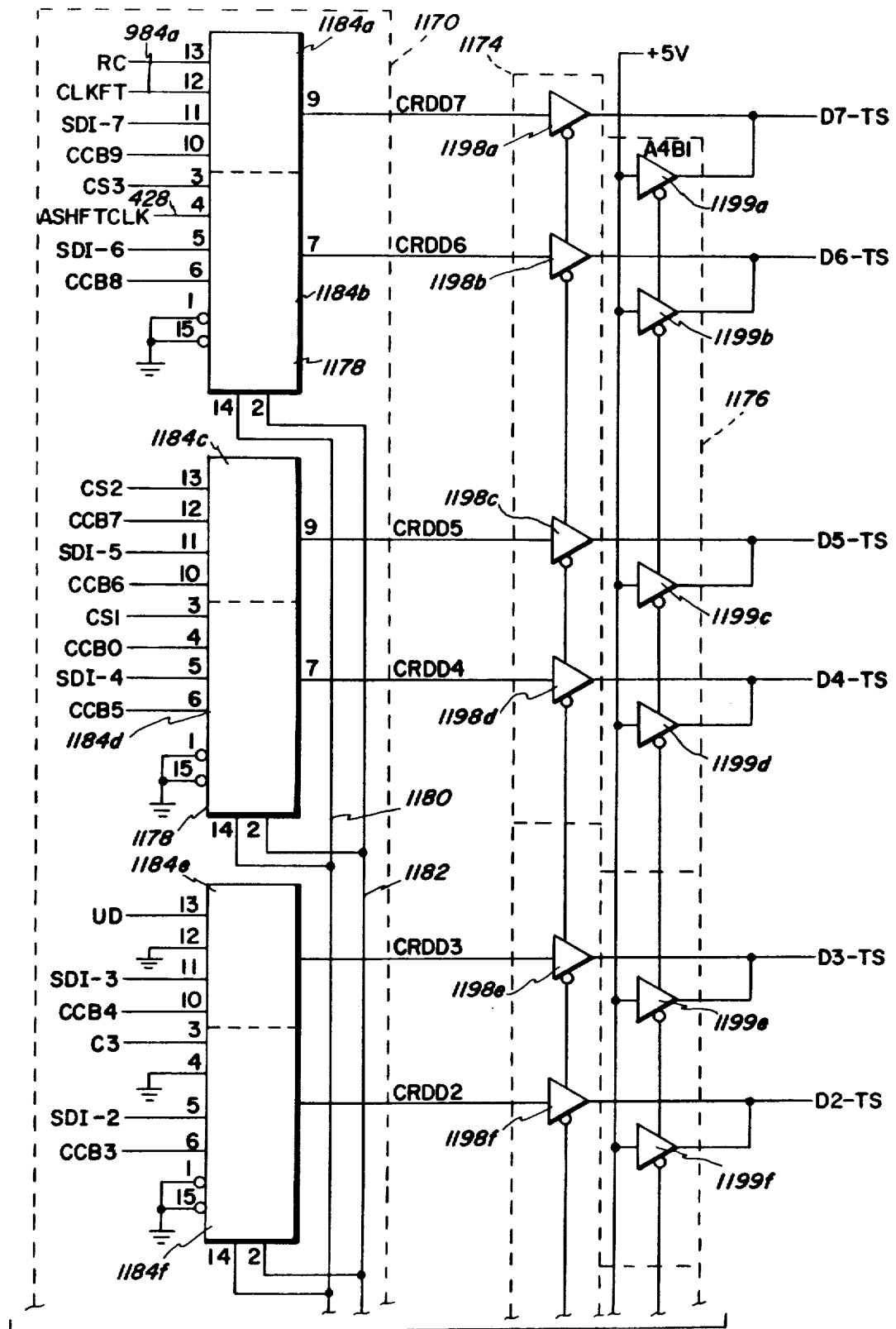

The status read function is implemented by means of an input multiplexer and control logic as shown in FIG. 18. In addition to status information, the input multiplexer and control logic of FIG. 18 is used to effect the reading of the MCB register 416, SDI register 410 and CCB register 412. FIG. 18 illustrates an input multiplexer 1170 coupled to control logic 1172 and tri-state driver arrays 1174 and 1176. The output of each tri-state driver array is connected directly to the tri-state master data bus as indicated by data lines D0-TS through D7-TS. The input multiplexer 1170 essentially comprises eight separate multiplexers, each a four-to-one data selector designated 1184a-1184h. The eight data selectors may be implemented by four model no. 74153 multiplexers operable with the input strobe lines tied to ground and the input select terminals connected to the control logic 1172 via lines 1180 and 1182. Line 1180 controls the select A multiplexer input whereas line 1182 is connected to the select B input. Data selector 1184a has four inputs identified as RC (reserve command), CLKFT, SDI-7 and CCB9. These four inputs correspond to (1) the reserve command bit of the MCB register (see FIGS. 5 and 8); (2) the CLKFT bit of the Status Read Byte (see Table 2) derived from line 984a of the clock generator 426 of FIG. 11; (3) the SDI-7 or seventh bit of the SDI register 410; and (4) CCB9 or the ninth bit of the CCB register 412. In a similar fashion data selector 1184b has four input signals corresponding to bit CS3 of the MCB register, clock signal ASHFTCLK (area shift clock) from line 428 of the clock generator, SDI6 data bit from the SDI register and CCB8 data bit from the CCB register. Similarly labeled lines are shown for the remaining data selectors 1184c-1184h so that the groups of lines allow an input read operation from the MCB register, status read operation, SDI register and CCB register respectively.

Control logic 1172 comprises NOR gates 1190 and 1192 and NAND gates 1194 and 1196. NOR gate 1190 provides an output decode for the select A terminal of the multiplexers 1178 whereas NOR gate 1192 provides the select B input signal. The input data enable function is provided by the NENINDATA signal as an output of NAND gate 1194. This signal is fed as the control input to the tri-state driver array 1174 comprising individual tri-state drivers 1198a-h. If the NENINDATA signal is high, the tri-state driver outputs are in the high impedance state whereas if the NENINDATA signal is low, the tri-state driver outputs follow the logical input signal thereto. Consequently, the NENINDATA signal is conditioned by: the address decode indicating a master I/O interface address (AHERE), a memory read function of the CPU (MEMREAD), a power normal condition (PN) and a DBIN (data in) signal which is the memory input strobe provided by the master microprocessor 300 (see FIG. 7). A low signal for the NENINDATA signal consequently allows the output of the tri-state driver 1198a-h to follow their input logical signals to put the appropriate data on the master data bus.

Tri-state driver array 1176 comprises a plurality of tri-state drivers 1199a-h each driver controlled by the NENINTADR signal representing the enable interrupt address signal fed as an output from NAND gate 1196. The enable interrupt address signal is utilized to place an address vector on the data bus for restarting the program sequence after an interrupt has been received. Effectively, the master microprocessor 300 has a single interrupt line which is tied to the machine clock via line 370 (FIG. 3). Upon receipt of the interrupt signal, the CPU initiates an interrupt acknowledge signal as part of status information placed on the master system bus along data lines D0-D7. The interrupt acknowledge I/O (INTAIO signal) is derived from the interrupt acknowledge signal and utilized to provide a restart address of 11111111 by tying the input to the tri-state drivers 1198a-h to a positive or high potential and driving the inverted control lines thereto low (NENINTADR signal low). This procedure will restart the system program after an interrupt has been received and acknowledged. The master microprocessor 300 would then proceed to read the instruction at location 11111111 which would be the restart address following the interrupt.

Interrupt Flip-Flop

Figure 19:
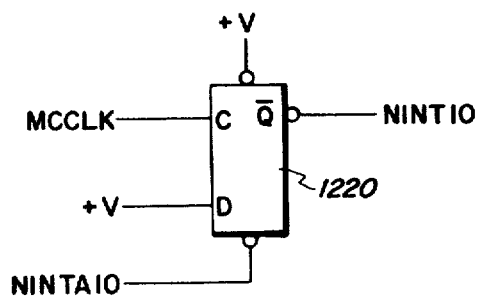
FIG. 19 is a schematic diagram of the interrupt flip-flop.

The machine clock signal MCCLK is fed from the active area controller 12 (see FIG. 3) via a fiber optic link 370 to the machine clock flip-flop 1220 as shown in FIG. 19. The $\overline{Q}$ output of flip-flop 1120 provides an interrupt I/O signal NINTIO which is fed as the interrupt signal to the master microprocessor 300. Flip-flop 1220 is reset or cleared by the NINTAIO signal from the microprocessor (FIG. 7). Consequently, the master microprocessor 300 is interrupted at each machine clock pulse. The machine clock pulse MCCLK is synchronized by means of a phase lock loop circuit to the rotation of the photographic drum, and once synchronized has a clock rate of 800 Hz. At each interrupt signal the master microprocessor proceeds to poll the various area controllers to refresh output data latches and to read input data and perform additional calculations and decision making processes.

Area I/O Interface

Figure 21:
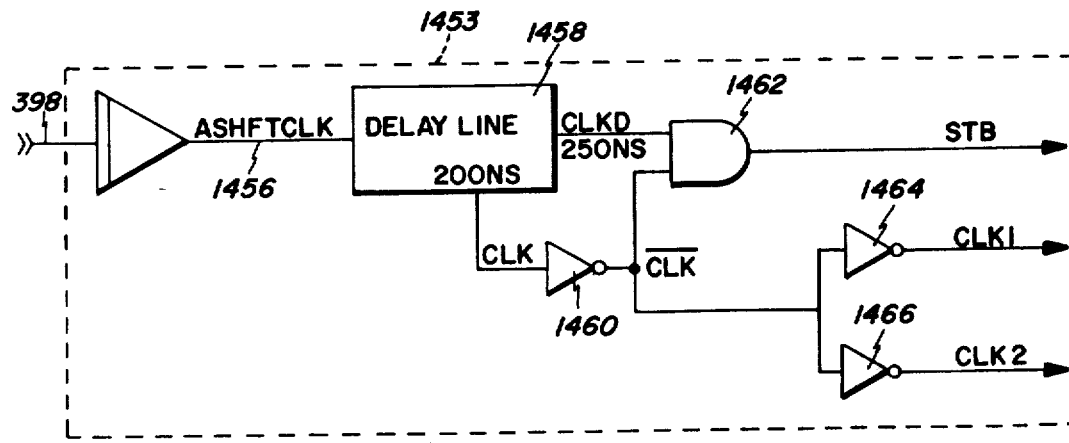
FIG. 21 shows the clock generating circuitry utilized in the area controllers.
Figure 20A:
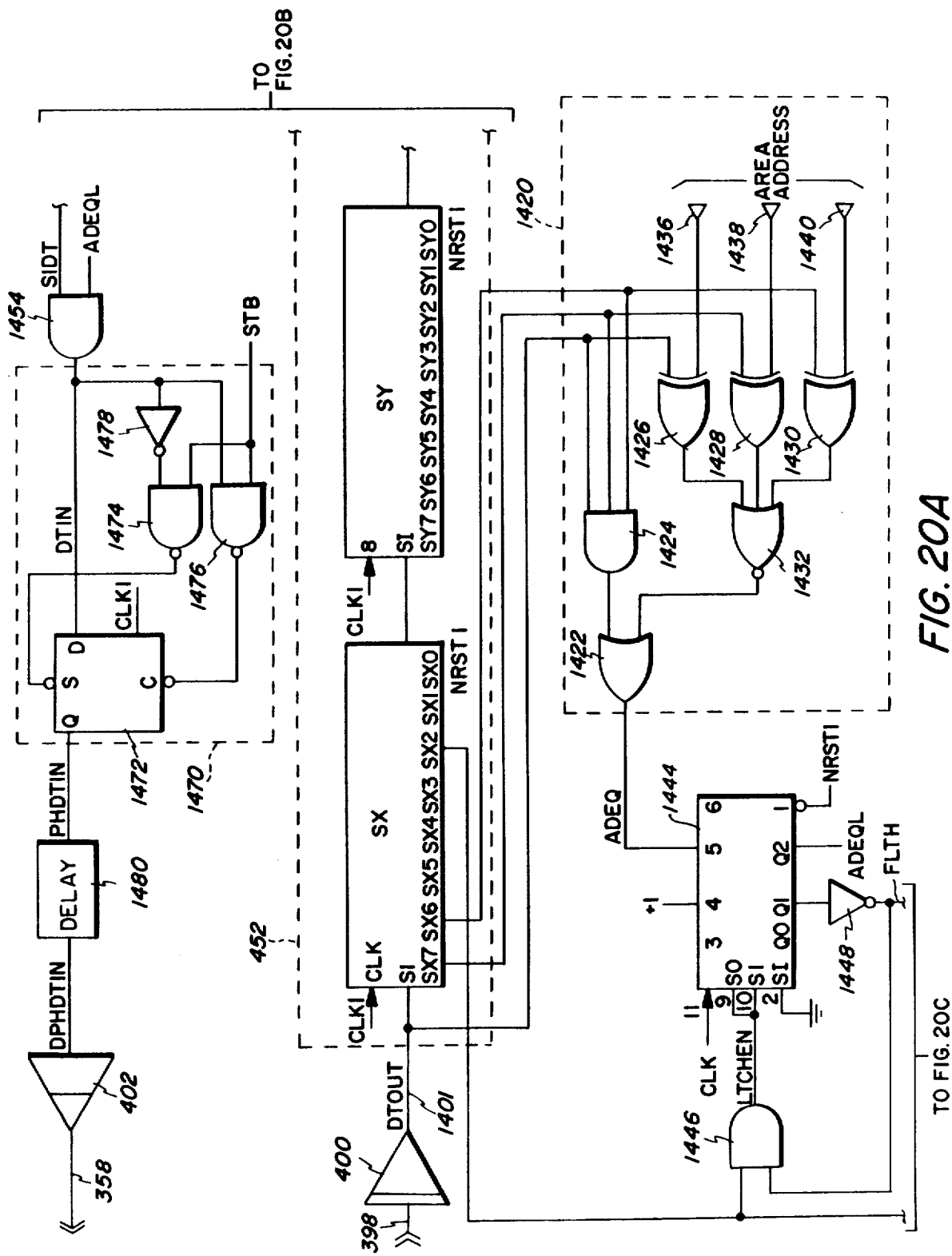
FIGS. 20A-20C show schematic diagrams of the key input and output registers and control logic for the area controllers.
Figure 20B:
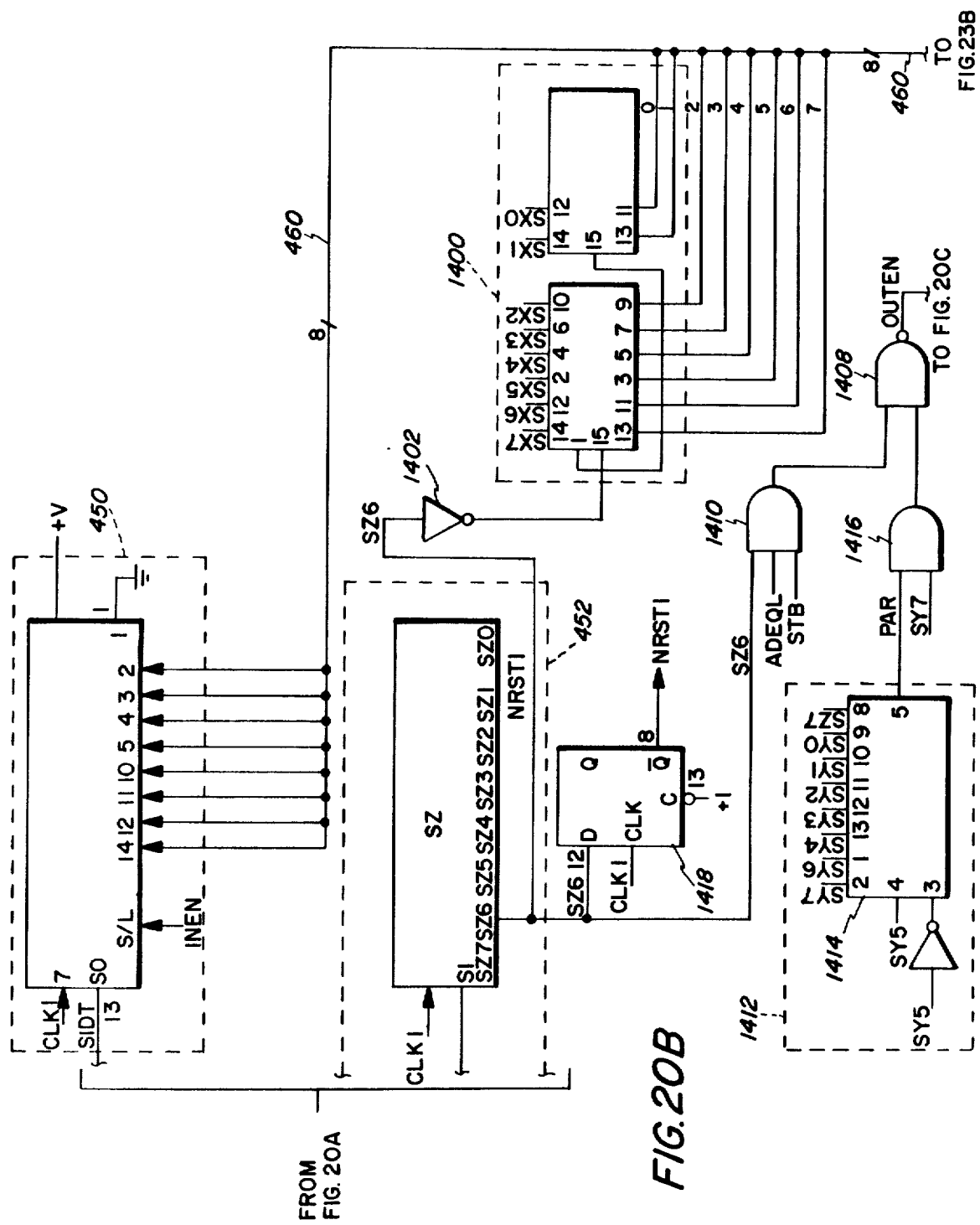
Figure 20C:
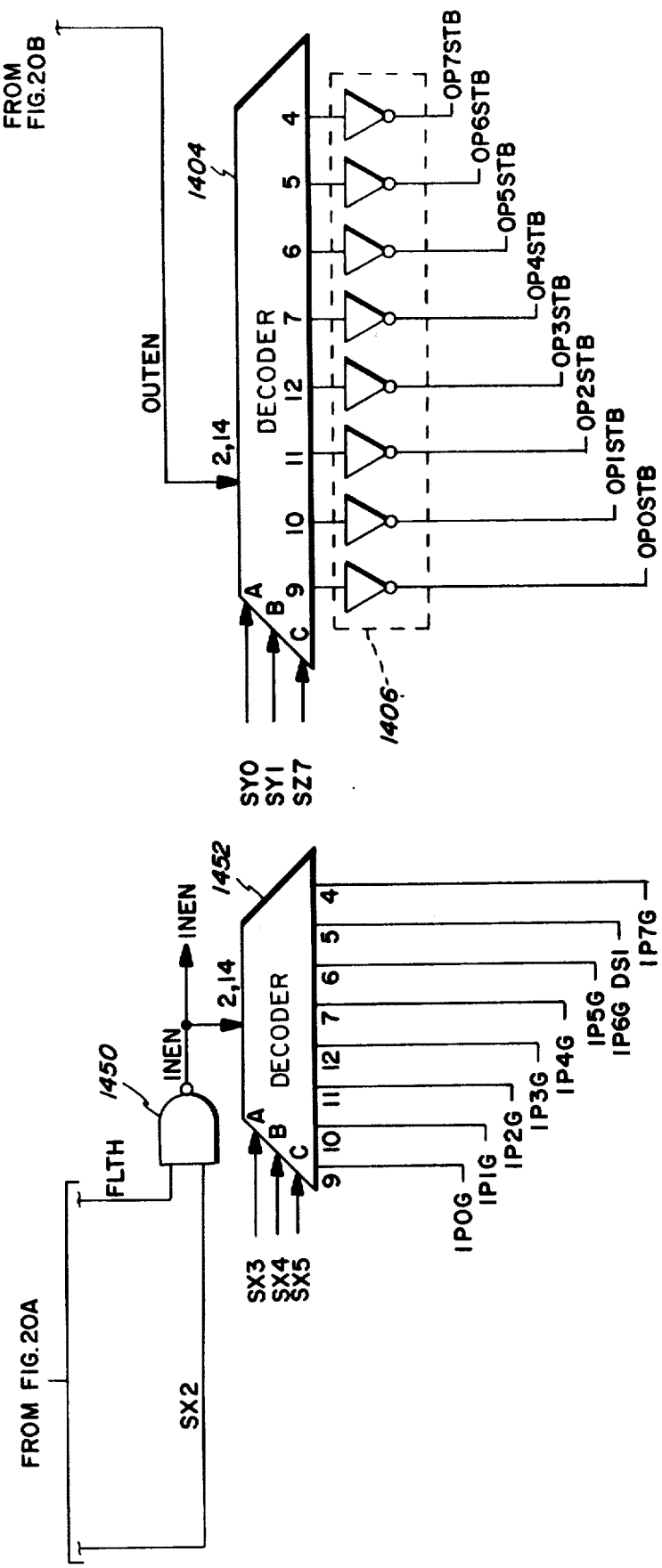
Figure 22:
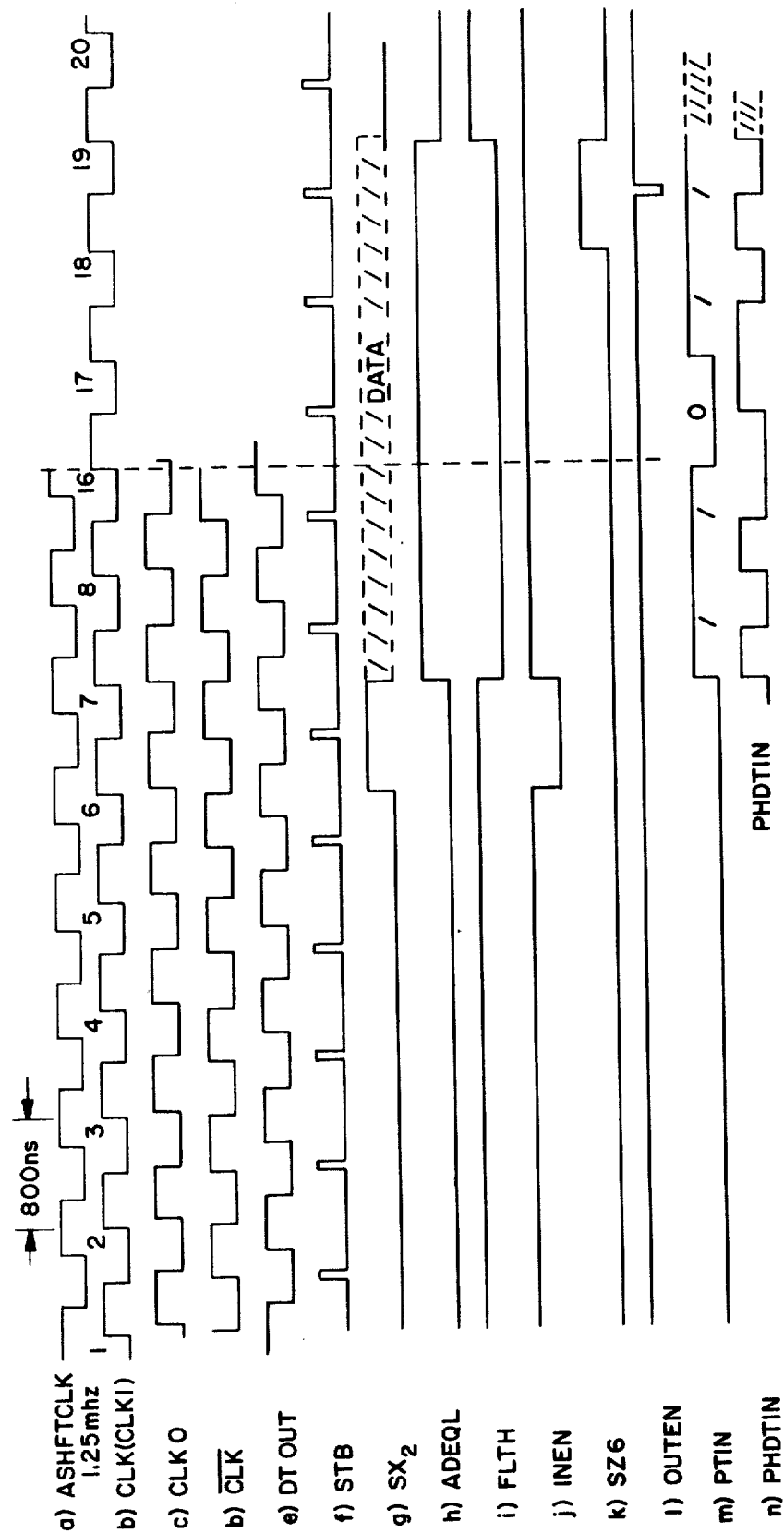
FIG. 22 is a timing diagram showing the timing sequence of data within the area controller.

The area I/O interface 340 is shown in detail in FIGS. 20 and 21. A functional timing chart showing the various control and timing signals used in the area controller interface is illustrated in FIG. 22. Output data from the master I/O interface 4 is fed via the fiber optic interconnecting links 398 of the MACS channels 16 to each of the area controllers 6-14. The apparatus shown in FIGS. 20 and 21 are common to all of the area controllers regardless of whether they are active or passive units. Data Out Bytes from the master I/O interface 4 are received via receiving amplifier 400 and fed to area output register 452. Area output register 452 may comprise for example three shift registers SX, SY and SZ, each an eight bit serial shift register providing parallel outputs as for example model no. 74164. The parallel outputs of register SX are termed SX0-SX7 and similar nomenclature is utilized for registers SY and SZ. The Data Out Byte (bits L1-L8 of FIG. 6) from the SDO register 418 of the master I/O interface 4 appears in register SX when the ST bit has been shifted into output stage SZ6 of register SZ. The output data in register SX is strobed to the area I/O tri-state bus 460 via buffer 1400 comprising two model 8097 HEX buffers. The buffers are strobed by a logical "1" (the ST bit) appearing on output SZ6 of shift register SZ via inverter 1042. Once the data has been placed on area I/O tri-state bus 460 it is necessary to properly channel this data to a selected output port. For this purpose, a three line-to-eight line decoder 1404 is provided (model no. 74155) with inverting array 1406 to generate output strobes OP0STB-OP7STB to one of eight possible output ports via strobe lines similarly labeled. The select inputs A, B and C of decoder 1404 are fed directly from outputs SY0 and SY1 of register SY and output SZ7 of register SZ. The decoder 1404 is strobed by an output enable signal OUTEN from NAND 1408. The timing is such that the output enable signal is generated at the selected area controller when the Byte Address bits C1-C3 are present in outputs SZ7, SY0 and SY1 of the area output register 452. In order to insure that only the selected area controller is operative to transmit or receive data, each area controller is provided with means to decode the Channel Select bits CS1-CS3 to ascertain whether its own internal address matches the designated code of the Channel Select bits. If such a match does in fact occur for the particular area, an address equal latch signal, "ADEQL", is generated (set to 1) and provided as a condition signal for the out enable OUTEN strobe to the decoder 1404. Thus, an AND gate 1410 is shown connected to receive the ADEQL signal as well as the output SZ6 signal from the sixth output stage of register SZ. An additional input to AND gate 1410 comes from the strobe signal STB provided from a clock generator described in FIG. 21 below. If the SZ6, ADEQL and STB signals are all present at the same time a high output is provided at the output of AND gate 1410 which is fed to the upper input of NAND gate 1408. The lower input of NAND gate 1408 is used to condition OUTEN by a parity check on the command word and is provided with a high input signal from parity checking circuit 1412 if no parity errors have occurred. Parity checking circuit 1412 comprises odd/even parity generator 1414 configured similarly to odd/even parity generator 900 of FIG. 10. The inputs of the parity generator 1414 are register outputs SZ7, SY0-SY7 corresponding to Byte Address C1-C3 and Channel Select bits CS1-CS3. The output of the parity generator 1414 is significant only when a "1" bit is present at the output SZ6 which occurs as a result of the ST, start transmission, pulse. Only when bit ST is at the output SZ6 will AND gate 1410 provide a logical 1 output (provided also that the other conditioning signals are true), inasmuch as registers SX, SY and SZ are reset after each data transmission so that SZ6 output is a 0 during shifting of new output data bytes. Consequently, the first (and only) logical "1" signal is generated at SZ6 by the ST bit of the data word. The output of the parity checking circuit 1412 is fed to one input of NAND gate 1416 having its second input supplied by output SY7 of register SY. When the start transmission pulse ST appears at the output SZ6 of register SZ the R/D (read/duplex mode bit) appears at the output SY7. Thus, the AND gate 1416 imposes a condition that a duplex operation must be demanded by the master unit 1 (R/D=1) in order for the output of AND gate 1416 to be a logical 1. The logical 1 output from AND 1416 is fed to the lower input NAND gate 1408. A simultaneous logical 1 on the upper input of NAND gate 1408 results in the output enable signal, OUTEN, being low as required to strobe the decoder 1404 for a write or output function.

After the data word from the master controller has been shifted into registers SZ, SY and SX in the position such that the ST bit is provided on output SZ6 of register SZ, the next successive clock pulse will reset registers SX, SY and SZ and a new data word will be ready to be received and shifted into the area output register 452. The means for resetting the shift registers SX, SY and SZ is a D flip-flop 1418 having its D input supplied by the SZ6 output. The reset signal NRST1 is derived from the Q output of the flip-flop. The flip-flop is clocked by clock CLK1 signal which is the same signal used to shift the data in the area output registers 452. The master I/O interface 4 will generate an Area Command Byte followed by a Data Output Byte as depicted in FIG. 6. After bit L8 of the Data Out Byte, a zero bit is generated as the next bit to separate a subsequent transmission which also will comprise an Area Command Byte and a Data Output Byte. In the area controllers, D flip-flop 1418 will reset registers SX, SY and SZ in between every data transmission. Thus, while a new ST bit is being first shifted into the SX registers, the preceding upstream stages of registers SZ, SY and SX will be logically 0. When SZ6 is a 0 the $\overline{Q}$ output of flip-flop 1418 goes to a logical 1 preventing any further reset of registers SX, SY and SZ. Once the ST bit has entered the SZ register and is shifted into stage SZ6, the next succeeding clock pulse (CLK1) will shift the logical 1 output of SZ6 from the D input terminal of flip-flop 1418 to produce a logical 0 output of the $\overline{Q}$ terminal of flip-flop 1418. This low Q outut is the NRST1 reset signal which asynchronously clears all of the registers SX, SY and SZ. Thus the clearing of the area output register 452 is accomplished during the clock time in which the ST bit would be shifted from stage SZ6 to SZ5 of the SZ register. The data output bit streams are separated by a zero bit in order to insure that no bits of a subsequent data transmission sequence are lost due to the resetting of the area output register 452.

In order to generate the address equal latch signal (ADEQL) decode circuit 1420 is provided having inputs responsive to output SX6, SX7 and input line 1401 to register SX. The decode circuit 1420 is essentially always providing a decode signal as an output ADEQ of OR gate 1422. However, the only time in which the particular ADEQ (address equal) signal is significant is when output SX6 corresponds to Channel Select bit CS1, output SX7 corresponds to Channel Select bit CS2 and the input line signal to register SX corresponds to Channel Select bit CS3. This correspondence occurs when the start transmission bit, ST, is in output SX2 of register SX.

Decode circuit 1420 further comprises AND gate 1424, exclusive OR gates 1426, 1428 and 1430, and NOR gate 1432. One input to each of the exclusive OR gates 1426, 1428 and 1430 is supplied by a hardwire input terminal 1436, 1438 and 1440 respectively wired to provide either a logical 0 or 1 output. As a result of the decode logic, the ADEQ signal from the output of OR gate 1422 is a logical 1 only when the address of the particular area controller in question corresponds to or matches the Channel Select bits CS1-CS3.

As mentioned above, it is only significant to examine the ADEQ signal when the ST bit is in output SX2 of the SX register. This condition is implemented by means of a four bit shift register 1444 operable in the parallel load/parallel output mode (model no. 74194). The select mode terminals S0 and S1 of register 1444 are tied together and supplied by an AND gate 1446 having its upper input connected to receive the SX2 output from register SX and its lower input connected to receive the Q1 output of register 1444 via an inverter 1448. A clock signal is provided from the clock generating circuit as shown in FIG. 21 and the reset signal is provided by NRST1 as an output of flip-flop 1418.

In operation one may initially assume that register 1444 as well as register SX have just been reset by NRST1. Thus, both output SX2 and the Q1 output of register 1444 are logical 0's. The output of inverter 1448 is consequently a logical 1 and is fed to the lower input of AND gate 1446. However, the upper input of AND gate 1446 is a 0 until the ST pulse is shifted into output SX2 of register SX. Consequently, as long as the upper input of AND gate 1446 is 0 its output will be 0 as will be select modes S0, S1 of register 1444. The output of AND gate 1446 is termed the latch enable signal LTCHEN and whenever this signal is low the output Q1 and Q2 of register 1444 will be retained in their prior state irrespective of the number of clock pulses received on input CLK. As soon as the ST pulse reaches output SX2 the latch enable LTCHEN signal from AND gate 1446 goes high which allows the input data to register 1444 to be shifted to the Q1 and Q2 output stages on the next succeeding clock pulse. As a consequence, output terminal Q2 of register 1444 assumes the value of the ADEQ signal at a time when output SX2 first goes to a logical 1. If the ADEQ signal is high then ADEQL will be high and vice versa. The ADEQL output signal is latched at terminal Q2 of register 1444 inasmuch as the latch enable signal, LTCHEN, is removed by the logical 1 appearing at terminal Q1 of register 1444. This logical 1 is supplied by the hardwire logical 1 input to register 1444 which feeds the Q1 output terminal. When the output terminal Q1 is logically 1 a logical 0 is fed to the input of AND gate 1446 which forces LTCHEN to a logical 0 latching the output terminals Q1 and Q2 of register 1444. The data will remain latched until a new reset signal NRST1 is supplied via flip-flop 1418.

For the particular area controller selected by the Channel Select bits CS1-CS3, the ADEQL signal will be a logical 1 and data may be directed from the area I/O TS bus 460 of the selected area controller into the selected output port as strobed by AND gate 1408 which is conditioned by the ADEQL signal (among others).

The inverse signal of the ADEQL signal is the FLTH signal from inverter 1448. The FLTH signal is used for controlling Input Data Bytes from the area controller to master I/O interface 4. When ADEQL goes high, FLTH goes low. This low is supplied as the upper input to a NAND gate 1450 forcing the output of NAND gate 1450 to a logical 1. The lower input of NAND gate 1450 is tied to receive output SX2 from register SX. The output of NAND gate 1450 is the INEN or in-enable signal and is fed to a decoder 1452 (model no. 74155) similar to decoder 1404. The select terminals of decoder 1452 are provided by outputs SX3, SX4 and SX5 of register SX. Inasmuch as the INEN signal is a logical 1 only when the start transmission, ST, bit appears in output SX2 of register SX, the input select terminals SX3-SX5 to decoder 1452 will correspond at this time to the Byte Address C1-C3 respectively. The outputs of decoder 1452 control the strobing of input data to be fed from the selected area controller to the master I/O interface 4. The output lines from decoder 1452 are thus essentially input select lines and control the buffers for the input ports. The lines and strobe signals are labeled IP0G-IP5G, IP6DS1 and IP7G. Input port 6 is treated somewhat differently as is apparent from the designation of the input ports select line inasmuch as input port 6 (IP6) is reserved for area microprocessor use by those area controllers which are active. Essentially, data is latched to the input port designated for area microprocessor use whereas data is simply buffered into input ports not dedicated to area microprocessor use. (Data is always buffered into passive area controller input ports.)

Once data has been placed on the area I/O TS bus 460 for transmission to the master controller, the data must be strobed into an area input register 450 as shown in FIG. 20B. The INEN signal is utilized to first parallel load the data onto the tri-state bus 460 and into input register 450 and subsequently to allow a serial shift to the data through the register 450 onto the MACS channels 16. Area input register 450 may comprise, for example, an eight bit shift register, model 74166. The shift-/load terminal to area input register 450 is fed by the INEN signal which is initially a logical 1 and goes to a logical 0 only when SX2 goes high upon the occurrence of the ST bit. As a consequence, while SX2 is a logical 1 data is loaded into area input register 450 and the next clock pulse forces INEN to 0 to permit parallel shifting of the data through and out of the area input register 450.

Input data into the master controller is supplied in serial fashion by the area input register 450 conditioned by the address equal latch signal ADEQL via an AND gate 1454. The lower input of AND gate 1454 is supplied by the ADEQL signal whereas the upper input is fed from the output of the area input register 450. As a result, data is continuously being shifted out of the area input register 450 but none of this data is effectively passed to the MACS channels 16 unless the ADEQL is a logical 1 corresponding to the condition that the particular area in question has been selected from the decode circuit 1420. The input data (input for the master I/O interface 4) is fed from the AND gate 1454 to a phase encoding circuit 1470 which comprises "D" flip-flops 1472 (model no. 7474), NAND gates 1474 and 1476 and inverter 1478. The phase encoded input data PHDTIN, is then passed to a delay network 1480 to provide delayed data signals DPHDTIN which are delayed to provide near center of pulse strobing into the master I/O controller CCB and SDI registers.

FIG. 21 illustrates the clock generator 1453 which forms part of the control logic 454 of FIG. 4. Clock generator 1453 receives the ASHFTCLK signal from line 428 of the master I/O interface 4 (FIG. 11). These clock signals are fed along line 1456 to a delay network 1458 and output signals are taken at 200 ns and 250 ns delay as illustrated. The clock generator 1453 is seen to comprise inverter 1460, AND gate 1462 and inverters 1464 and 1466. AND gate 1462 provides the STB signal to the lower input of AND gate 1410. The CLK1 signal from inverter 1464 is used to clock the area data-out register 452 (registers SX, SY and SZ), the area data-in register 450 and the reset flip-flop 1418. The CLK signal is used as an input to inverter 1460 and to clock the register 1444. It is noted that the pulse is delayed so that it appears approximately in the middle of an output pulse from the registers SX, SY and SZ as seen by comparing graph (f) with graph (g) depicting the SX2 output (FIG. 22).

Area Controller Operation

The operation of the area controller may be best described in relation to the timing chart of FIG. 22 taken in conjunction with the detailed circuits of FIGS. 20 and 21.

The area shift clock pulse ASHFTCLK from the clock generator 426 of FIG. 11 is received by the clock generator 1453 and passed along line 1456 into delay network 1458. The area shift clock, ASHFTCLK, is shown in graph (a) along with the CLK and CLK1 clock pulse shown in graph (b), the CLKD pulse or delayed clock pulse shown in graph (c) and the $\overline{CLK}$ pulse shown in graph (d). The phase encoded data out bit stream, DTOUT, is shown in graph (e), and, for purposes of illustration, it is assumed that the data out bit stream (command and data) is composed of logical 1's. Consequently, DTOUT is always in phase with ASHFTCLK, as may be seen by comparing graphs (a) and (e). The output data DTOUT is received into the shift register SX of the area output register 452 and is clocked in on the rising edge of clock CLK1. It is noted that the rising edge of CLK1 occurs in the middle of the high state of DTOUT as is desired to maximize data stabilization. The timing pulse STB is generated as shown in FIG. 21 from the $\overline{\text{CLK}}$ pulse ANDED with the delayed clock pulse CLKD. The CLK pulse is delayed 200 ns from the ASHFTCLK signal and the CLKD clock signal is generated 250 ns from ASHFTCLK. Consequently, the strobe STB is nominally 50 ns wide as shown in graph (f).

Graph (g) shows the SX2 output of shift register SX. The area output register 452 is reset between transmitted bit streams so that output SX2 of shift register SX will be a 0 until the rising edge of the 6th CLK1 pulse (hereinafter 6-CLK1). After the ST bit is provided at the output of SX2, the rising edge of the next clock pulse, 7-CLK1 is utilized to latch the Q outputs of the register 1444 so that the area equal latch (ADEQL) will be set if indeed the particular area has been selected by a match of the Channel Select bits CS1-CS3 with the internal address of the area controller. We will assume that such a match occurred. Consequently, as shown in graph (h), ADEQL is set to a logical 1 on the rising edge of 7-CLK1 inasmuch as 6-CLK1 enabled the register 1444 via AND gate 1446 and inverter 1448. The FLTH signal shown in graph (i) goes to a logical 0 at the same time that the ADEQL signal becomes a logical 1. As a result, the input enable signal, INEN, which is the output of NAND gate 1450 goes to a logical 0 between the 6-CLK1 and 7-CLK1 as shown in graph (j). The INEN signal low strobes the decoder 1452 to permit the selection of input data from any of eight input ports to be passed to the area I/O TS bus 460 for loading into the area input register 450. It is noted that the S/L select line for the area input register 450 is fed by the INEN signal so that at the same time INEN strobes decoder 1452 data may be parallel loaded from the area I/O TS bus 460 into the area input register 450. After the 7-CLK1, INEN signal goes high which permits the serial shifting of data in the area input register 450 via the rising edge of the next clock pulse CLK1 (namely 7-CLK1). As seen in FIG. 6, the data byte transferred into the master I/O interface 4 is timed such that this input data overlaps the output data byte being received into the selected area controller. The only information required to determine the Input Data Byte is the particular Byte Address information provided by bits C1-C3 conditioned of course by the decode circuit 1420 providing a high address equal signal (ADEQ) indicating that the particular area is the one being selected during this transmission.

At 7-CLK1, the Input Data Byte is shifted from the area input register 450 into the MACS channels 16 for reception by the master I/O interface 4. Prior to transmission, however, the input data is first ANDed with the ADEQL signal via AND gate 1454, phase encoded via phase encoding circuit 1470 and delayed by delay network 1480. The input data stream from AND gate 1454 is termed DTIN (prior to phase encoding), the phase encoded input data is termed PHDTIN and the delayed phase encoded data termed DPHDTIN. Under the assumption that the first five bits in the input data stream are a logical 11011, as an example of a "data-in" sequence, (actually eight bits are transmitted to form the Input Data Byte) graph (m) and graph (n) represent the output of the DTIN and PHDTIN respectively. It is seen that the phase encoding circuit 1470 will place logical 1 data bits in phase with the CLK1 clock signal and will place logical 0 data bits out of phase with the CLK1 clock signal.

While the area serial in byte is being transmitted to the master I/O interface 4, the data output byte is being shifted through the area output register 452. Graphs (a)–(l) have been broken in time sequence so that 16-CLK1 is shown to immediately follow 8-CLK1. Graphs (m) and (n) have not been broken. At time 18-CLK1, the output SZ6 of the SZ register goes high indicative of the fact that the ST, start transmission, pulse has been shifted therein. The output enable signal (OUTEN) is generated in part from AND gate 1410 when SZ6 is a logical 1 as well as ADEQL and STB. In time therefore the OUTEN signal is coincident with the STB signal inasmuch as ADEQL has already been set to a logical 1 at 7-CLK1. The OUTEN signal is utilized to strobe the decoder 1404 so that the area output port may be selected as dictated by the code on the select lines SZ7, SY1 and SY0. Simultaneous with data selection, the Output Data Byte as appears on outputs SX0-SX7 is transferred via buffer 1400 onto the area I/O TS bus 460. Output selection lines from inverting array 1406 are utilized to gate a particular selected output port latch to feed the data which appears on the area I/O TS bus 460. Consequently, the output data transfer to the particular output latch is completed during 18-CLK1. At this time, of course, the input data byte has already been completely shifted through the area input register since the last area input bit is shifted at a time 14-CLK1. The appearance of the logical 1 at the SZ6 output additionally generates the reset signal NRST1 which forces all outputs of the area output register 452 to a logical 0 at the next succeeding CLK1 pulse, namely, 19-CLK1. Consequently, graph (g) shows that at 19-CLK1 the output of SX2 is 0 as is the output of all stages of the area output register 452.

Port Structure

Figure 23A:
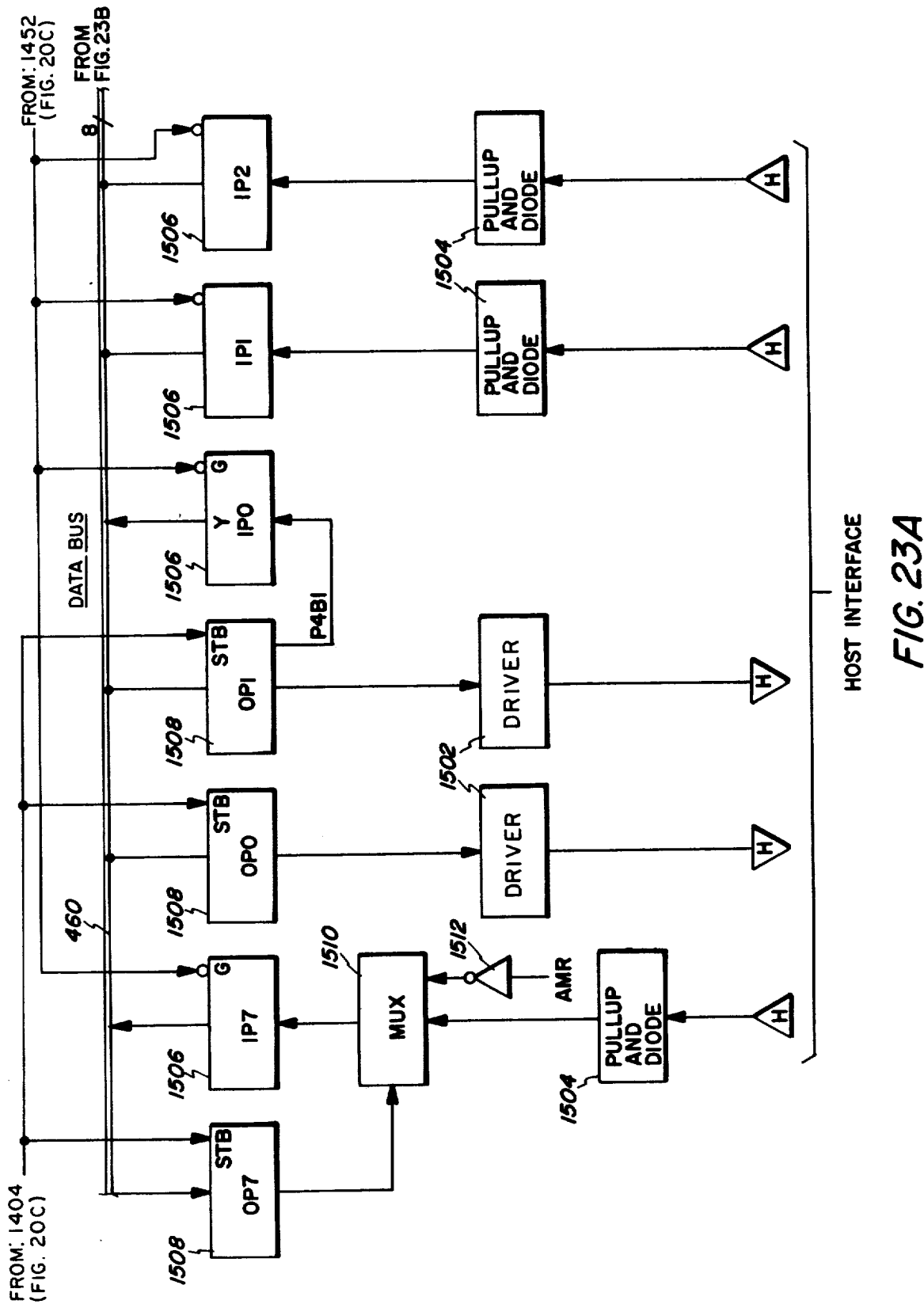
FIGS. 23A and 23B show input and output port connections between the host machine and the area controller.

FIG. 23 represents the general port structure for both passive and active area controllers. Shown interconnected to the area I/O TS bus 460 (from left to right in the drawing) are output ports OP7, OP0, OP1, OP5, OP6, OP2, OP3 and OP4. Output ports OP5 and OP6 are dedicated output ports connected in the active area controllers to an Area Data System bus 1500 (ADS bus) which forms the data bus portion of the Area System Bus 350 of FIG. 3. In the passive area controllers output ports 5 and 6 are connected to drivers 1502 for direct connection to the host interface (host machine switches, relays, sensors, etc.) as indicated by the triangle containing the letter "H". Output ports 2, 3 and 4 in passive area controllers have their inputs connected directly to the area I/O TS bus 460 as indicated in dotted lines. For active area controllers output ports OP2, OP3 and OP4 are connected to the ADS bus 1500 as illustrated by the solid interconnection lines. Each line from both the input and output ports actually consist of eight individual lines corresponding to data bits D0-D7.

In a similar fashion the input ports are shown in FIG. 23 interconnected to the area I/O TS bus 460 and to the ADS bus 1500. Input ports 3, 4 and 5 are connected to the ADS bus 1500 in active area controllers, and input port 6 is a dedicated input port from the ADS bus 1500 to the area I/O TS bus 460 on active area controllers. In passive area controllers IP6 is connected via a pull up and diode network 1504 to the host interface as are all of the host connected input ports in both active and passive area controllers. It is noted that all input ports with the exception of IP6, are implemented by means of tri-state buffers (National Model No. DM8097, for example) whereas input port 6 is a data latch wherein data is strobed in and out as demanded by the input and output control mechanism (the master microprocessor and the area microprocessor). For example, the data latch 1508 may be the Intel model no. 8212. In practice, all output ports are also data latches (model no. 8212), and all such latches which interconnect directly to the host interface are fed to drivers 1502 (as for example model no. 7406). Output port OP7 is shown interconnected to a multiplexer 1510 which feeds IP7 via a pull up network 1504. One input to the multiplexer 1510 is also supplied from an inverter 1512 which is fed by an Area Microprocessor Response signal (AMR signal) generated at the interrupt output of the data latch 1508 associated with input port 6. interrupts are also provided to the area microprocessor via two interrupt signals, one supplied from output port 5 and another from output port 6. Particularly, data latch 1508 of output port 5 provides an Area Microprocessor Attention-1 signal (AM-ATTN1) which is supplied by inverter 1514 to the tri-state buffer 1506 of input port 5. Similarly, data latch 1508 of output port 6 provides an interrupt signal called Area Microprocessor Attention-2 signal (AM-ATTN2) which is fed to the same tri-state buffer 1506 of input port 5 via an inverter 1516. These two attention bits are utilized to designate to the area microprocessor that data is ready in the data latch 1508 associated with output ports 5 and 6 to be read onto the ADS bus 1500.

It is pointed out that the data latches 1508 forming the output ports 5 and 6 are effectively "interrupting input ports" with respect to the area microprocessor/interface 348. As such, data may be strobed into the input terminals of these data latches via an input strobe signal STB (OP5 STB or OP6 STB) at which time an interrupt signal is automatically generated and may be utilized to interrupt the area microprocessor. The interrupt signals are termed AM-ATTN1 from output port 5 and AM-ATTN2 from output port 6. Data may be strobed from these data latches onto the ADS bus 1500 upon reception of a low signal at the DS1 device select terminal of the data latches 1508. For a more complete description of the data latches 1508 reference is made to the Intel 8212 data sheets as appear on pages 5-101 through 5-104 of the Intel 8080 Microprocessor System User Manual referred to above.

Area Microprocessor and Interface

Figure 24:
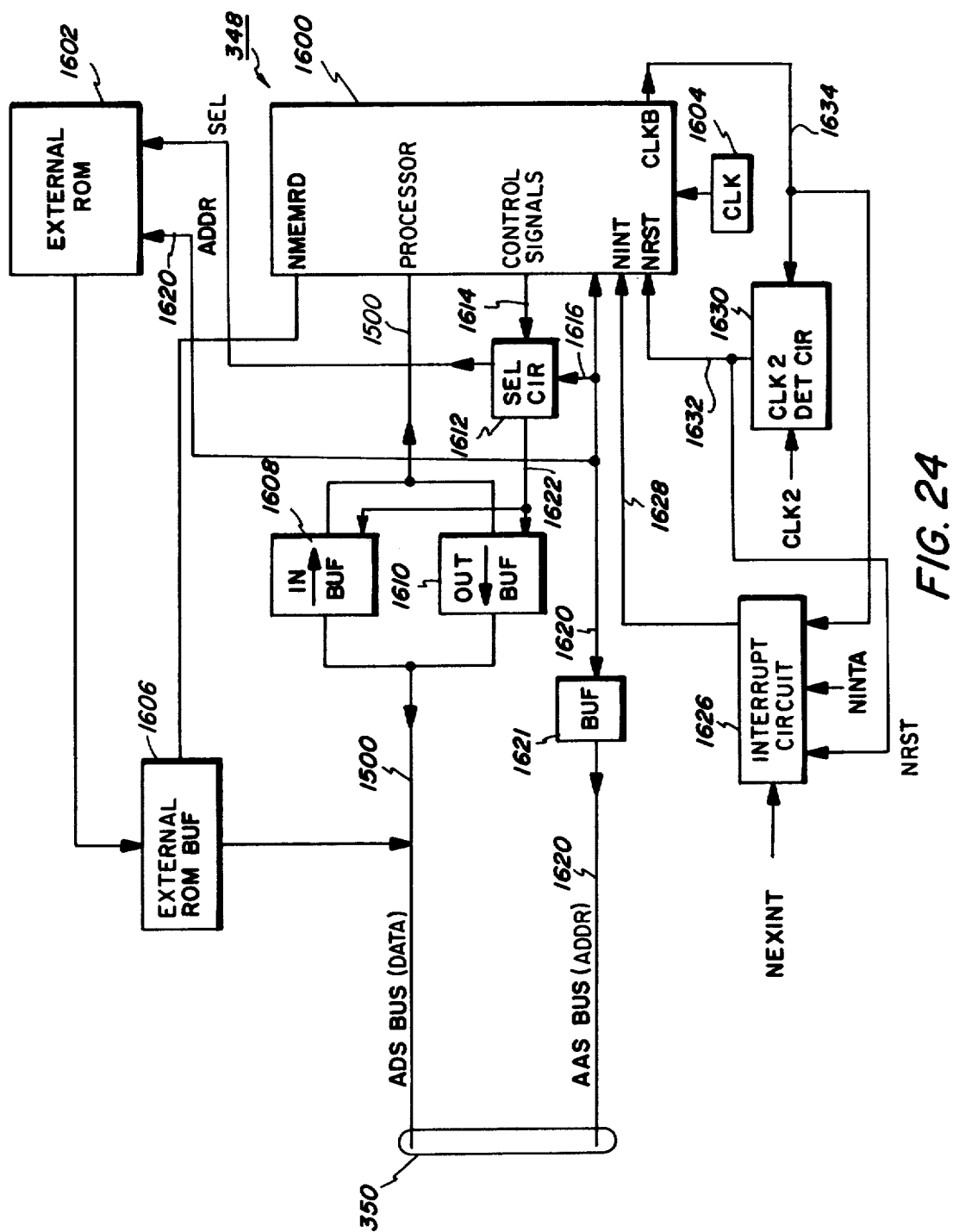
FIG. 24 shows a block diagram of the area microprocessor and its interface circuitry within the area controller.

A blocked diagram of the area microprocessor 348 showing its interconnection to the area system bus 350 is illustrated in FIG. 24. The area microprocessor/interface 348 comprises an area microprocessor 1600 which may be, for example, a single chip controller containing its own program ROM, scratch pad memory and clock generator as more fully described in copending application of Robert E. Markle et al entitled "Microcomputer or Digital Processor Chip", Ser. No. 814,065, filed July 8, 1977, assigned to Xerox Corporation and incorporated herein by reference. Further, it is evident that one may utilize other microprocessors in place of the area microprocessor 1600, as for example, the Intel 8080 utilized in the master controller 2. The area microprocessor/interface 348 further comprises an external read only memory 1602, clock generating means 1604 and a number of buffer units for data going into and out of the area microprocessor 1600 and data read out from the external ROM 1602. These buffer units are identified as external ROM buffer 1606, input buffer 1608 and output buffer 1610. The area microprocessor controls the input and output buffers by means of a selection circuit 1612 which receives a number of control lines 1614 from the area microprocessor 1600 and a number of address lines 1616 from the Area Address System bus (AAS bus) 1620. The AAS bus 1620 is a twelve bit address line identified as lines LADR0–LADR11. The ADS bus 1500 is an eight line data bus identified as DB0–DB7. The selection circuit 1612 provides output signals along lines 1622 to control each of the buffers 1608 and 1610 thereby controlling data to and from the area microprocessor 1600. Selection circuit 1612 also supplies selection signals to the external ROM 1602 which additionally receives part of the address lines from AAS bus 1620. The address lines of AAS bus 1620 are passed through buffers 1621 as shown.

The area microprocessor/interface 348 further comprises an interrupt circuit 1626 connected to a clock output CLKB of the area microprocessor 1600 and to additional control lines (NRST and NINTA) to provide an external interrupt signal which is synchronized with the area microprocessor clock (2 MHz). The interrupt circuit provides an interrupt signal along line 1628 to the area microprocessor 1600. A CLK2 detection circuit 1630 is also provided to detect the presence of the CLK2 signal from the area clock generator circuit of FIG. 21 within each area controller. If the CLK2 signal is not present, the detection circuit provides an NRST signal to the area microprocessor 1600 along line 1632 to maintain the microprocessor in a reset condition. The CLK2 signal would not, for example, be present during a power-off condition or a system malfunction. Both the interrupt circuit 1626 and the CLK2 detection circuit 1630 are supplied by the CLKB signal from the microprocessor via line 1634.

Figure 25A:
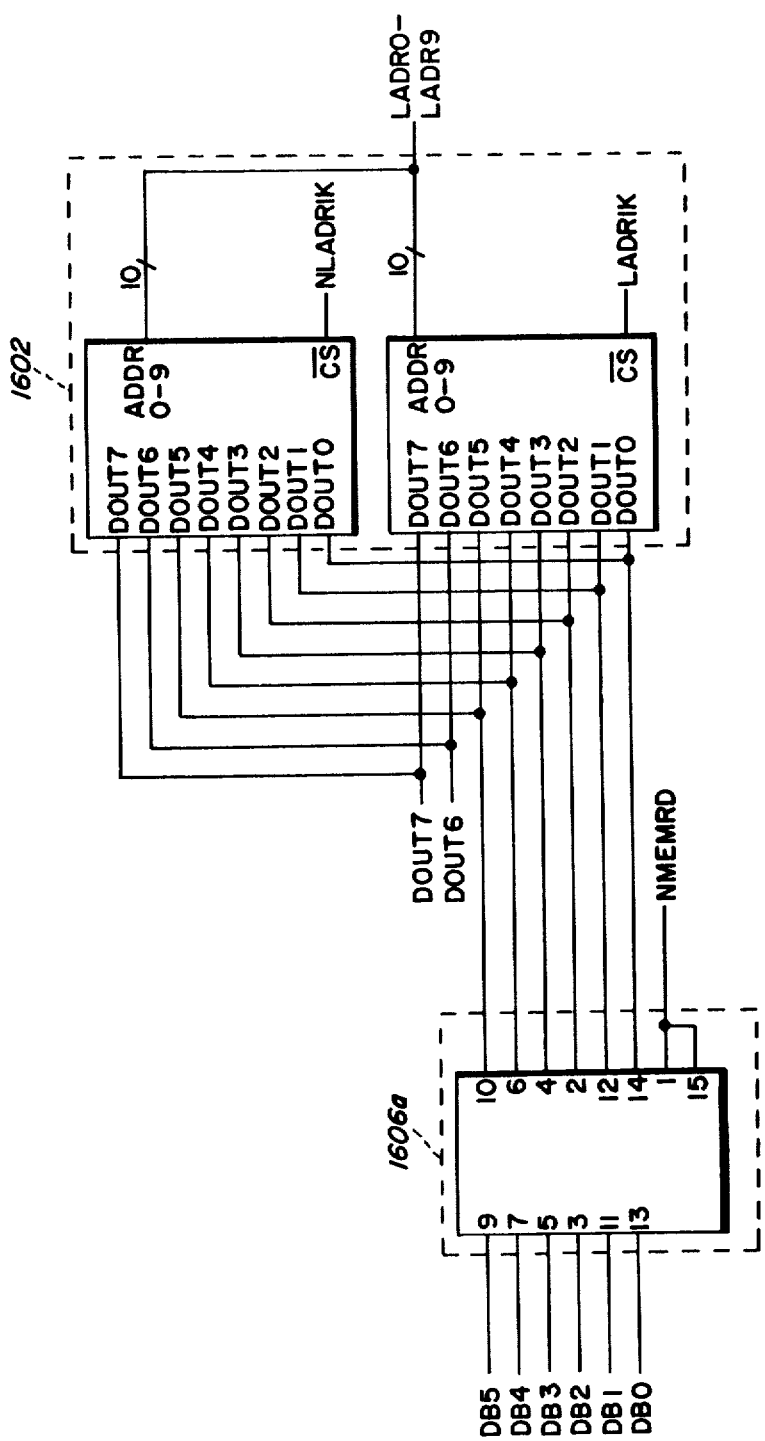
FIG. 25A is a block diagram showing details of the area microprocessor external memory.
Figure 25B:
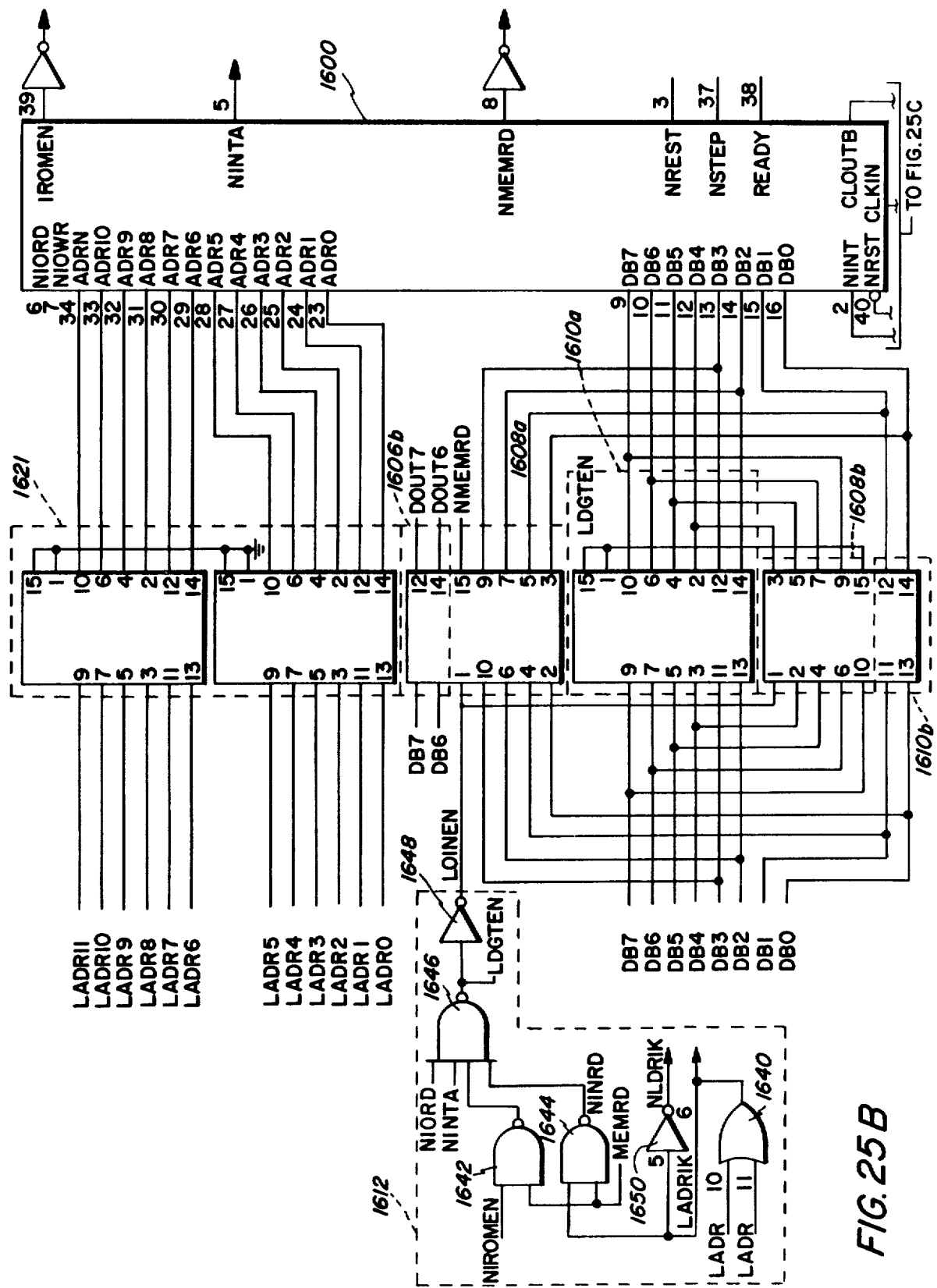
FIG. 25B is a block diagram showing details of the I/O buffers and selection circuit for the area microprocessor.
Figure 25C:
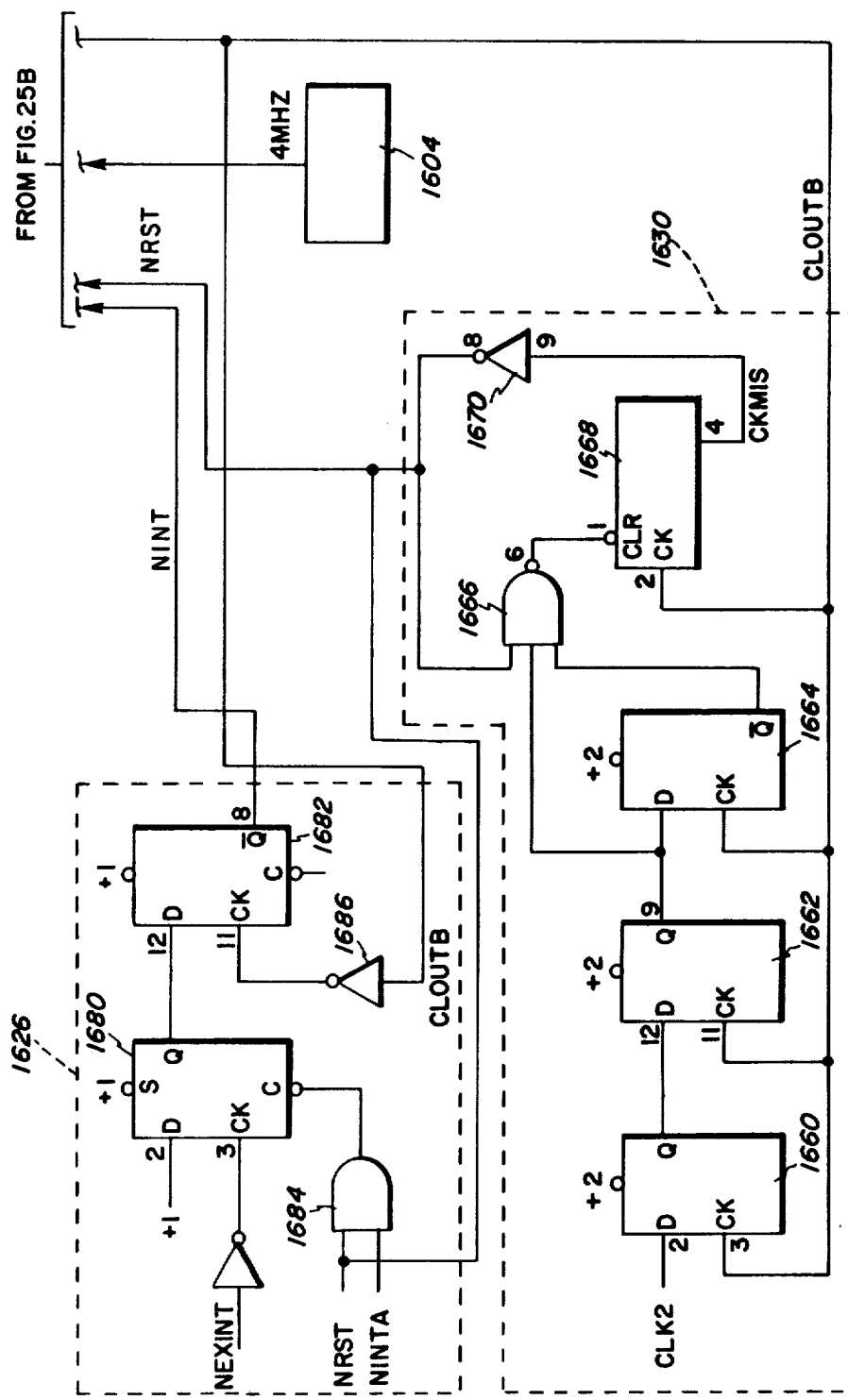
FIG. 25C is a block diagram showing details of the area microprocessor interrupt and clock detection circuits.

A more detailed schematic drawing of the block diagram of FIG. 24 is illustrated in FIG. 25. The external ROM 1602 comprises, for example, Intel 8708 programmable read only memories wherein the chip select (CS) signal is supplied from a LADR1K and NLADR1K signals from selection circuit 1612. The external ROM buffer 1606 comprises, for example, a model no. 8097 HEX buffer (National Semiconductor, for example) and the device selection inputs thereto are both connected to a not memory read control signal from the area microprocessor 1600 (NMEMRD). Upon reading information from the external ROM 1602 the area microprocessor 1600 generates a logical "0" as the NMEMRD signal to gate the external ROM buffer 1606 and additionally generates an appropriate address to indicate an external memory address. The area microprocessor 1600 contains 1K memory in an internal read only memory and may address 3K additional memory bytes in external memory. Consequently, when the address on the AAS bus 1620 is greater than 1K, the selection circuit 1612 is utilized as the chip select signal to strobe information from the external ROM into the external ROM buffer 1606.

It is noted that the HEX buffer model no. 8097 forming ROM 1606 is a six stage buffer and consequently one full HEX buffer is utilized and two stages of a second HEX buffer in order to form the eight stage desired buffer. These two groups of buffers are identified as 1606a and 1606b in FIG. 25. In a similar fashion it is expedient to utilize portions of other HEX buffers for different functions and the selection of model no. 8097 permits such use since four stages of the buffer may be controlled from one input control line and two stages from a separate input control line. Thus, input buffer 1608 is seen to comprise four stages each from two buffers identified as 1608a and 1608b. Similarly, output buffer 1610 comprises a complete HEX buffer 1610a and two stages of a second buffer identified as 1610b.

Once data has been strobed from the external ROM 1602 through the external ROM buffer 1606 it is passed through the input buffer 1608 into the area microprocessor 1600 for processing. Output data is fed via the output buffer 1610 to the ADS bus 1500. The selection circuit 1612 which gates the input and output buffers is seen to comprise an OR gate 1640, NAND gates 1642, 1644 and 1646 and inverters 1648 and 1650. The input of OR gate 1640 is fed by the address lines LADR10 and LADR11 so that a logical 1 is provided at the output of OR gate 1640 whenever the address designated is greater than or equal to 1K (1024). The output from OR gate 1640 is the LADR1K signal which is fed to one model 8708 of the external ROM 1602. The LADR1K signal is also inverted via inverter 1650 and fed as a strobe to a second model 8708 external ROM 1602. Address lines LADR0-LADR9 are utilized to select data bytes from the external ROM 1602.

The LADR1K signal from OR gate 1640 is also fed to NAND gate 1644 which provides one of four inputs to NAND gate 1646. A second input to NAND 1646 is provided by NAND gate 1642. One input of NAND gate 1642 comes from the MEMRD signal from the area microprocessor 1600. When MEMRD is high the area microprocessor 1600 is executing a memory read instruction. The second input of NAND gate 1642 comes from a not internal ROM enable signal (NIROMEN) and this signal is high whenever the internal ROM of the area microprocessor is not being addressed. The third and fourth inputs to NAND gate 1646 are from the not I/O read (NIORD) and the not interrupt acknowledge (NINTA) signal from the area microprocessor 1600 respectively. The output of NAND gate 1646 is the load output enable signal, LDGTEN and is fed to the output buffers 1610. The inverted LDGTEN signal is the load input enable signal from inverter 1648 and is fed to the input buffer 1608 as a signal LDINEN.

The CLK2 detection circuit 1630 comprises three "D" flip-flops 1660, 1662 and 1664. The CLK2 signal from the area controller clock generator 1453 (FIG. 21) is fed to the D input of the first flip-flop 1660. All flip-flops are clocked by the 2 MHz clock signal provided as the CLOUTB output of the area microprocessor 1600. Flip-flops 1660 and 1662 essentially synchronize the CLK2 signal with the area microprocessor clock. Flip-flop 1664 is utilized together with NAND gate 1666, four bit counter 1668 and inverter 1670 to reset the area microprocessor with a series of 4 microsecond reset signals in the event that the CLK2 signal is not received.

The interrupt circuit 1626 comprises two "D" flip-flops 1680 and 1682 together with AND gate 1684 and inverter 1686. The CLOUTB signal from the area microprocessor 1600 is fed to inverter 1686 and utilized to clock the flip-flop 1682. Flip-flop 1680 and 1682 essentially synchronize the external interrupt NEXINT with the microprocessor clock CLOUTB signal. Interrupt flip-flop 1682 may be reset if both NRST and NINTA signals are high. The NINTA signal is the not interrupt acknowledge signal supplied from the area microprocessor 1600 once an interrupt has been accepted for processing (active when low).

Figure 26:
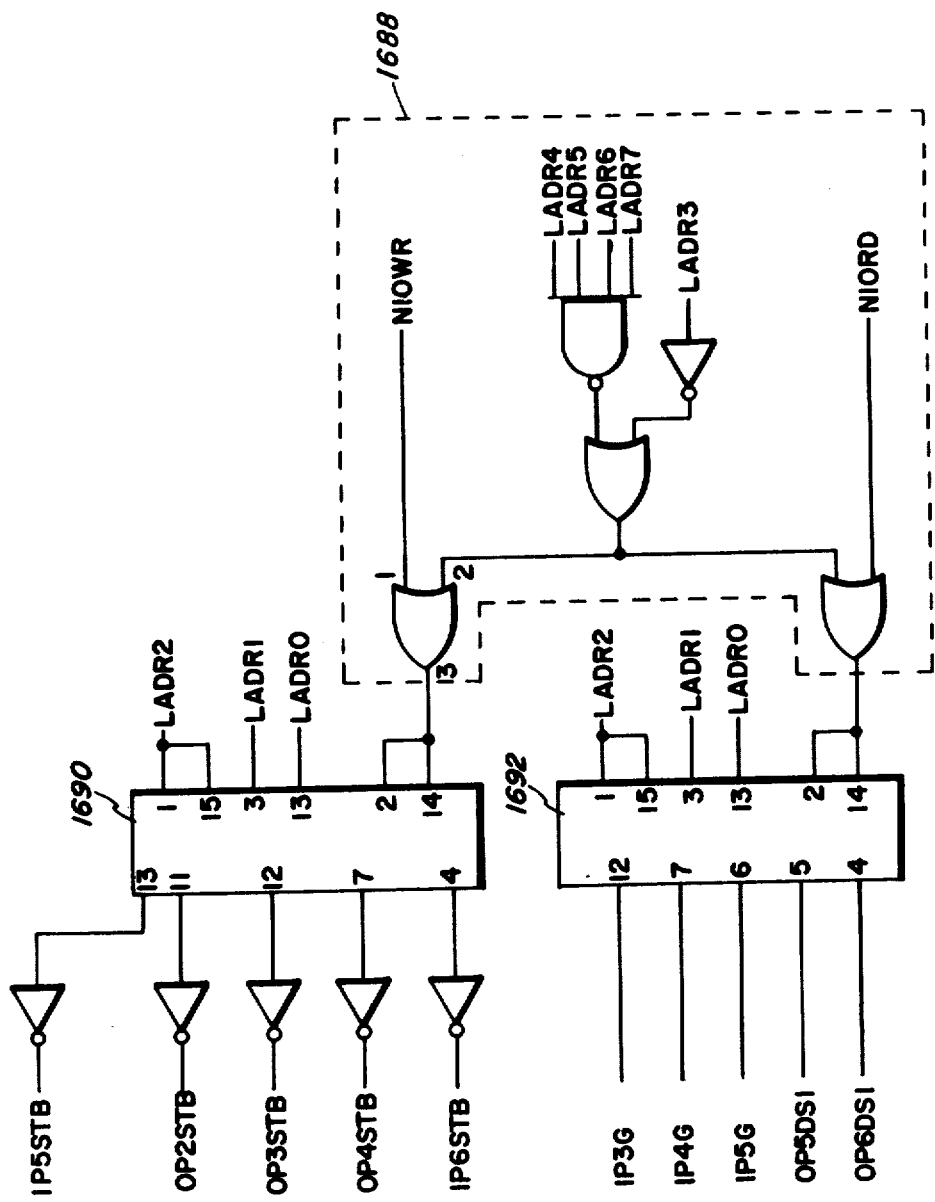
FIG. 26 illustrates details of the area microprocessor interface circuitry for the area controller.

FIG. 26 illustrates the address decoder for generating the required strobe signals in response to the read and write addresses from the area microprocessor 1600. The address decoder comprises a decode logic circuit 1688 having various inputs such as address lines and the read (NIORD) and write (NIOWR) strobes as shown, and two decoders 1690 and 1692 (model no. 74155). The decoders 1690 and 1692 are strobed by the outputs from the decode logic circuit 1688. The strobe outputs of the decoders 1690 and 1692 are determined in response to additional address lines as shown. The strobe outputs are generated to strobe and gate the various output ports and input ports as shown particularly in FIG. 23B. It is clear that additional input and output ports may be dedicated for use by the area microprocessor 1600 of the active area controllers. In particular, it is contemplated that two input ports as well as two output ports may be so dedicated.

Pseudo-Interrupt Operation

Figure 23B:
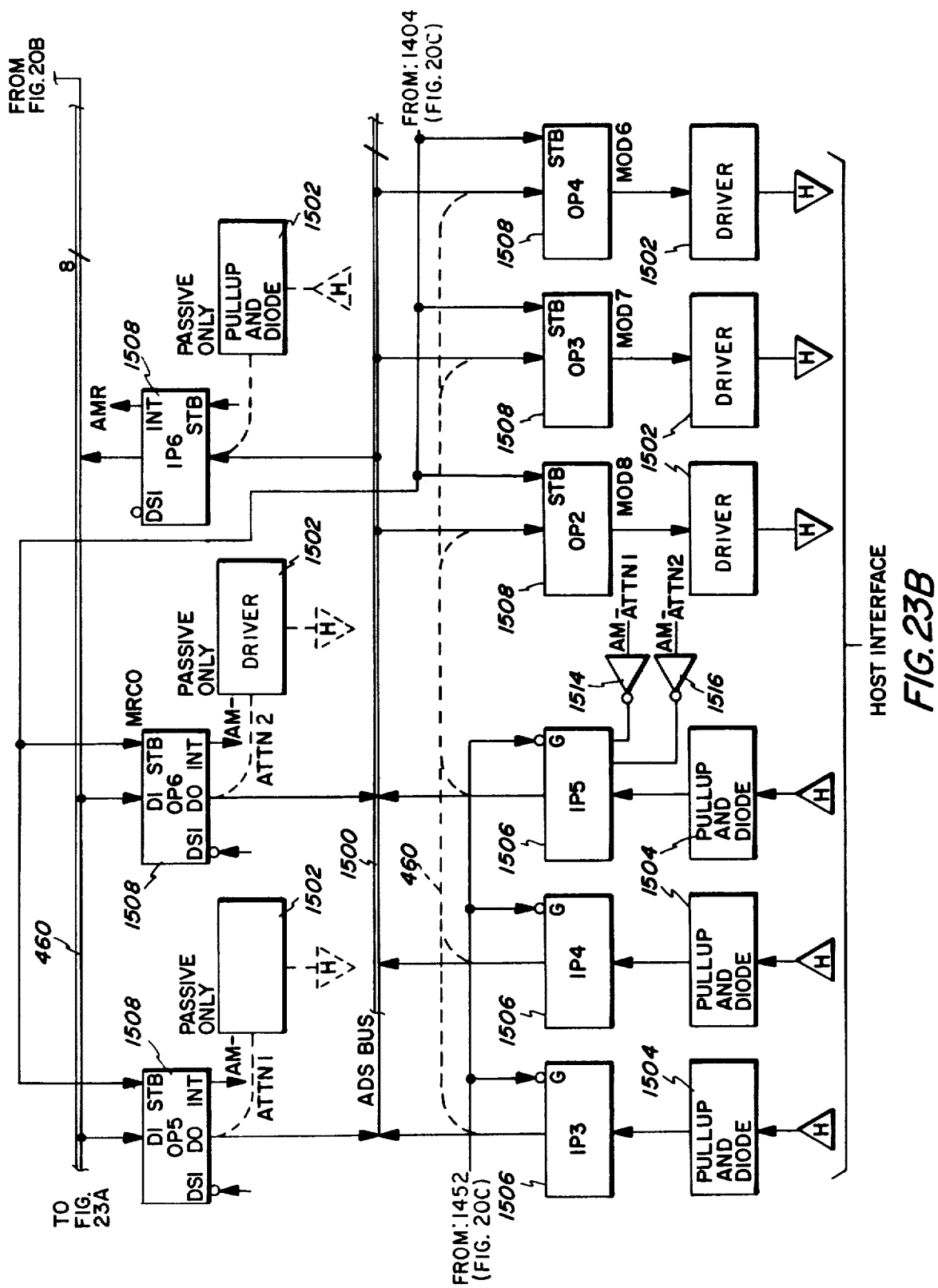
Figure 27:
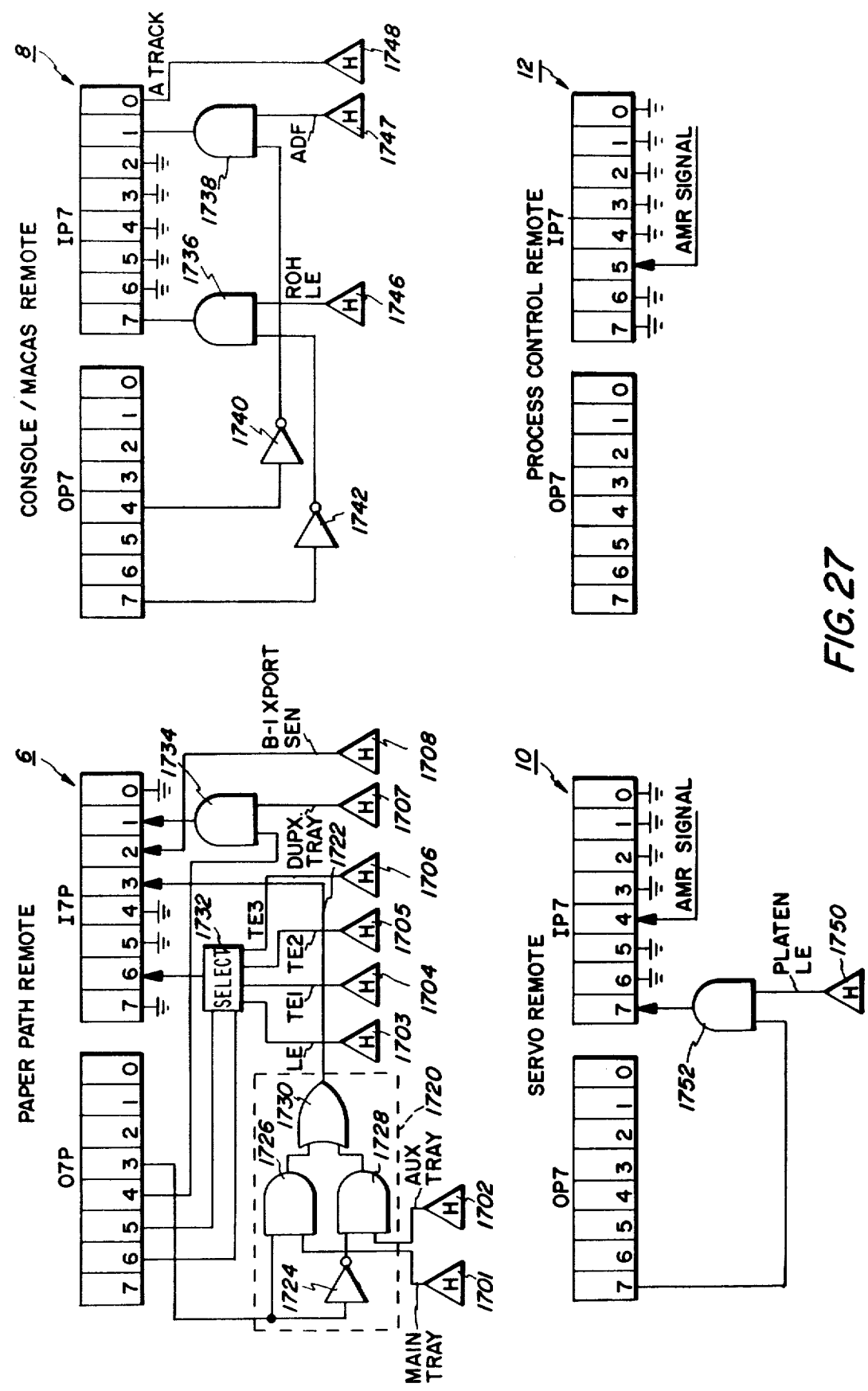
FIG. 27 is a block diagram illustrating input and output port connections for a psuedo interrupt operation.

In reference to FIG. 23, it is noted that each area controller has an output port 7 and input port 7 dedicated to pseudo-interrupt operation. The pseudo-interrupt operation is selected by setting CS1-CS3 to octal 7 (Channel Select byte 111). Upon receipt of the 111 Channel Select byte all area controllers will be responsive to the C1-C3 Byte Address. For the simultaneous mode operation the Byte Address is likewise set at 111 designating the output port 7 and the input port 7. Inasmuch as all of the areas are simultaneously gated for transmitting input data to the master controller, only selected bits from each area controller are enabled so that mutually exclusive bit positions are used with the results wire "ORed" by the master I/O interface 4. Thus, data received will not contain any overlapping bit information. FIG. 27 is a diagram of the output port 7 and input port 7 associated with four of the area controllers which may, for example, be utilized in the simultaneous mode operation. FIG. 27 thus illustrates the output port 7 and input port 7 for the paper path controller 6, the control console area controller 8, the servo controller 10 and the process controller 12. The output port OP7 receives the same data bit for all of the area controllers during the pseudo-interrupt (or simultaneous area) operation. In the paper path area controller a plurality of input sense terminals 1701-1708 are provided for feeding sense data as input data bytes to the master controller. Terminals 1701 and 1702 may for example be connected to sensors which determine the presence of the main and auxiliary paper trays respectively. Input sense terminal 1703-1706 may be utilized for sensing the leading edge, LE, and trailing edge, TE, of the paper during various stages of its movement through the copy machine, and input sense terminals 1707 and 1708 may be utilized for duplex tray and bi-level transport sensing operations. Each of these input terminals is designed by a triangle containing a "H" therein indicating interconnection to a host machine. Particular bits of OP7 in the paper path area controller 6 are utilized as condition codes during the pseudo-interrupt byte transmission operation. For example, bit position 3 of output port 7 is connected to logic circuit 1720 for selecting either the input sense terminal 1701 or 1702 for interconnection to bit 3 of IP7 via line 1722. Logic circuit 1720 comprises inverter 1724, AND gates 1726 and 1728 and OR gate 1730. Bits 5 and 6 of OP7 are utilized as selection control lines to a four-one multiplexer 1732 (model no. 74153) to select one of the four input sensed terminals 1703-1706. Similarly, bit 4 of OP7 is used to condition the presence or absence of the duplex tray information from sense terminal 1707 via Area Microprocessor Response signal (AMR signal) from the interrupt output signal of data latch 1508 of IP6 (see FIG. 23B). The platen leading edge sense signal from 1750 is conditioned via AND gate 1752 from bit 7 of OP7.

Process control area controller 12 will likewise supply the AMR signal as bit 5 of IP7. Table 5 below shows a listing of the various pseudo-interrupt lines and the output bit positions corresponding thereto in the four area controllers corresponding to FIG. 27.

TABLE 5

| INPUT BIT POSITION | AREA CONTROLLER | PSEUDO INTERRUPTS PSEUDO-INTERRUPT INPUT | OUTPUT BIT POSITION | |
|---|---|---|---|---|
| D7 | MACAS/Console | MACAS Lead Edge Sensor | D7 = 0 | |
|  | Servo | Platen Lead Edge Sensor | D7 = 1 | |
| D6 | Paper Path | Reg. Lead Edge Sensor | D6 = 0 | D5 = 0 |
|  | Paper Path | Reg. Trail Edge Sensor 1 | = 0 | = 1 |
|  | Paper Path | Reg. Trail Edge Sensor 2 | = 1 | = 0 |
|  | Paper Path | Reg. Trail Edge Sensor 3 | = 1 | = 1 |
| D5 | Process Control | Process Control µP Resp. | None | |
| D4 | Servo | Servo µP Response | None | |
| D3 | Paper Path | Main Tray Hold Stn. Sensor | D3 = 1 | |
|  | Paper Path | Aux Tray Hold Stn. Sensor | D3 = 0 | |
| D2 | Paper Path | Bi-Level Xport Sensor | None | |
| D1 | MACAS/Console | ADF | D4 = 0 | |
|  | Paper Path | Dup. Tray Hold Stn. Sensor | D4 = 1 | |
| D0 | MACAS/Console | A Track Sensor | None | |

AND gate 1734. All terminals in IP7 not utilized are strapped to 0 volts so as not to interfere with data being transmitted from other area controllers on the unused bits.

The control console area controller 8 utilizes bits 4 and 7 to condition the ADF sensor and RDH leading edge sensor respectively into respective bits 1 and 7 of IP7. AND gates 1736 and 1738 together with inverter 1740 and 1742 are utilized for this purpose. The input sense terminals for the control console 8 comprise the RDH leading edge sense terminal 1746, the ADF sense terminal 1747 and the A track sensor terminal 1748.

The servo controller 10 is an active area controller having a platen leading edge sense terminal 1750 feeding bit 7 of IP7, and also supplies bit 4 of IP7 with the The particular bits selected in the pseudo-interrupt scheme may, of course, be selected to achieve particular design and programming objectives. An alternate assignment for the input bit positions of input port IP7 as a function of the output bit positions is given below in Table 5A. Appropriate logic circuitry (not shown) may readily be provided similar to that shown in FIG. 27.

TABLE 5A

| INPUT BIT POSITION | AREA CONTROLLER | PSEUDO INTERRUPTS ALTERNATE FORMAT PSEUDO-INTERRUPT INPUT | OUTPUT BIT POSITION | |
|---|---|---|---|---|
| D7 | MACAS/Console | MACAS Lead Edge Sensor | D7 = 0 | |
|  | Servo | Platen Lead Edge Sensor | D7 = 1 | |
| D6 | Paper Path | Reg. Lead Edge Sensor | D6 = 0 | D5 = 0 |
|  | Paper Path | Reg. Trail Edge Sensor 1 | = 0 | = 1 |
|  | Paper Path | Reg. Trail Edge Sensor 2 | = 1 | = 0 |
|  | Paper Path | Reg. Trail Edge Sensor 3 | = 1 | = 1 |
| D5 | MACAS Console | MACAS A Track | None | |
| D4 | Paper Path | Finisher Inverter | D1 = 0 | D2 = 0 |
|  | Finishing Station | Staple Head Position A | = 1 | = 0 |
|  | Finishing Station | Staple Head Position B | = 1 | = 1 |
| D3 | Process Control | Process Control Up Response | None | |
|  | Servo Control | Servo Control Up Response | None | |
| D2 | Paper Path | Main Tray Hold Station | D3 = 0 | |
|  | Paper Path | Aux. Tray Hold Station | D3 = 1 | |
| D1 | Paper Path | Bi-Directional Transport (Jam Recovery) | None | |
| D0 | MACAS/Console | ADF | D4 = 0 | |
|  | Paper Path | Duplex Tray Hold Station | D4 = 1 | |

It is important to note that inasmuch as the output data from all of the area controllers is wire "ORed" at the input to the master I/O interface 4, the data bits are mutually exclusive as to the information conveyed thereby. Consequently, as an example, if output bit position 4 (D4) in OP7 is a logical "1" then AND gate 1734 will strobe the information on duplex tray terminal 1707 into bit 1 (D1) of the input port 7 (IP7). At the same time inverter 1740 of FIG. 27 will prevent the strobing of information on the ADF terminal 1747 into bit position 1 of IP7. Conversely, if bit 4 of the output data byte strobed into OP7 is a 0, then information on the ADF terminal 1747 will be strobed into D1 of IP7 whereas the duplex tray information on terminal 1707 will be excluded. The software in the master microprocessor 300 must in fact keep track of the output data byte transmitted during the simultaneous mode operation in order to interpret the received data sent on a subsequent transmission from the area controllers under the simultaneous area operation.

Machine Clock Interrupt

The pseudo interrupt polling technique outlined above is implemented every time a machine clock interrupt is received. The machine clock interrupt is derived from the servo controller 10 from a phase lock loop (PLL) circuit whose nominal output frequency is 800 Hz. The PLL provides a continuous clock source which is in phase lock with the machine clock output of a photoreceptive drum encoder whenever the drum is up to speed. The signal from the PLL (LOCK signal) is true whenever the machine clock is within a defined speed range of the PLL. The signal is available to the master controller as an input bit accessible through normal MACS transactions. The machine clock interrupt signal output from the PLL is transmitted from the servo controller to the master controller via a dedicated fiber optic link (line 370 of FIG. 3).

Real Time Interrupt

The real time clock interrupt (RTC) consists of a counter which may be programmatically initialized to provide an RTC interrupt frequency ranging from 75.1 Hz to 19.23 KHz. The counter is mechanized into stages. The first stage is driven by the free-running 1.25 MHz clock and divides this frequency down by 65 providing a 19.23 KHz output. The 19.23 KHz clock is used as both an input to the second counter stage, as well as the free-running source for the selectable slow clock used in the generation of the reset to the area microprocessor in active remotes. The second counter stage is loaded from an 8-bit programmable register each time the counter overflows, and depending on the value stored in the register, divides down the 19.23 KHz clock from 1 to 256 times further. Thus, the output of the second stage is in the range of 75.1 Hz to 19.23 KHz, and controls a flip-flop whose output feeds into a priority circuit which also receives the machine clock interrupt signal.

Software Description and Organization

The software utilized to control the master microprocessor and area microprocessors is described by way of flow charts and exemplary program listings as given herein. The major software units are termed "modules" such as, for example, the state checker module (STCK) utilized to monitor background state changes, QTABLE (QTBL) module utilized to build the copy events from the variable and fixed pitch events, the paper path module (PAP) utilized to control the various paper sense and jam conditions, etc. For an understanding of the various instructions utilized, reference is made to the Intel 8080 Microprocessor User's Guide (September, 1975) published by Intel Corporation, Santa Clara, Calif. Macro instructions utilized throughout these listings are found in the Appendix under the System Macro list and Macro Subroutine list. The listing as assembled utilizes the Xerox Assembly Program and reference is made to the Xerox Assembly Program "Language and Operations Reference Manual" 1975, published by Xerox Corporation, El Segundo, Calif.

Figure 28:
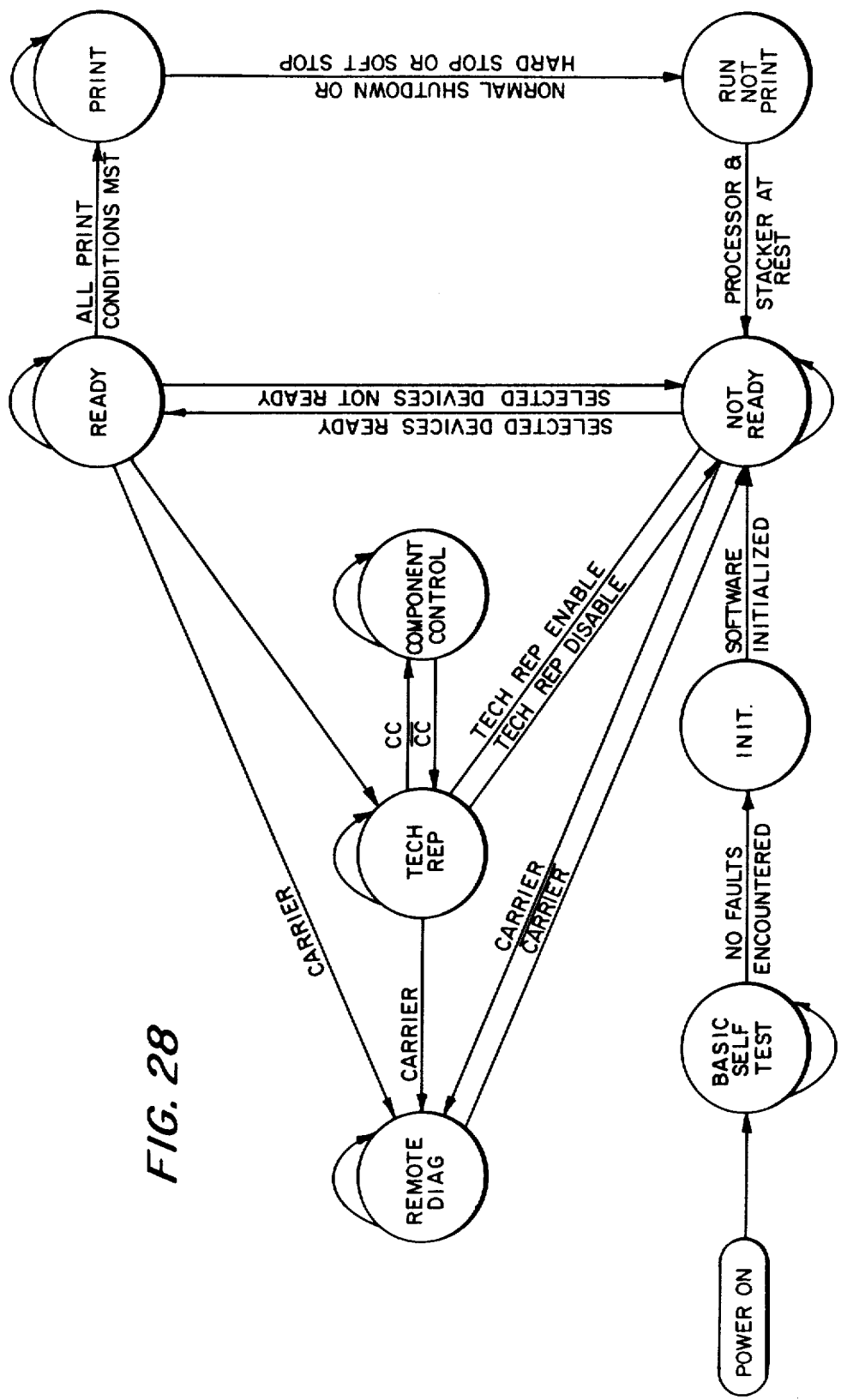
FIG. 28 is a block diagram showing the different computer states in accordance with the present invention.

The software organization of the master microprocessor 300 is similar in overall philosphy and structure to that described in copending application by Edward Steiner entitled "PROTECTION SYSTEM FOR ELECTROSTATIC MACHINES", Ser. No. 677,346, filed Apr. 15, 1976, incorporated herein by reference. Software controlled events may be foreground events which are keyed to the machine cycle (photoreceptor drum rotation) or background events which need not be critically synchronized to the machine cycle. Foreground events have priority over background events. The software is partitioned so that it runs in one of several "states" which correspond to the status of the machine. In each state a set of subroutines is called repetitively to monitor the machine status and control the changes from state to state. In addition, when the host machine is in the print state, a set of events which are synchronized to the motion of the paper through the machine are called to control the copy process. FIG. 28 diagramatically illustrates the various states and the permissible transitions between the states. When the system is initialized by power-on or reset, the self test programs are run which check the ROM and RAM memories as well as the non-volatile memory. All flags and variables are initialized and the NOT READY state is entered if the self test programs are successfully passed. The system is inoperative if any of the memory units fail. The various machine states as illustrated in FIG. 28 may be summarized as follows:

NOT READY—The machine is not yet ready to run. This state may result from various factors such as interlocks being open, insufficient fuser temperatures, insufficient electrostatic voltages, or faults existing in any selected features. The NOT READY state is entered after power up initialization, after a job has run or after a technical representative, component control or remote control diagnostic state is completed. A job may be programmed in this state but not started.

READY—This state is entered from the NOT READY state when the machine is ready to run. A job may be programmed.

PRINT—This state is entered when a job is started and is the state in which copies are produced. It always exits to the RUN NOT PRINT state.

RUN NOT PRINT—This state is entered whenever the PRINT state is terminated and controls the stopping of the machine. When all functions of the machine have stopped, it goes to the NOT READY state.

TECH REP—This state may be entered when the machine is not running and is utilized by the technical representative for operation of special diagnostics for component control checking.

COMPONENT CONTROL—This state allows selected components of the machine to be exercised.

REMOTE DIAGNOSTICS—This state is entered when the machine is in READY, NOT READY, or TECH REP states and the carrier is detected by a data modum which permits access to the machine via a telephone line.

Figure 29:
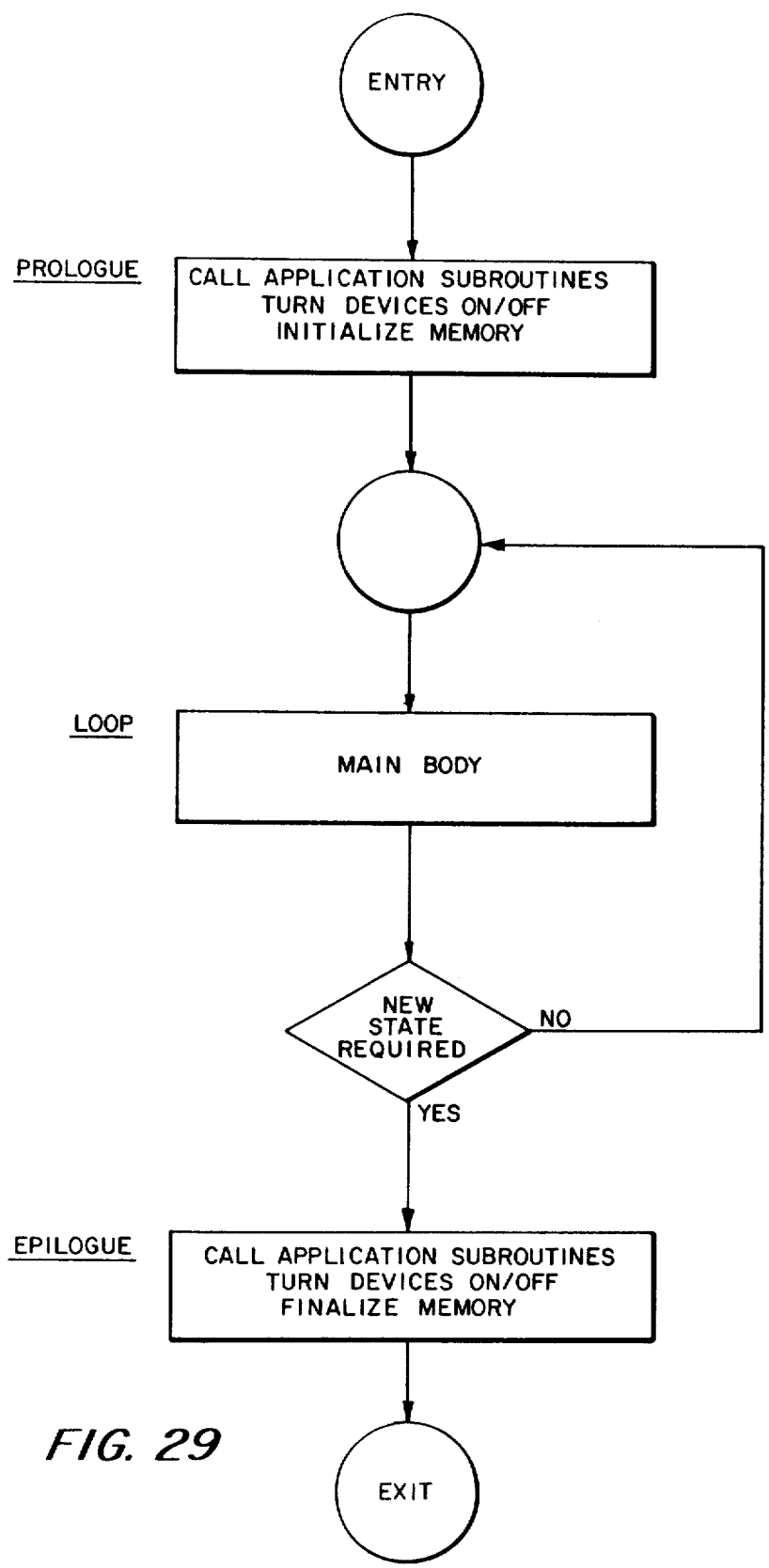
FIG. 29 is a flow chart illustrating the overall structure of a machine state.

Referring to FIG. 29, it may be seen that each state is normally divided into PROLOGUE, LOOP and EPILOGUE sections. The program responsible for checking on the current status of the machine in taking care of changes from one state to another is called the state checker routine (STCK), an exemplary version of which is given in the Appendix. Entry into a given state (PROLOGUE) normally causes a group of operations to be performed. These PROLOGUE operations consist of operations that are performed only once at the entry into the given state. For complex operations, a call is made to an applications subroutine. Relatively simple operations such as turning on devices, clearing memories, presetting memories, etc. are done directly. Once the PROLOGUE is completed the main body (LOOP) is entered. The state checker routine remains in the LOOP until a change of state is requested and honored. On a change of state request, the state EPILOGUE is entered wherein a group of operations are performed following which the state moves into the PROLOGUE of the next state to be entered.

State Checker

Figure 30:
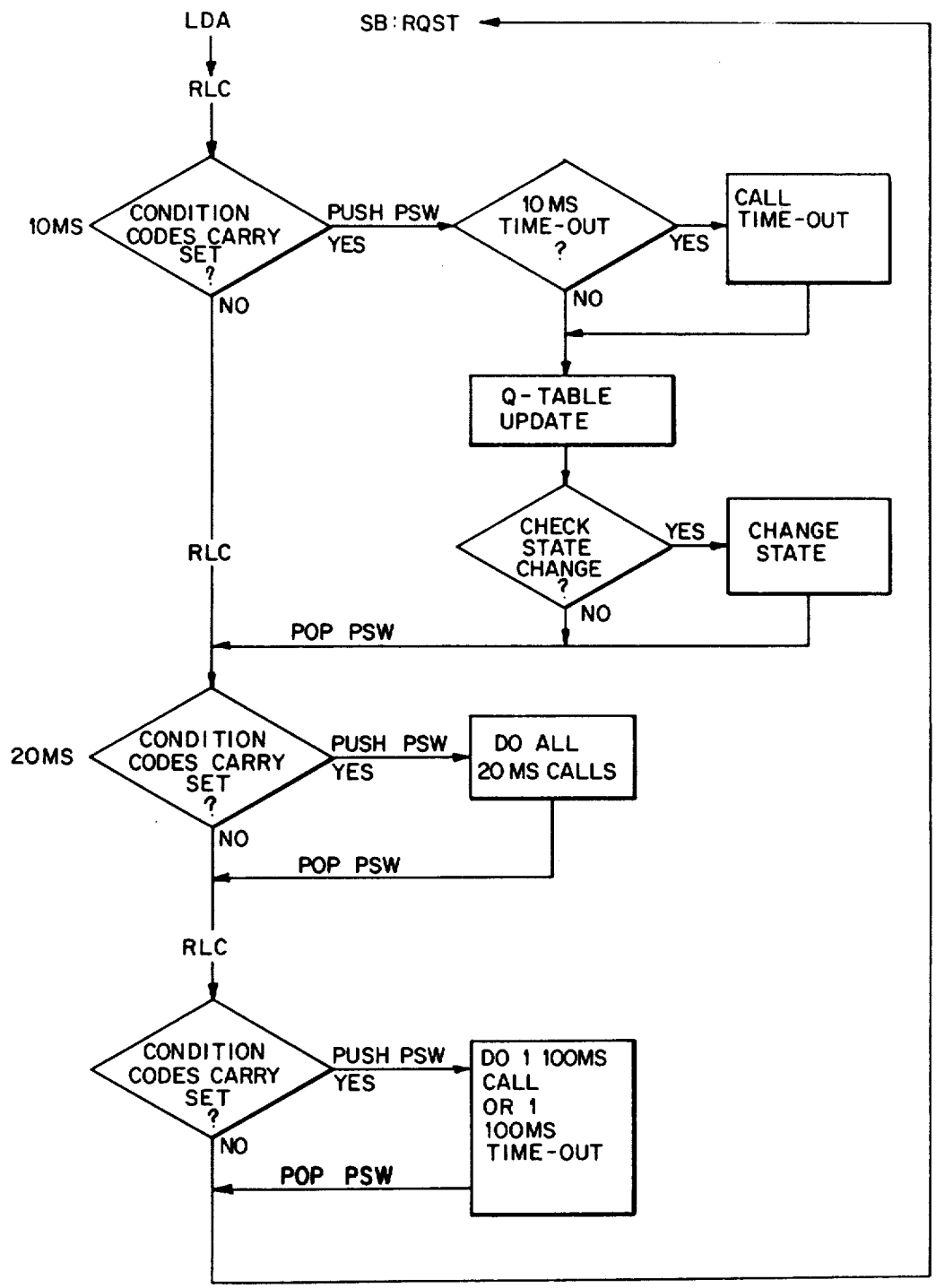
FIG. 30 is a flow chart of the state checker module for controlling changes of state within the machine.

FIG. 30 indicates a flow chart of the state checker routine which is the basic background operating program. State checker (STCK) monitors the current state of the machine and controls changes from one state to another and executes the various background routines which may be arranged at intervals such as, 20 ms, and 100 ms timeouts. During the 20 ms and 100 ms timeout conditions, a call list is executed to perform certain background operations appropriate to the state of operation of the machine. The real time clock (RTC) may also be utilized to set 10 ms flags or 100 ms flags which are not generally included in call lists and may be performed only under certain specified or desired conditions such as in controlling the interactive display (blinking message), paper tray elevator checker, etc.

In reference to FIG. 30, the SUB:RQST byte is loaded into the accumulator and rotated left to look at the carry bit (RLC). If the carry condition code is set, then the 10 ms timer has timed out by the real time clock interrupt handler and the appropriate subroutine associated with this timed-out feature is called and executed. After execution, the QTABLE is updated, and the state checker then checks to see if a new state has been requested (NX:STATE NOT EQUAL PR:STATE). If so, the EPILOGUE for the present state is called and then the PROLOGUE for the next state is called. The EPILOGUE is used to change those flags, variables, timers or outputs that should be changed before leaving a state, and the PROLOGUE is used to change those flags, variables, timers or outputs that are initialized when entering the new state.

If the 20 ms flag has been set by the real time clock, then all of the subroutines in the 20 ms list are called and executed. When all of the 20 ms subroutines have been called, the 20 ms flag is cleared and, if the 100 ms flag has been set by the real time clock, one of the 100 ms calls is executed or one of the 100 ms timeouts is executed.

Key tasks associated with the NOT READY, READY, PRINT, and RUN NOT PRINT states are listed in Table 6 together with the subroutine module controlling the machine operation and the entry subroutine within the given module.

Foreground events have highest priority and are governed by the machine clock interrupt handler (800 Hz) and the real time clock handler (10 ms). These two interrupts are fed to a priority circuit which selects the machine clock over the real time clock in the event of simultaneous interrupts. The real time clock interrupt handler schedules all of the background task through either 20 ms or 100 ms flags via the call list or by passing a subroutine pointer for any timer that times out. The machine clock interrupt schedules and calls all of the foreground events which control the actual copy making process in the PRINT state.

The machine clock interrupt routine increments a counter (modulo 256) and checks if the top event in an ordered table (QTABLE) is supposed to be done on this count. If the top event is due, it is removed from the QTABLE and executed. Events are added to the QTABLE by a background subroutine (Q@UPDATE) whenever the last entry in the QTABLE is less than 30 counts from the present count time. The copy table contains the next event to be done for each pitch currently in process. The closest event of those in the copy table is moved to the end of the QTABLE and the copy table is updated to the next event in the event table. The event table is a list in RAM of the master microprocessor of the events that are called for the current jobs. The event table will be dependent, of course, upon the particular job selected by the operator such as, simplex/duplex operation, magnification, etc. If the new entry in the QTABLE has the same count as the last previous entry, then the new entry is incremented by one since no two events in the QTABLE may be scheduled on the same count. Events are added to the end of the QTABLE until the last event is 30 or more counts from the present event time. When a new sheet is added to the program, those events which would be ahead of the last entry in the QTABLE are counted and the count and event information is kept in a catch-up table. These events are sequentially counted down by the machine clock and called at the correct time.

Figure 31:
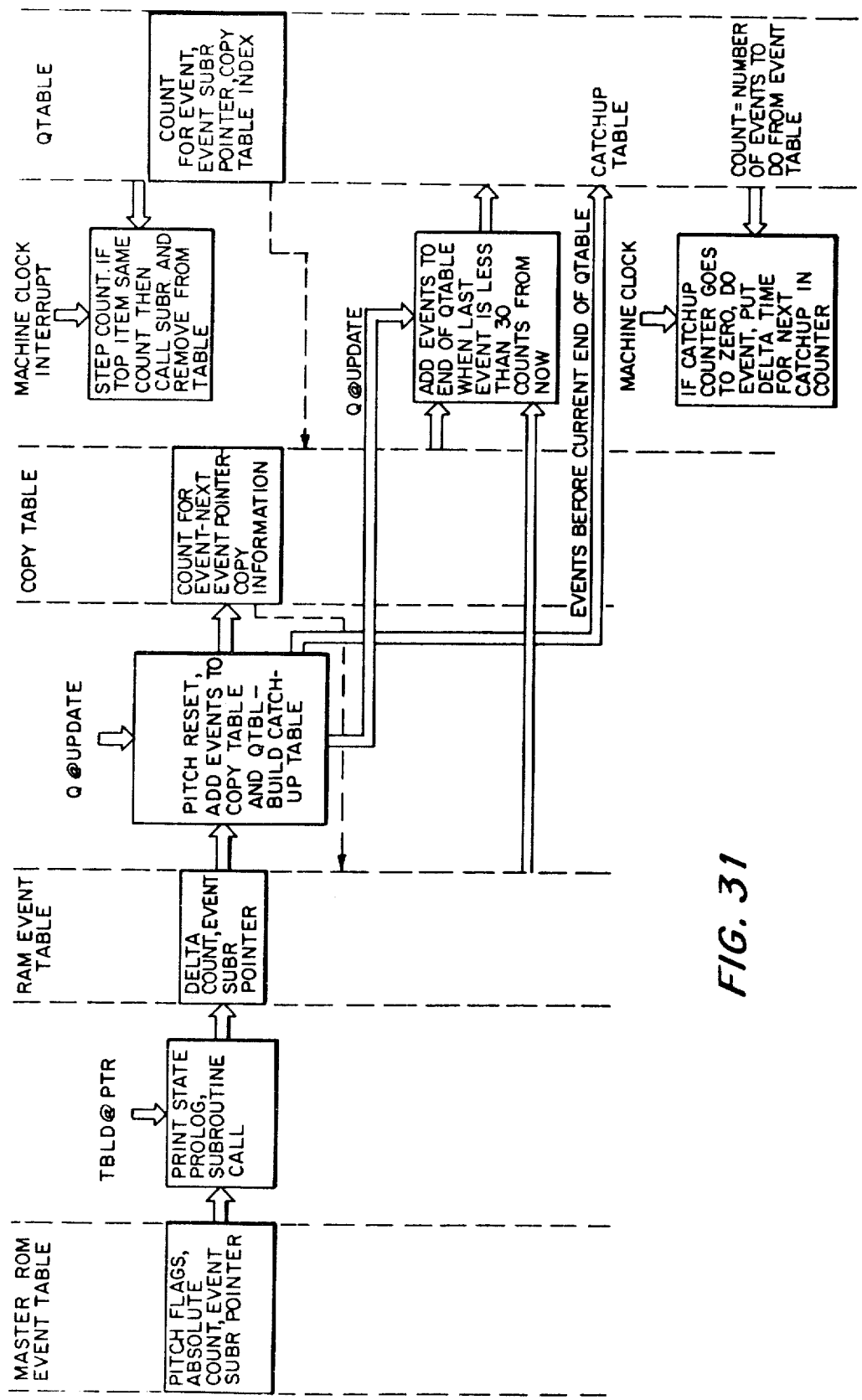
FIG. 31 is a block flow diagram indicating construction of the Q TABLE utilized to control events in the machine.

FIG. 31 diagramatically represents the sequence of events utilized to build the QTABLE. The building of the QTABLE from an event table through the merger of both fixed and variable pitch events is similar to that described in the above referenced copending application by Edward Steiner and assigned to Xerox Corporation. A list of the fixed events and variable events for both 10 inch pitch (10P) and 12 inch pitch (12P) are given in the QTABLE module (QTBL) listed in the Appendix.

TABLE 6

| BACKGROUND TASK RUN NOT PRINT STATE | |
|---|---|
| 20 Millisecond Subroutines | MODULE - ENTRY |
| 1. Scan those switches active in the PRINT and RUN NOT PRINT states | SWS - RUN@SWS |
| 2. Move highest priority item to display (recall-diag code-fault code-MACAS frame-new QTY-QTY SEL-QTY FEED) | DSPL - DSPL@UPD |
| 3. Check and set elevator down request for non-active feed tray | ELV - ELMD@NER |

TABLE 6-continued

| | | |
|---|---|---|
| 4. | Record arrivals-departures-gaps for paper path jam switches | PAP - PAP@TGL2 |

100 Millisecond Subroutines

| | | |
|---|---|---|
| 1. | Control main and aux elevators | ELV - ELEV@CON |
| 2. | Check main, aux and duplex feeders for faults | FDR - FBK@RDY |
| 3. | Turn on toner sensor (TON SENS) | DEV - TON@SENS |
| 4. | Check for low paper (in continuous feed) on aux tray | FDR - LOW@PAPER |
| 5. | Check toner low, toner and developer interlocks | DEV - TON@SIGN |
| 6. | Check interlocks (doors and covers) and control standby relay | ILK - ILK@RUN |
| 7. | Check fuser temperature | FUS - FUS@ER |
| 8. | Stop any foreground events from being called | QTBL - STOP@EV |
| 9. | Position mirror if necessary | IMG - MP@SEL |
| 10. | Serial transmission of data to servo remote if needed | IMG - SMIT@SK |
| 11. | Interactive display request Check-display highest priority request | IAD - IAD@RDY |

PRINT STATE

20 Millisecond Subroutines — MODULE - ENTRY

| | | |
|---|---|---|
| 1. | Scan those switches active in the PRINT and RUN NOT PRINT states | : SWS - RUN@SWS |
| 2. | Build new copy table information | CPSK - CPSK@BKG |
| 3. | If conditions require change to RUN state then next state-RUN | STCK - RUNN@CHK |
| 4. | If first sheet requested and no paper at the wait station then initate feed (aux or main) | FDR - FBK@ISHT |
| 5. | Move highest priority item to display (recall-diag code-fault-code-MACAS frame-new QTY-QTY SEL-QTY FEED) | DSPL - DSPL@UPD |
| 6. | Check and set elevator down request for non-active feed tray | ELV - ELMD@PR |
| 7. | If SOS sensor on for three consecutive times then set jam | PAP - SOS@UMDT |
| 8. | Record arrivals-departures-gaps for paper path jam switches | PAP - PAP@TLG1 |
| 9. | If set separator required then actuate | PAP - SET@CYCL |

100 Millisecond Subroutines

| | | |
|---|---|---|
| 1. | Control main and aux elevators | ELV - ELEV@CON |
| 2. | Turn on toner sensor (TON$SENS) | DEV - TON@SENS |
| 3. | Check main, aux and duplex feeders for faults | FDR - FBK@ORDY |
| 4. | Check for low toner, toner and developer interlocks | DEV - TON@SIGN |
| 5. | Check interlocks (doors and covers) and control the standby relay | ILK - ILK@RUN |
| 6. | Check for low paper at aux tray in continuous feed | FDR - LOWPAPER |
| 7. | If continuous feed and not on selected tray and both trays same size then switch feed trays | FDR - FBK@TRSW |
| 8. | Check fuser temperature, check fuser sump, turn fuser drive off for hardstop | FUS - FUS@ER |
| 9. | Check vacuum on, filter bag full - cycle down if fuser not ready, dirty drum | FUS - CLNG@PRT |
| 10. | Check if reduction ready | IMG - IMG@PRT |
| 11. | Position MACAS/platen mirror if necessary | IMG - MP@SEL |
| 12. | Serial transmission of data to servo remote if needed | IMG - XMIT@SK |
| 13. | Interactive display request check-display highest priority request | IAD - IAD@RDY |
| 14. | Update print time clock. Check phase lock loop dropout | STCK - PLL@TIMR |
| 15. | Blink lamps if main or aux feeders need service | FDR - FDR@SERV |

READY STATE

20 Millisecond Subroutines — MODULE - ENTRY

| | | |
|---|---|---|
| 1. | Scan those switches active in NOT READY and READY states | :SWS - STBY@SWS |
| 2. | Check for maintenance interlock-if on request TECH REP state | STCK - MTN@ILK |
| 3. | Move highest priority item to display (recall-Diag code-fault code-MACAS frame-new QTY-QTY SEL-QTY FEED) | DSPL - DSPL@UPD |
| 4. | Check if aux or main paper elevator down switches are on | ELV - ELMD@NPR |
| 5. | Check for paper jam | PAP - BKGJMCHK |

100 Millisecond Subroutines

| | | |
|---|---|---|
| 1. | If all ready conditions not met then set next state-NOT READY, turn off ready lamp | STCK - RDY@CHK |
| 2. | If time to go to PRINT state then start cleaning, set timer for brush/print | STCK - PRT@CHK |
| 3. | Turn on toner sensor (TON$SENS) | DEV - TON@SENS |
| 4. | Control main and aux paper elevators | ELV - ELEV@CON |
| 5. | Check toner low, toner and developer interlocks | DEV - TON@SIGN |
| 6. | Check interlock faults and control standby relay | ILK - ILK@STBY |
| 7. | Check main, aux and duplex feeders for faults | FDR - FDK@RDY |
| 8. | Check for low paper (in continuous feed) on aux tray | FDR - LOW@PAPER |
| 9. | Check fuser temperature | FUS - FUS@ER |
| 10. | Stop any foreground (print) events from being called | QTBL - STOP@EV |
| 11. | Check reduction ready and platen ready | IMG - IMG@STBY |
| 12. | Position mirror if necessary | IMG - MP@SEL |
| 13. | Serial transmission of data to servo remote if needed | IMG - XMIT@SK |
| 14. | Interactive display request check - display highest priority request | IAD - IAD@RDY |
| 15. | Blink lamps if main or aux feeders need service | FDR - FDR@SERV |
| 16. | Start building fault mask table. Do first quarter of table. | FALT - BLD@MSK1 |
| 17. | Build next (second) quarter of fault mask table | FALT - BLD@MSK |
| 18. | Build next (third) quarter of fault mask table | FALT - BLD@MSK |
| 19. | Build next (last) quarter of fault mask table | FALT - BLD@MSK |
| 20. | Detect if a fault exists in the fault table | FALT - FLT@DTEC |
| 21. | Check modem interface for carrier detected. If present request remote state | RMDT - CHK@CARR |

NOT READY STATE

20 Millisecond Subroutines — MODULE - ENTRY

TABLE 6-continued

| | | |
|---|---|---|
| 1. | Scan those switches active in NOT READY/READY states | :SWS - STBY@SWS |
| 2. | Move highest priority item to display (recall-Diag code-fault code-MACAS frame-new QTY-QTY SEL-QTY FEED) | DSPL - DSPL@UPD |
| 3. | Check for maintenance interlock - if on, request TECH REP state | STCK - MTN@ILKF |
| 4. | Check if aux or main paper elevator down switches are on | ELV - ELMD@NPR |
| 100 Millisecond Subroutines | | |
| 1. | Control main and aux paper elevators | ELV - ELEV@CON |
| 2. | Turn on toner sensor (TON$SENS) | DEV - TON@SENS |
| 3. | Check main, aux and duplex feeders for faults | FDR - FBK@RDY |
| 4. | Check for low toner (LOW#TON), toner and developer interlocks (TON#ILK & DEV#ILK) | DEV - TON@SIGN |
| 5. | Check interlock faults and control standby relay | ILK - ILK@STBY |
| 6. | Check interlock transitions and record them in table (CLRN@ARY) | ILK - ILK@TRNS |
| 7. | Check for low paper | FDR - LOWPAPER |
| 8. | Start building fault mask table. Do first quarter of table | FALT - BLD@MSK1 |
| 9. | Build next (second) quarter of fault mask table | FALT - BLD@MSK |
| 10. | Build next (third) quarter of fault mask table | FALT - BLD@MSK |
| 11. | Build next (last) quarter of fault mask table | FALT - BLD@MSK |
| 12. | Detect if a fault exists in the fault table | FALT - FLT@DTEC |
| 13. | If fault exists decode the copy number and interactive display frame number to be displayed | FALT - FLT@DCOD |
| 14. | Interactive display - if there is a fault display the fault frame | IAD - IAD@NRDY |
| 15. | Check fuser temperature | FUS - FUS@ER |
| 16. | Check if ready conditions met | STCK - RDY@CHK |
| 17. | Stop any foreground events from being called | QTBL - STOP@EV |
| 18. | Check reduction ready and platen-calculate new servo data if needed | IMG - IMG@STBY |
| 19. | Position mirror if necessary | IMG - MP@SEL |
| 20. | Serial transmission of data to servo remote if needed | IMG - XMIT@SK |
| 21. | Blink lamps if main or aux feeders need service | FDR - FDR@SERV |
| 22. | Check modem interface for carrier detected. If present request remote state | RMDT - CHK@CARR |

Interrupt Handler

Figure 32A:
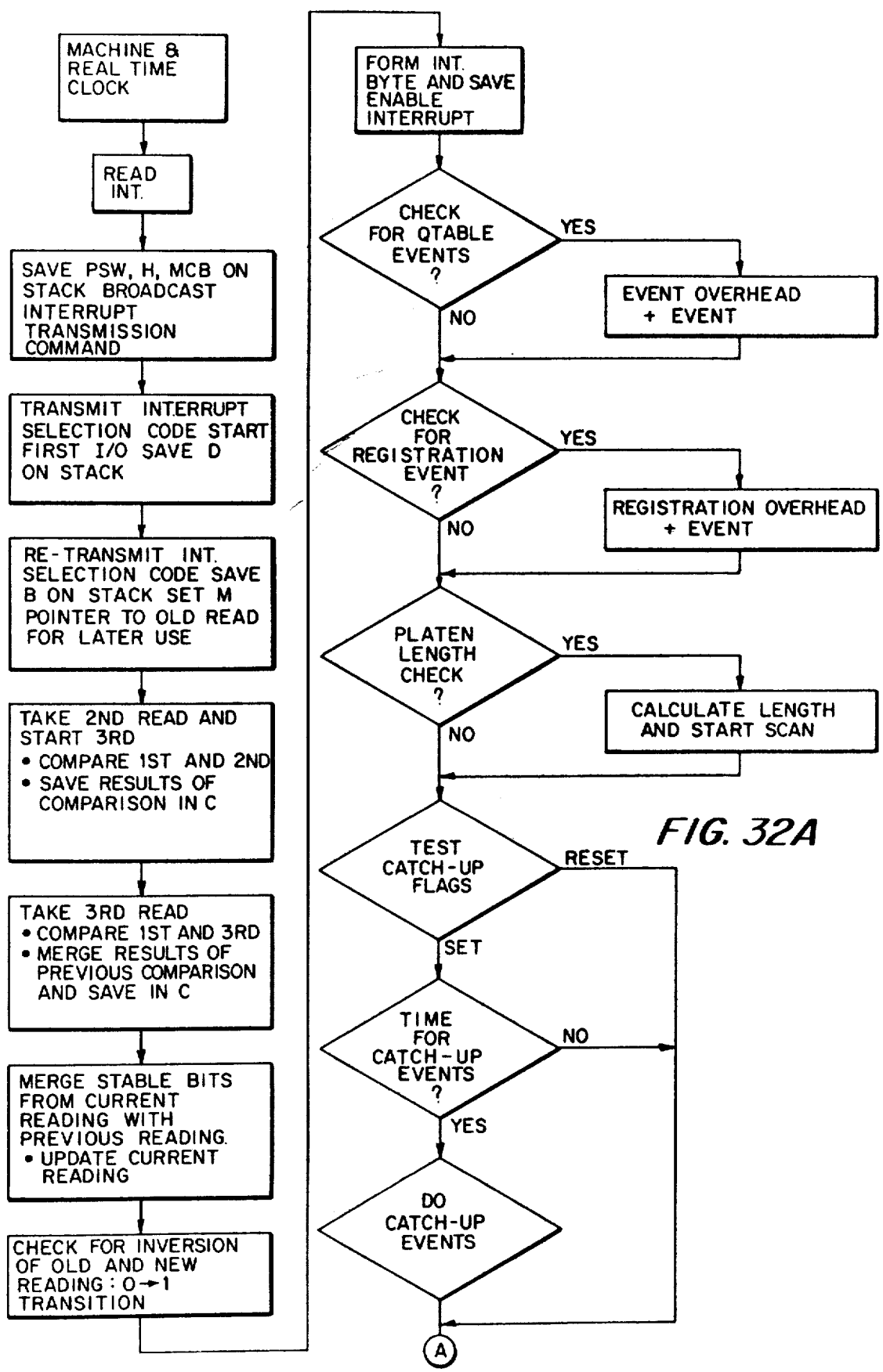
FIGS. 32A and 32B are partial flow charts showing the interrupt handler module.
Figure 32B:
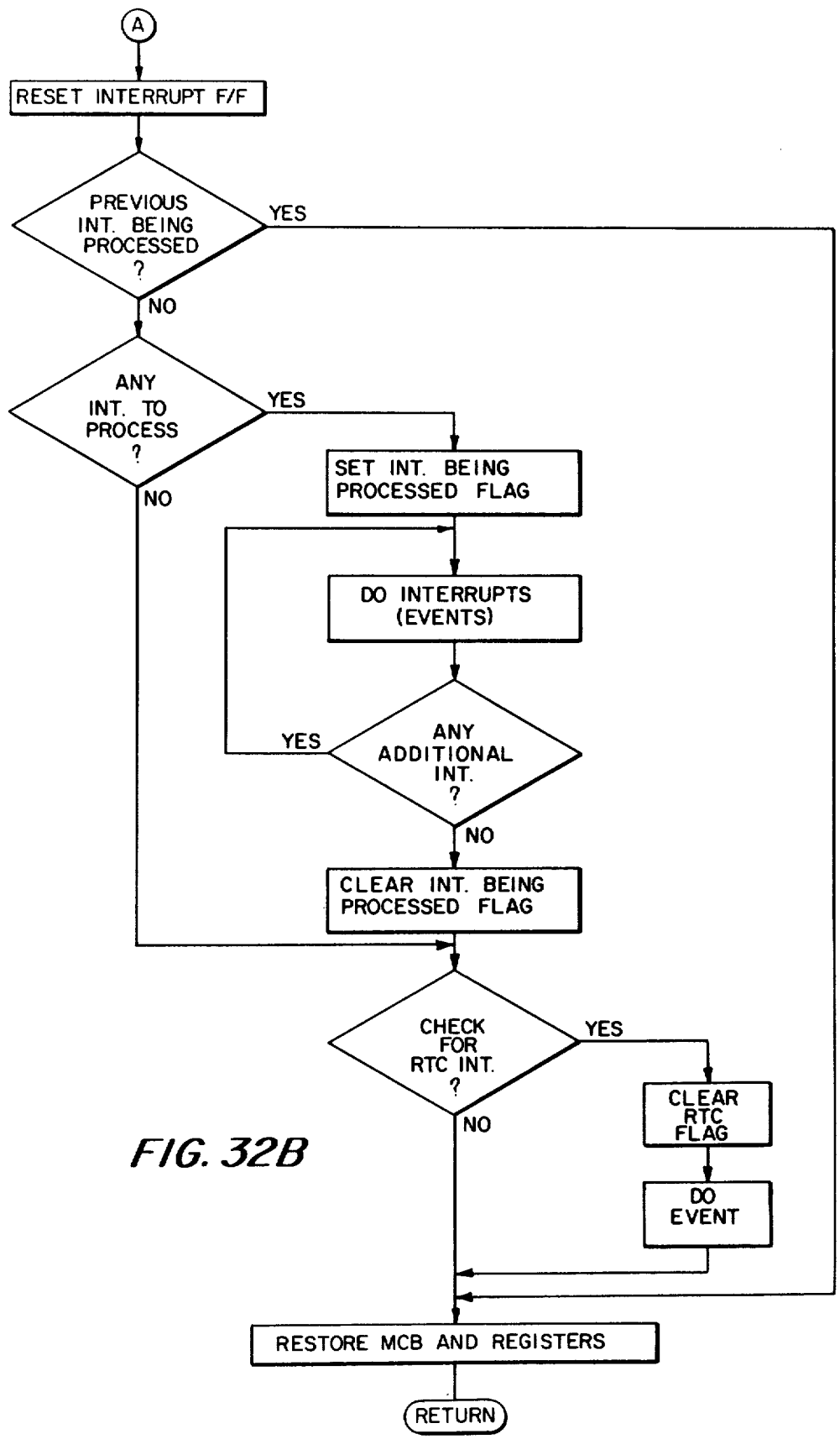

FIG. 32 is a flow chart of the interrupt handler module which is responsible for receiving interrupts from the machine clock and real time clock, saving the current status of the microprocessor, receiving and filtering the interrupt data and enabling a branch to the appropriate clock interrupt address (DO EVENTS). Since the interrupt handler is utilized for pseudo-interrupt operations the received data is similar in format to that shown in Table 5 or Table 5A. The Appendix listing of the interrupt handler is based on the format shown in Table 5A. Data is filtered by means of retransmitting the interrupt selection codes for two successive duplex transmission operations followed by a simplex read only instruction. Only bits which have consistent readings for the three data bits received will be utilized as indicative of a bit transition.

After filtering, the bits that have changed since the previous pseudo-interrupt operations are tested as to whether they represent QTABLE events, registration events or events necessitating a platen length calculation and start scan operation. Subsequently, catch-up events are checked and if there is sufficient time to perform these catch-up events, the highest priority event is executed and the interrupt flip-flop is reset. A check is then made to see if any previous interrupts are in process and if not, the interrupts required to be serviced are processed in a loop until all such interrupt flags representing changes in the pseudo-interrupt data word are serviced. The real time clock flag is then checked and any real time events are executed (for example, energizing the interactive display, motor checks for elevator up/down conditions, platen return time-out checks, etc.).

The program listing given in the Appendix detail the master system microprocessor control of the key xerographic steps in the machine cycle and as, for example, imaging control (platen scanning), fuser operations, paper path control (simplex/duplex operations), RDH operations (MACAS module), etc. These listings are fully annotated and reference is made thereto for a more complete description of the program sequence.

Set forth below is a description of the passive and active area controllers and their interconnection to the master unit.

PAPER PATH AREA CONTROLLER

Figure 33:
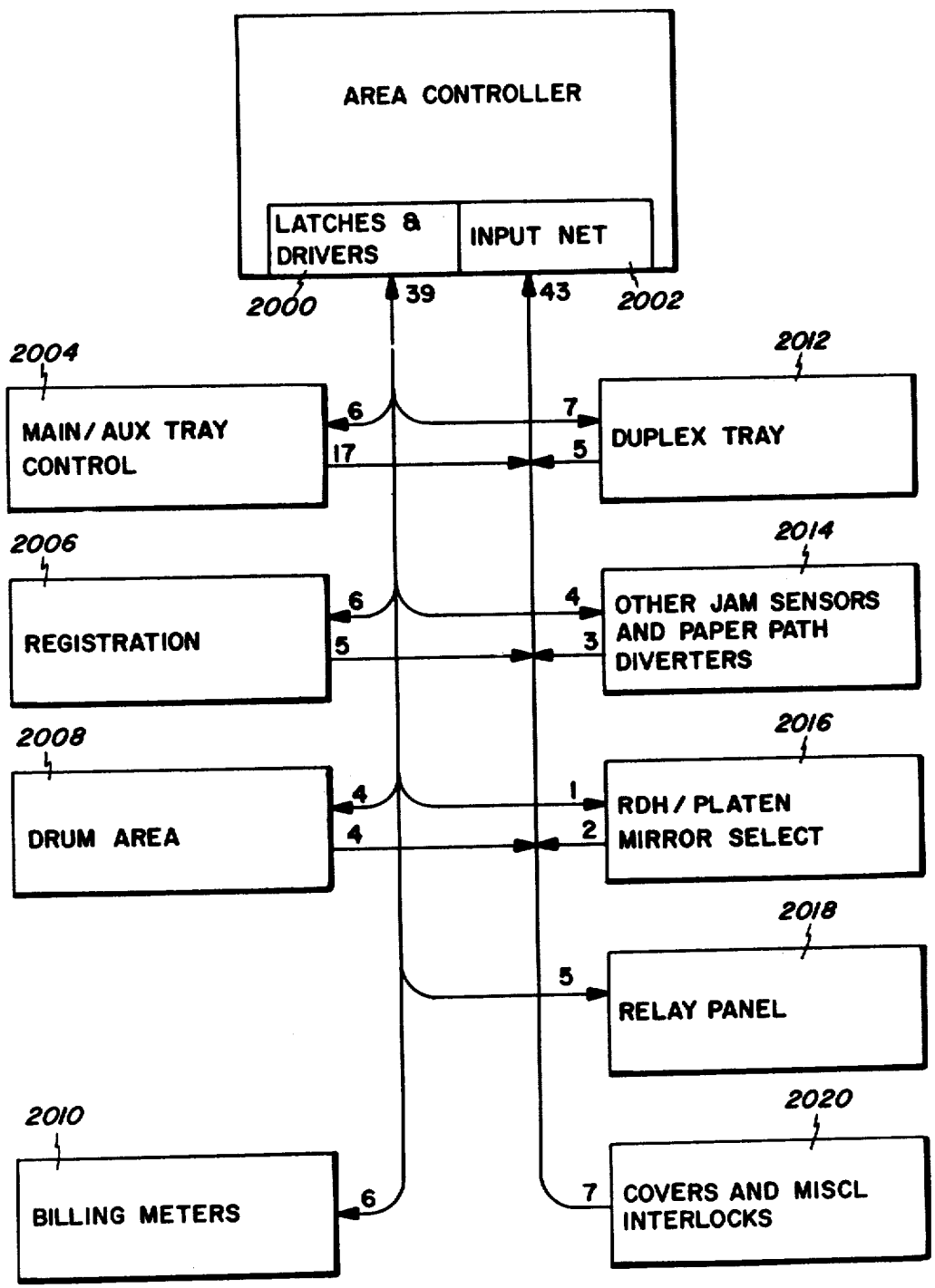
FIG. 33 is a block schematic diagram showing the major portions of the paper path controller utilized in accordance with the invention.

The functions of the paper path area controller are illustrated in block diagram form in FIG. 33. As shown therein, output data from the data latches and drivers (data latch 1508 and drivers 1505 of FIG. 23) may provide as many as sixty-four output data lines to various system devices within the paper path environment. Similarly, the tri-state buffers 1506 may handle as many as sixty-four input lines each line provided by a pull-up and diode protection network as required. The output latches and drivers are identified by number 2000 in FIG. 33, and the various input buffers together with any associated pull-up and diode networks are indicated as element 2002. The latch and driver network 2000 supplies for example six output signals to control various functions of the main/auxiliary tray control unit. Six additional lines are provided for the registration unit 2006, four lines to control the drum mechanism 2008, six lines to control the billing meters 2010, seven lines to control the duplex tray unit 2012, four lines to control various jam sensors and paper path diverters generally designated 2014, one line to control the mirror selection unit 2016 for RDH/platen operation, and five lines connected to a relay panel 2018 for various miscellaneous operation controls. Input lines as shown may also be provided from these same above-enumerated units as well as from miscellaneous interlocks identified generally as 2020.

A list of the various input and output signals for the paper path area controller 6 is given in Table 7. The input signals are identified by numbers PPI1-PPI45 together with the name of the input signal, the type of input utilized and the acronym utilized in the computer code for the identified signal. Similarly, output signals PPO1-PPO39 are listed together with the output signal description, output type and computer code acronym.

Figure 34:
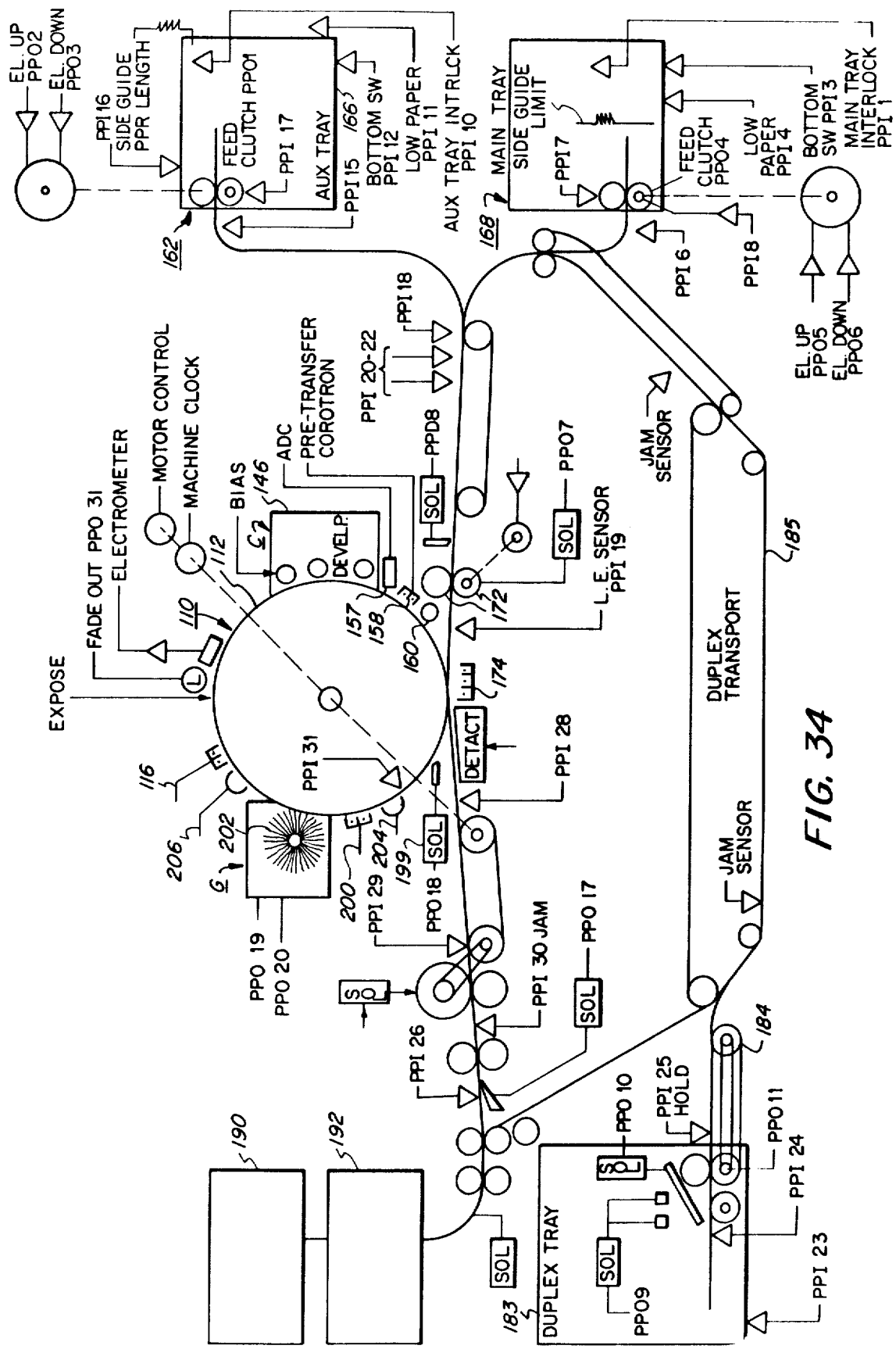
FIG. 34 is a schematic illustration of the major mechanical and electrical sensors and actuators utilized in the paper path area controller.

FIG. 34 illustrates a more detailed schematic of the paper path within the machine and the position of the various input sensors and output drives associated therewith. The key inputs and outputs are identified in FIG. 34 by the numbers PPIXX and PPOXX corresponding to the numbers utilized in Table 7. The basic machine elements such as the drum, corona generators, developer unit, and vacuum stripping system are numbered similarly as in FIG. 2. The abbreviation "sol" as used in the drawing indicates generally a solenoid for driving the output device, although clutches or other appropriate driving mechanism may well be utilized.

TABLE 7

| | INPUTS | | |
|---|---|---|---|
| ID NO. | INPUT SIGNAL | INPUT TYPE | ACRONYM |
| PPI1 | Main Tray Interlock | Switch | MTRY#ITK |
| PPI2 | Main Manual Down | Switch | |
| PPI3 | Main Bottom | Switch | MTRY#BOT |
| PPI4 | Main Low Paper | Switch | MLOW#PAP |
| PPI5 | Special Forms - Main | Switch | |
| PPI6 | Main Hold Station Sensor | Photo-Sensor | MTRY-HLD |
| PPI7 | Main Feed Head Up | Hall Eff. Sw | |
| PPI8 | Main Feed Head Down | Hall Eff. Sw | MSTK#HHD |
| PPI9 | Input Transport Interlock | Switch | IXPT#ITK |
| PPI10 | Aux Tray Interlock | Switch | ATRY#ITK |
| PPI11 | Aux Manual Down | Switch | |
| PPI12 | Aux Bottom | Switch | ATRY#BOT |
| PPI13 | Aux Low Paper | Switch | ALOW#PAP |
| PPI14 | Special Forms - Aux | Switch | |
| PPI15 | Aux Hold Station Sensor | Photo-Sensor | ATRY#HLD |
| PPI16 | Aux Feed Head Up | Hall Eff. Sw | |
| PPI17 | Aux Feed Head Down | Hall Eff. Sw | ASTK#HDD |
| PPI18 | Registration Xport Interlock | Switch | RXPT#ITK |
| PPI19 | Registration L.E. Sensor | Photo-Sensor | REG#LE |
| PPI20 | Registration T.E. Sensor-1 | Photo-Sensor | REG#TE1 |
| PPI21 | Registration T.E. Sensor-2 | Photo-Sensor | REG#TE2 |
| PPI22 | Registration T.E. Sensor-3 | Photo-Sensor | REG#TE3 |
| PPI23 | Duplex Drawer Interlock | Switch | DDWR#ITK |
| PPI24 | Duplex Out-of-Paper Switch | Switch | DTRY#PAP |
| PPI25 | Duplex Hold Station Sensor | Photo-Sensor | DTRY#HLD |
| PPI26 | Bi-level Xport Sensor | Photo-Sensor | |
| PPI27 | Stripper Xport Interlock | Switch | SXPT#ITK |
| PPI28 | Misstrip Detector | Switch | VXPT#PAP |
| PPI29 | Pre-fuser Paper Switch | Switch | PREFUS#S |
| PPI30 | Post-Fuser Paper Switch | Switch | PSTFUS#S |
| PPI31 | SOS Sensor | Photo-Sensor | SOS# |
| PPI32 | Cleaning Air Sensor | Switch | CLNG#AIR |
| PPI33 | Cleaning Filter Full | Switch | CLNG#FLT |
| PPI34 | Maintenance Interlock | Switch | |
| PPI35 | Compressor Air Switch | Switch | COMP#AIR |
| PPI36 | Platen Cover Interlock | Switch | PLTN#ITK |
| PPI37 | Door 2 Interlock | Switch | DOR2#ITK |
| PPI38 | Door 3 Interlock | Switch | DOR3#ITK |
| PPI39 | Door 4 Interlock | Switch | DOR4#ITK |
| PPI40 | Driver Turnaround Check | Gate | PPR#DRCK |
| PPI41 | Misc Driver Turnaround Check | Gate | |
| PPI42 | Duplex Drawer Unknown 1 | | |
| PPI43 | Duplex Drawer Unknown 2 | | |
| PPI44 | MACAS Mirror Position Sw | Switch | MIR#ITKM |
| PPI45 | Platen Mirror Position Sw | Switch | MIR#ITKP |

| | OUTPUTS | | |
|---|---|---|---|
| ID NO. | OUTPUT SIGNAL | OUTPUT TYPE | ACRONYM |
| PPO1 | Main Feed Clutch | Clutch | MAIN$FD |
| PPO2 | Main Elevator Up | AC Motor-Triac CKT | ELVUP$MN |
| PPO3 | Main Elevator Down | AC Motor - Triac CKT | ELVDN$MN |
| PPO4 | Aux Feed Clutch | Clutch | AUX$FD |
| PPO5 | Aux Elevator Up | AC Motor-Triac CKT | ELVUP$AX |
| PPO6 | Aux Elevator Down | AC Motor-Triac CKT | ELVDN$AX |
| PPO7 | Reg. Pinch Release Sol | Rot. Sol. | RPIN$REL |
| PPO8 | Reg. Gate Clutch | Clutch | REG$GATE |
| PPO9 | Set Separator Solenoid | Solenoid | |
| PPO10 | Normal Force Applicator | Clutch | NORM$FOR |
| PPO11 | Duplex Feed Clutch | DC Motor | DUP$FD |
| PPO12 | Side Guide Motor - CW | DC Motor-Relay | SGMT$CW |
| PPO13 | Side Guide Motor - CCW | Via Relays | SGMT$CCW |
| PPO14 | Jam Recovery Diverter Sol | Solenoid | |
| PPO15 | Jam Recovery Motor - Forward | AC Motor-Triac CKT | JAMREC$F |
| PPO16 | Jam Recovery Motor - Rev. | AC Motor-Triac CKT | JAMREC$R |
| PPO17 | Exit/Duplex Diverter Sol. | Solenoid | |

TABLE 7-continued

| | | | |
|---|---|---|---|
| PPO18 | Stripper Finger Solenoid | Solenoid | |
| PPO19 | Cleaning/Vacuum Blower | AC Motor-Relay | CLG$VAC |
| PPO20 | Cleaning Brush Motor | AC Motor-Relay | CLG$BRH |
| PPO21 | Stand-by Power Relay | Relay | STBY$RLY |
| PPO22 | Print Relay | Relay | PRNT$RLY |
| PPO23 | Start Capacitor Relay | Relay | START$CA |
| PPO24 | Mirror Drive Motor | AC Motor-Triac CKT | MIR$DRIV |
| PPO25 | Billing Meter #1 | MTR. Coil | |
| PPO26 | Billing Meter #2 | MTR. Coil | |
| PPO27 | Billing Meter #3 | MTR. Coil | |
| PPO28 | Billing Meter #4 | MTR. Coil | |
| PPO29 | Billing Meter #5 | MTR. Coil | |
| PPO30 | Billing Meter #6 | MTR. Coil | |
| PPO31 | Inter-Document Fade-Out EL Strip | EL Strip-Triac CKT | |
| PPO32 | Erase EL Strip | EL Strip-Triac CKT | ERASE$ |
| PPO33 | Pre-Clean EL Strip | EL Strip-Triac CKT | PRECLN$ |
| PPO34 | Duplex Tray-Spare 1 | Triac CKT | |
| PPO35 | Duplex Tray-Spare 2 | Triac CKT | |
| PPO36 | Reg. Xport Spare 1 | | |
| PPO37 | Reg. Xport Spare 2 | | |
| PPO38 | Reg. Xport Spare 3 | | |
| PPO39 | Reg. Xport Spare 4 | | |

RDH/ADF Control Console—Controller 8

Figure 35:
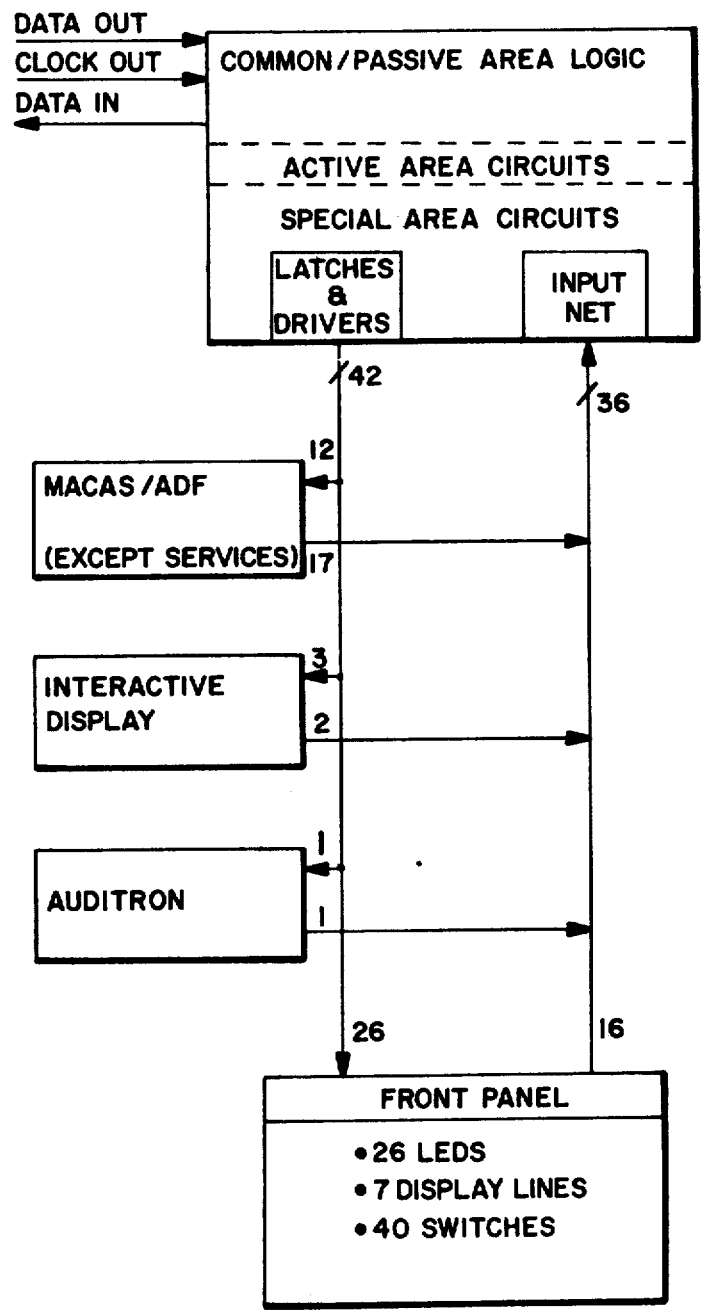
FIG. 35 is a block diagram showing the major components of the RDH/ADF control console controller.

An overall block diagram of the input and output lines for the RDH/ADF control console 8 is illustrated in FIG. 35. As can be seen, a plurality of input and output lines are connected to provide function controls for the RDH/ADF operating modes. These function controls may include, for example, sensing and controlling vacuum sources, scroll position, various pinch rolls and the like. The functions controlled by these input and output lines do not typically include servo functions which are separately controlled by the active area controller 10. It may also be seen that various input and output lines are connected to an interactive display which is located on the operator console for displaying various jam conditions. Additionally, the interactive display may provide sequential step information for various non-jam modes of operation in the machine. An audible alarm is also provided by means of control lines to an auditron as indicated.

A plurality of front panel input and output lines are also provided as a means to allow operator control of machine modes and job requirements. For example, the operator may select a number of copies for a multiple copy run, whether the machine is to be operated in the RDH or platen mode, the magnification desired, contrast information, simplex/duplex information paper size and the like. Various LED and seven-segment displays are proved to assist the operator in programming the particular job as required. Table 8 shows input and output signals utilized in the area controller 8, namely, those signals utilized as the function controls for the RDH/ADF mechanism as well as for the interactive display. It is noted in Table 8 that the input signals for the function controls and the interactive display are identified by the labels CCI1-CCI19 (Control Console Inputs). Similarly, outputs are labeled CCO1-CCO16 (Control Console Outputs). It is also noted that the term RDH (recirculating document handler) is interchangeable with the term MACAS, the latter term used extensively in the computer listings.

Figure 36:
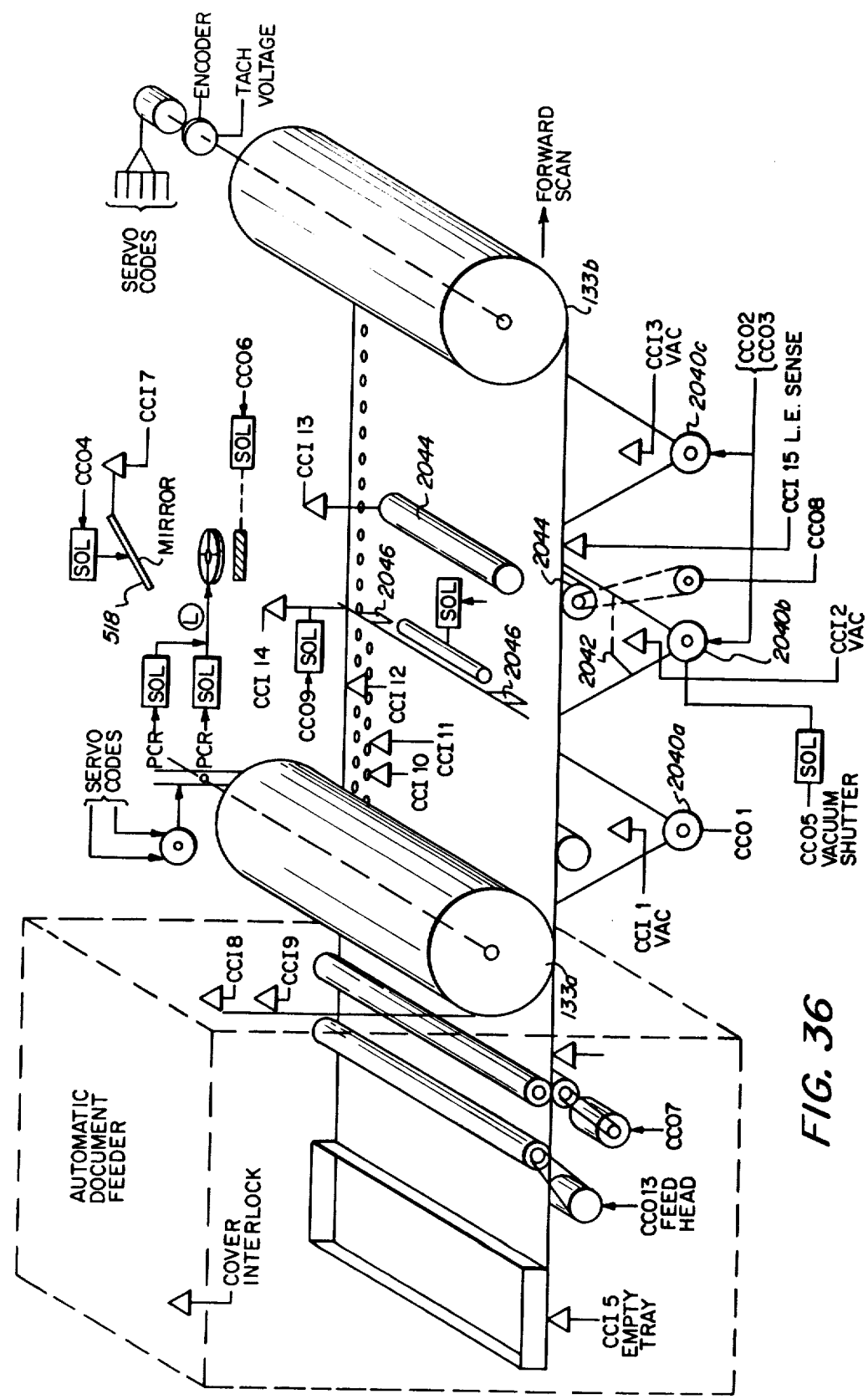
FIG. 36 is a schematic drawing illustrating the major mechanical and electrical sensors and actuators utilized in the RDH/ADF control console controller as well as the servo controller.

FIG. 36 shows in more detail the key input sensors and output devices under the control of the RDH/ADF Control Console 8. Elements corresponding to those of FIG. 2 are similarly labeled. The web 132 is rolled around scrolls 133a and 133b. Scroll 133a may be moved into different positions to allow manual or automatic (ADF) loading, and for run positioning. The Automatic Document Feeding (ADF) apparatus may be provided on the machine as an optional feature and is shown in dotted lines.

Also illustrated in FIG. 36 are three vacuum blower motors 2040a-c used to hold the document securely against web 132. A shutter 2042 reduces the effect of vacuum motor 2040b to allow ease of document loading. Pinch rollers 2044 provide the driving means for web 132. A gate 2046 is utilized for initial document registration during document loading, and sensors are utilized to indicate the gate finger up or down position. Sensors are also provided to monitor registration apertures positioned along the edge of web 132. These "tracks" (A and B) are used to provide position and speed information to the servo control area controller 10 as explained more fully below. Signals which are used in connection with the servo control area controller 10 are identified as SRI (Servo Remote Inputs) and SRO (Servo Remote Outputs). Signals controlled by the process control area controller 12 have a prefix PCI (process control inputs) and PCO (process control outputs).

TABLE 8

FUNCTION CONTROLS
INPUTS

| ID NO. | INPUT SIGNAL | ACRONYM |
|---|---|---|
| CCI1 | Vac. Sensor #1 | Vac. # Sen 1 |
| CCI2 | Vac. Sensor #2 | Vac. # Sen 2 |
| CCI3 | Vac. Sensor #3 | Vac. # Sen 3 |
| CCI4 | Vac. Shutter Position | |
| CCI5 | ADF Feed Tray | ADF # TRYE |
| CCI6 | ADF Feed Head | ADF # FDHD |
| CCI7 | Mirror For/Rev | MMIR # FOR |
| CCI8 | Scroll Position #1 | MROL #1 |
| CCI9 | Scroll Position #2 | MROL #2 |
| CCI10 | MACAS # Track | |
| CCI11 | Track B1 | MTRK # B1 |
| CCI12 | Track B2 | MTRK # B2 |
| CCI13 | Pinch Roll Sense | ADF # Sense |
| CCI14 | Gate Sense | |
| CCI15 | MACAS Lead Edge | |
| CCI16 | Multi-sheet Feed ADF | Multi # FD |
| CCI17 | MACAS Cover ILK | MCVR # ILK |

INTERACTIVE DISPLAY

TABLE 8-continued

INPUTS

| | | |
|---|---|---|
| CC118 | Orientation Request | Learn # RQ |
| CC119 | Index Reference | ID # REF |

FUNCTION CONTROLS OUTPUTS

| | | |
|---|---|---|
| CCO1 | Front Blower | FRNT # VAC |
| CCO2 | Middle Blower | MID # VAC |
| CCO3 | Rear Blower | REAR # VAC |
| CCO4 | Mirror For/Rev | MIR # REV |
| CCO5 | Vac. Shutter | Vac. # SHUT |
| CCO6 | MACAS Patch | MAC # SOL |
| CCO7 | ADF Pinch Roll | ADF # PNCH |
| CCO8 | MACAS Pinch Roll | MAC # PNCH |
| CCO9 | MACAS Gate | MAC # REG |
| CCO10 | ADF Reverse | ADF # REV |
| CCO11 | MACAS Cover Detent | CVR # DTNT |
| CCO12 | MACAS Cover Lock | CVR # Lock |
| CCO13 | ADF Motor Control | ADF # Mot |

INTERACTIVE DISPLAY OUTPUTS

| | | |
|---|---|---|
| CCO14 | Lamp Driver #1 | ID # Lamp 1 |
| CCO15 | Lamp Driver #2 | ID # Lamp 2 |
| CCO16 | Motor | ID # Mot |

RDH/Platen Servos—Controller 10

Figure 37:
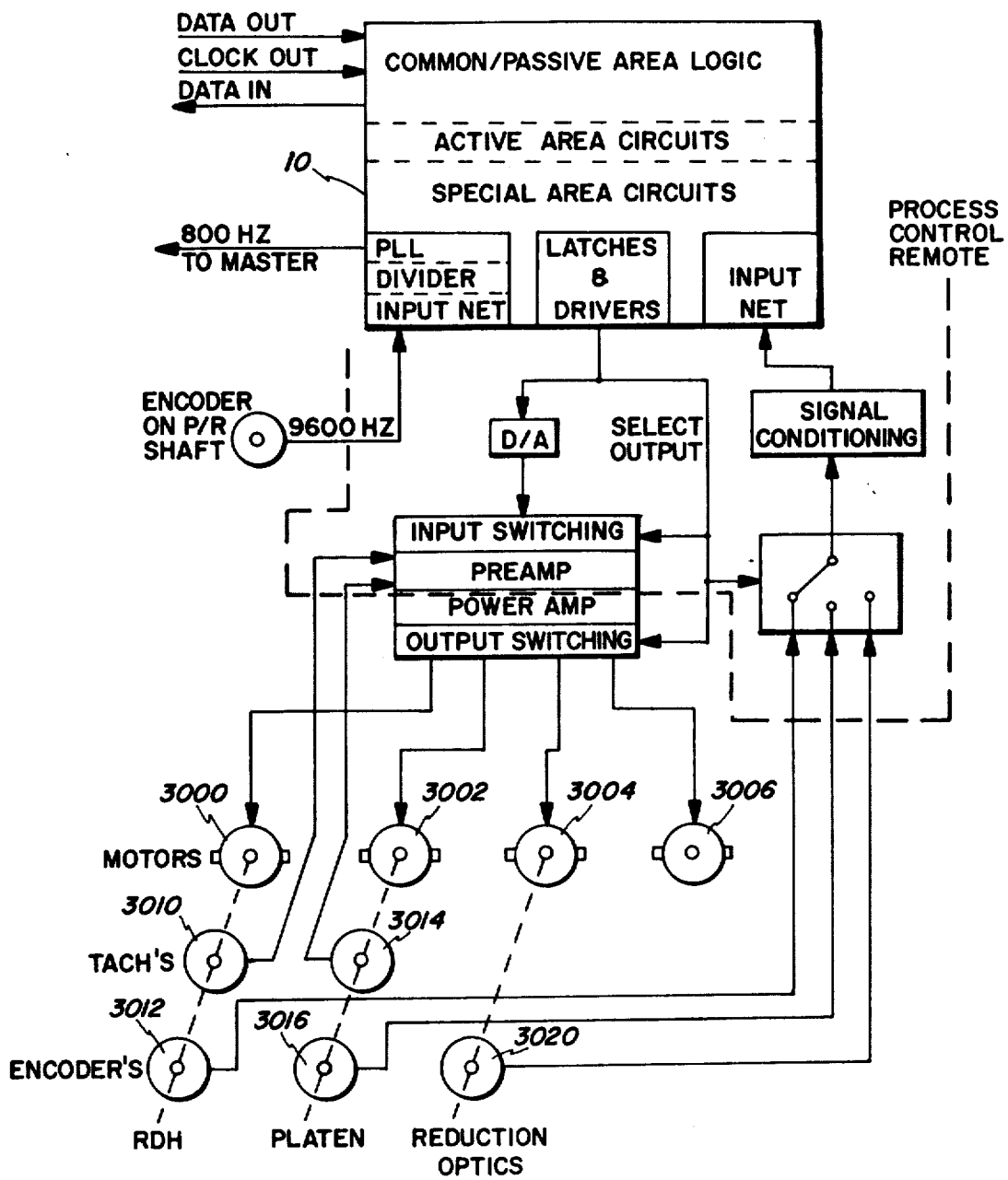
FIG. 37 illustrates a block diagram of the servo controller showing the key components thereof.

The area controller 10 governs the RDH and platen servos as diagrammatically illustrated in FIG. 37. The prime purpose of the servo remote controller 10 is to control four motors, namely, the RDH motor 3000, the platen motor 3002, the reduction optics motor 3004 and the scroll motor 3006. The RDH motor 3000 controls the movement of web 132 when utilizing the pre-collating feature available for the recirculating document handler. A tachometer 3010 and an encoder 3012 provide various input signals to the area controller 10 as shown. A similar tachometer 3014 and encoder 3016 are associated with the platen motor 3002 and additionally provide input signals to the area controller 10. The platen motor 3002 is utilized to drive the scanning lamp 124 (FIG. 2) for platen scan mode operation of the machine.

Reduction optics motor 3004 provides the drive means for positioning lens 130 (FIG. 2) enabling use of the variable magnification feature of the machine. Encoder 3020 is utilized to provide position signals to the area controller 10 which signals are indicative of the position of lens 140.

Scroll motor 3006 is utilized to position the scroll carrying web 132 to provide paper feed input, run position, ADF feed positioning and the like.

The various input and output signals utilized in the servo controller 10 are listed in Table 9. An understanding of the function of the various input and output signals is apparent from Table 9 taken in conjunction with FIGS. 2, 34, 36, 37 and 38.

Figure 38:
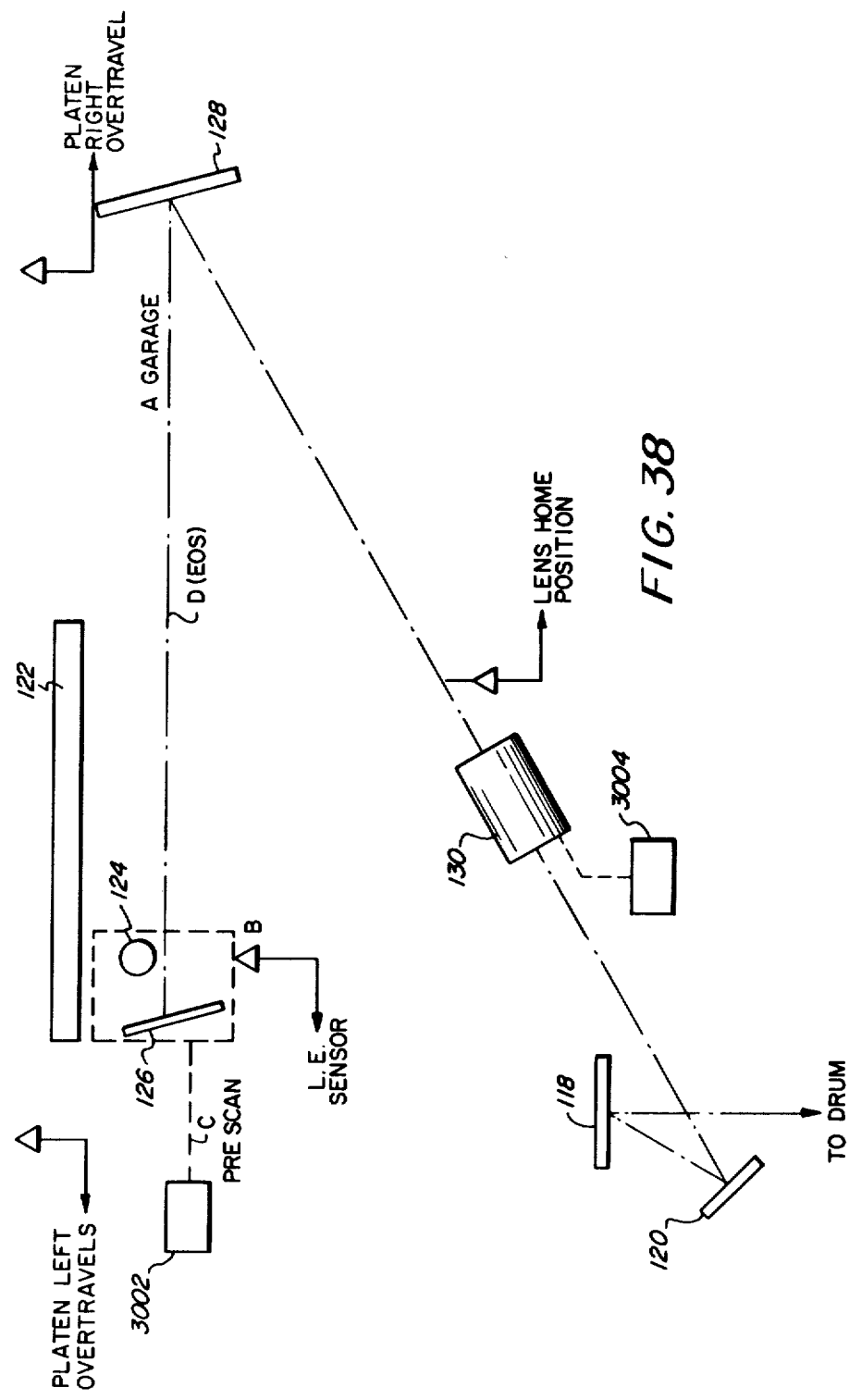
FIG. 38 is a schematic drawing of the key platen scanning components.

FIG. 38 shows the major optical scanning elements of the machine which are used during platen scan operations. The stand-by position for the scanning lamp 125 (which is physically connected to a carriage together with mirror 126 as indicated by dotted lines) is shown as position A, and is used during RDH operations as well as machine stand-by. Position A is termed the home or garage position. In utilizing the platen scanning mode of operation, the operator selects the desired copy paper size, the desired magnification and initiates platen scan by pushing the start scan button. From the copy paper size and modification information, the master unit calculates the required velocity (BRM$0-BRM$11 data) and end of scan (EOS) position of the lamp 124. This information is fed to the servo controller 10 to control the lamp motion. Prior to a document scan an initialization or dummy scan is made while other machine devices are preparing for the platen scan mode (copy paper feed, etc.). During this initialization scan, the carriage moves to the leading edge (LE) sensor, position B. A document pre-scan takes place from position B to position C after which follows the document scan proper from left to right in FIG. 38. The distance between position B and C is quite small and the LE sensor will remain active, generating the P#LE signal until the lamp moves off the sensor going from left to right (document scan) in FIG. 38. The end of scan (EOS) occurs at position D which, of course, is variable depending on the copy paper size and magnification selected. The lamp 124 remains at the EOS position until the end of the initialization step after which a true document scan takes place, e.g. position D to position C for retrace and pre-scan and position C to position D for document scan. After scanning, the lamp 124 remains at position D until another document scan is requested, and, if none occurs within a particular time-out alloted, the lamp 124 moves back to the home or garage position A.

The lens 130 is controlled by the reduction optics motor 3004. A lens home signal (LNHM#PST) is generated by a fixed sensor which, together with encoder signals, enables control of the position of lens 130 to enable selection of the desired magnification.

TABLE 9

SERVO CONTROLLER
Master Output Direct to Machine

| Byte Name | Port | Acronym | Description |
|---|---|---|---|
| SYS$SLT | 0 | TST$BT | MACS Turn Around Test Bit |
| | | O$AFD | Address Fault Detection MUX Control |
| | | PLT$SLT | Platen System Select - Relay Drivers |
| | | MCS$SLT | MACAS System Select - Relay Drivers |
| | | SCL$SLT | Scroll System Select - Relay Drivers |
| | | RDCT$SLT | Reduction System Select - Relay Drivers |
| INT$EN | 7 | PLE$EN | Platen Lead Edge Interrupt Enable |
| BRM$PT1 | 1 | BRM$O-BRM$7 | Binary Rate Multiplier Bits 0-7 |
| BRM$PT2 | 2 | BRM$7-BRM$11 | Binary Rate Multiplier Bits 7-11 |
| | | LO$TST | Input port low - test |

TABLE 9-continued

| | | HISTST | Input port high - test |
|---|---|---|---|
| | | *Master Input Direct From Machine* | |
| TATST#BT | 0 | TST#BT | MACS Turnaround Test Bit |
| | | DRV#TST | Relay Driver Test Bit |
| | | BRM#TA | BRM Input Test Bit |
| PSD#INT | 7 | GR#IN | Grounded at Input |
| | | SCR#RESP | Servo Microprocessor Station Return Bit |
| | | P#LE | Platen Leading Edge Pseudo-Int. |
| FLG#IN | 1 | LNHM#PST | Lens Home Position Switch |
| | | BRM$1 | Address Fault Detection Test Bit |
| | | P#RGT | Platen Right Overtravel |
| | | POVT#LFT | Platen Left Overtravel |
| | | PA#TMP | Power AMP Over Temp Sense Input |
| | | SVLP#LK | Servo Phase Loop Locked Bit |
| | | MCLP#LK | Machine Phase Loop Locked Bit |
| | | *REMOTE CONTROLLER OUTPUT TO MACHINE* | |
| DAC$DATA | 1 | DAC$0-7 | D-A Converter Input Bits 0-7 |
| INT$SLT | 2 | DAC$POL | D-A Converter Polarity |
| | | INTSLT$1-5 | Interrupt Select Line 1-5 |
| | | DR$LSB | Interrupt Divide Rate Least Sign. Bit |
| | | DR$MSB | Interrupt Divide Rate Most Sign. Bit |
| SW$CNTL | 3 | MCAP$LP | MACAS Capture Loop Enable |
| | | PCAP$LP | Platen Capture Loop Enable |
| | | RTVL$ON | Retrace Velocity Gain Enable |
| | | SP$SW | Spare Analog Switch Enable |
| | | INT$CLR | Interrupt FF Clear |
| | | AFD$MUX | Remote Address Fault Detection Control Bit |
| | | *REMOTE CONTROLLER INPUT FROM MACHINE* | |
| INT#DATA | 1 | INTDT#0-7 | Interrupt Data bits 0-7 (TTL) |
| SLW#FLG | 2 | MVL#CMP | MACAS Velocity Compare |
| | | PVL#CMP | Platen Velocity Compare |
| | | P#OVTRGT | Platen Overtravel Right |
| | | POVT#LFT | Platen Overtravel Left |
| | | LMN#PST | Lens Home Position |
| FST#FLG | 3 | CHAN#A | Encoder Channel A Clock |
| | | CHAN#B | Encoder Channel B Clock |
| | | ENC#DRT | Encoder Direction |
| | | D#PLE | Remote Platen Lead Edge |
| | | PHS#DRT | Encoder Phase Direction (LED/LAG) |
| | | INT#ATTN | Interrupt Attention (Data Latch Rdy) |
| | | ATTN#1 | Area Microprocessor Attention (Command Present) |
| | | ATTN#2 | Area Microprocessor Attention (Data Present) |

Master/Servo Software Communications

The servo controller 10 is an active area controller and is similar in overall structure to the process control controller 12 illustrated in FIG. 3. As such, a number of input sense signals and output drive signals go through the controller and are not specifically controlled by the area microprocessor 1600 of the active servo controller 10. Other input and output signals, are however controlled by the area microprocessor 1600. Thus, control of the functions of the servo controller 12 is divided in that some functions are passed to the master unit 1 for control and other functions are controlled directly by the area microprocessor 1600. The area and master microprocessors are programmed to cooperatively function to produce all of the necessary control signals which are within the realm of the servo controller 10. Table 9 lists the various input and output signals together with the acronym utilized in the computer codes (appendices hereinafter).

Figure 39:
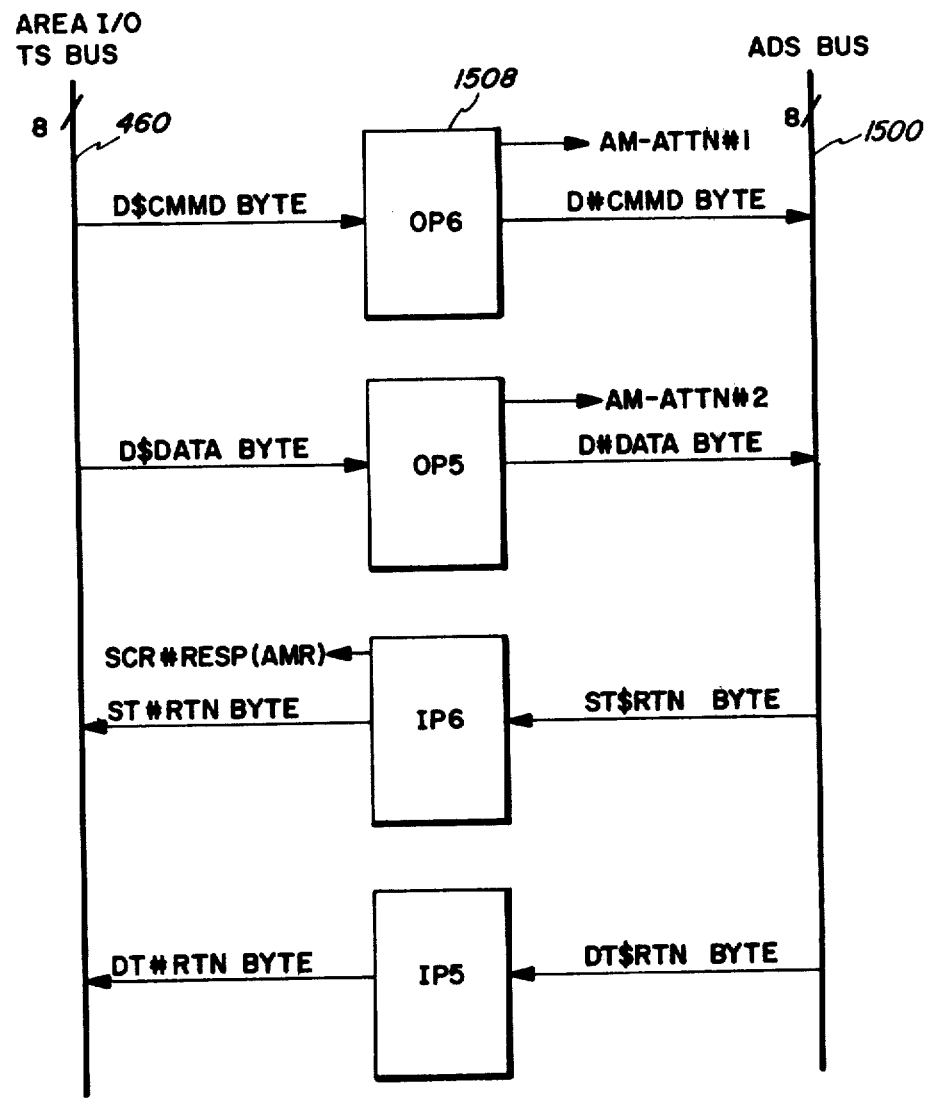
FIG. 39 is a block diagram showing the port structure utilized for the master-servo controller communication path.

Communications between the area microprocessor 1600 and the master I/O interface 4 is illustrated in FIG. 39. FIG. 39 is similar to FIG. 23B except that two inputs ports and two output ports are dedicated to master microprocessor/area microprocessor communications.

The servo controller/master communications instruction set consists of a group of single-byte and two-byte instructions. The instructions set is also divided into command instructions and data instructions. The command instructions result in a load motion change, i.e. RDH stop, platen start scan, etc. The data instructions determine a speed or position for the appropriate load instruction.

All of the command instructions and some of the data instructions are single-byte in length. These are called command bytes and are read by the area microprocessor from its command byte input port (the area microprocessor input port is effectively the master output port, e.g. the area microprocessor command byte is present on OP6 of FIG. 39). The data instructions which require a calculation by the master microprocessor 300 are two bytes long. The first byte is the command byte which identifies the particular servo system (scroll, RDH, reduction or platen) and tells what the data represents. The second byte, the data byte, contains the actual data that gets stored into the area microprocessor memory. In the case of the two-byte instructions, the command byte is read from the command byte input port (OP6 of FIG. 39), and the data byte is read from the data byte input port (OP5 of FIG. 39). The command byte comprises eight bits. Bits 0–3 are identified as I1-I4 and designate the particular instruction field designating the desired instruction. Bits 4 and 5 are utilized to designate a normal operation/diagnostic mode instruction and a data/command instruction, respectively. For example, when bit 5 is set the particular instruction is a command instruction; otherwise, it is a data instruction. Bits 6 and 7 comprise the system or "S" field. These bits identify the particular servo to which the instruction pertains. Bit 6 is designated S1, and bit 7 is designated S2. The following code is utilized:

| S2 | S1 | Servo |
|----|----|-------|
| 0 | 0 | Scroll |
| 0 | 1 | RDH (MACAS) |
| 1 | 0 | Reduction |
| 1 | 1 | Platen |

The instruction set and the operational code assigned for each instruction set using the format outlined above is listed in Table 10.

TABLE 10

| SERVO COMMUNICATIONS INSTRUCTION SET | | | |
|---|---|---|---|
| COMMAND BYTE (HEX) | ONE-BYTE COMMAND | COMMAND BYTE (HEX) | TWO-BYTE COMMAND |
| 00 | Send Status | 94 | Reduc. Length LS Byte |
| FF | System Stop | 98 | Reduc. Length MS Byte |
| 32 | Scroll Reverse | D1 | Velocity LS Byte |
| 34 | Scroll Forward | D2 | Velocity MS Byte |
| 38 | Scroll Stop | D4 | Platen Length LS Byte |
| 14 | Scroll Slow | D8 | Platen Length MS Byte |
| 18 | Scroll Fast | | |
| 51 | RDH 50 IPS | | |
| 52 | RDH 20 IPS | | |
| 54 | RDH 15 IPS | | |
| 58 | RDH Creep | | |
| 71 | RDH Reverse | | |
| 72 | RDH Forward | | |
| 74 | RDH Stop | | |
| 78 | RDH Jam Stop | | |
| B0 | Reduction Data | | |
| B2 | Reduction Initialize | | |
| B4 | Reduction Reverse | | |
| B8 | Reduction Forward | | |
| F0 | Platen Data | | |
| F1 | Platen Initialize | | |
| F2 | Seek Garage | | |
| F4 | Seek EOS | | |
| F8 | Start Scan | | |

The data byte format is quite straightforward, D7-D0 corresponding to bits 7 and 0, respectively, in the data field with bit 7 being the most significant bit and bit 0 being the least significant bit.

Status return information, as seen in FIG. 39, is fed from the area microprocessor to the master microprocessor via input ports IP5 and IP6. The status return byte is used by the servo controller to communicate to the master unit the present status of the servo system program. When the status of one of these systems changes, the appropriate bits of the byte are changed. The change is initiated in response to an instruction from the master unit with the corresponding execution of the servo controller microprocessor. The new status is loaded into the status return port (IP6) which initiates, when polled, a pseudo-interrupt for the master unit.

The format of the status return byte is similar to the command byte format. Bits 0–3 are designated S0–S3 and correspond to the I-field in the command instructions. Bit 4, S4, represents the ready/busy (not ready to receive instructions), status of the servo controller microprocessor. Bit 5, S5, is cleared if the error checking routine within the servo controller microprocessor detects a transmission fault. Bits 7 and 6, S7 S6, correspond with the S-field of the command bytes and represent the particular servo system that that has been selected by the master microprocessor.

Figure 40:
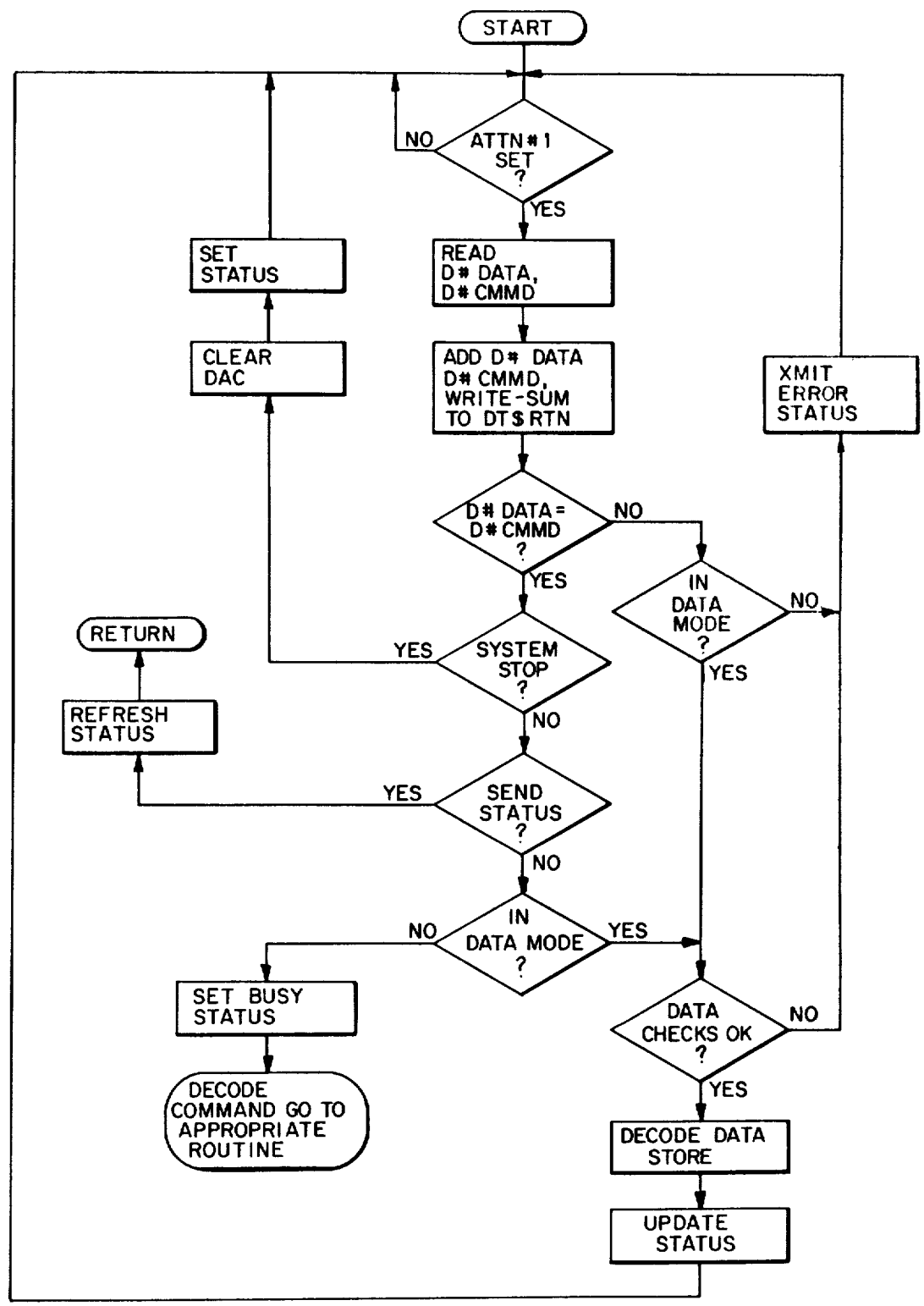
FIG. 40 is a flow chart showing the major steps utilized for the communication routine between the master and area servo controller.

The communications routine is entered in the servo controller microprocessor when the AM-ATTN1 input bit is set. This occurs when the master microprocessor writes information into OP6 of the servo controller. The area microprocessor of the servo controller then reads both the command and data information stored at OP6 and OP5. After this command and data information is read, transmission error checking is performed and the received instruction is then tested to see if it is one of two special types of instructions. These instructions are independent of the system being operated. If the instruction is not special, an internal flag, DATA MODE, is checked. If the area microprocessor is in the DATA MODE, then the instruction is decoded as a data instruction. If the area microprocessor is not in DATA MODE, then the instruction is decoded as a command instruction. At the end of each decision branch, the appropriate servo controller status is loaded in the status return output ports for input to the master. The communications routine flow chart is shown in FIG. 40.

The error checking scheme is essentially a double transmission system. The master unit sends the command instructions twice, and the area microprocessor reads these instructions and compares them for equality. The result of the equality check is indicated by transmission of the error status bit in the status return byte for the master to read (bit S5). Further, the two bytes received by the active controller are added together and the sum is loaded in the data return output port for the master to read. The master will similarly check the sum data to aid in error detection of two-byte instructions.

Phase Lock Loop Control

Figure 41:
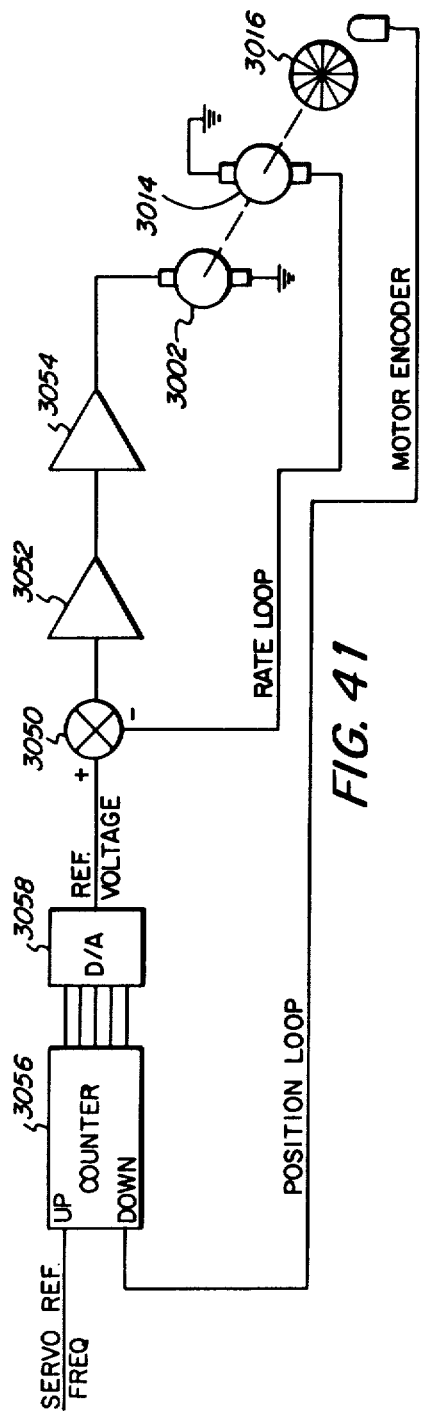
FIGS. 41-43 show logic circuitry utilized in the phase lock loop control of the servo controller.

A major function of the area microprocessor 1600 for the servo controller 10 is to implement a phase lock loop control of the platen servo motor 3002 and the RDH servo motor 3000. Some special hardware is utilized in the area controller 10 to assist the area microprocessor in such control. As indicated in FIG. 37, this hardware may also be utilized to provide the 800 Hz clock signals to the master I/O interface 4. FIG. 41 illustrates the overall PLL control scheme for the platen servo motor 3002. A similar circuit may, of course, be utilized for the RDH servo motor 3000. As seen in FIG. 41 the servo control circuit utilizes a rate loop or minor loop which is connected to provide signals from the tachometer 3014 to a adder 3050. The adder additionally receives a reference voltage which is compared with the voltage from the tachometer to generate an error signal. The error signal is fed to a pre-amplifier 3052 and a power amplifier 3054 to correct the servo motor 3002. A major or position loop is also provided in the servo control circuit utilizing encoder 3016 to derive position signals termed MOT ENCODER signals. The MOT ENCODER signals are fed to the down input of an up/down counter 3056, which has its up input terminal connected to receive the servo reference frequency. The counter 3056 may be preloaded to a desired nominal count rate corresponding to the reference voltage desired for input to the adder 3050. The output of counter 3056 is converted to analog form via D/A converter 3058 to provide the desired reference analog voltage.

The software utilized in the servo controller 10 effectively replaces the up/down counter 3056 and allows more sophisticated and elaborate control of the digital value which is sent to the D/A converter for use as the reference voltage to adder 3050.

Figure 42:
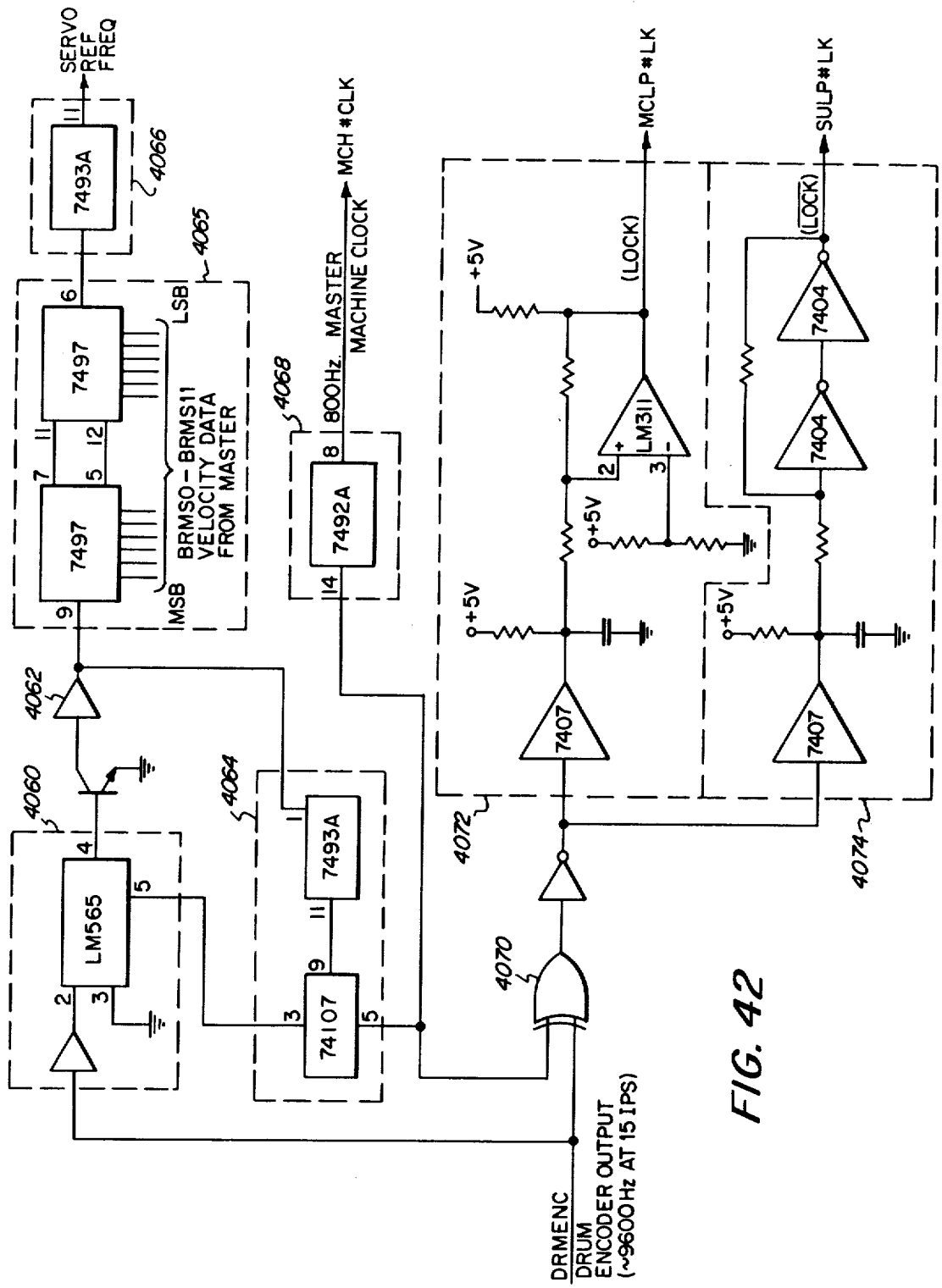

FIG. 42 illustrates a schematic diagram of the clock generating circuits utilized as part of the special area circuits for the servo controller 10. The basic input to FIG. 42 is the encoder output signals from the drum which are nominally 9600 Hz at 15 IPS. The encoder signals, DRMENC, are fed to a free running phase lock loop circuit 4060 (Model No. LM565), which is connected in a feed back path via amplifier 4062 and divided by 32 circuit 4064. The effect of the phase lock loop circuit is to produce a frequency at the output of amplifier 4062 which is 32 times the DRMENC signal frequency. This output signal is phase locked to the DRMENC signals. The output of amplifier 4062 is fed to a binary rate multiplier (BRM) circuit 4065 which may comprise, for example, two Model 7497 chips. Each of these chips receives a six bit data code, and the composite twelve bit code is simply the servo velocity data BRM$0-11 from the master microprocessor. The velocity data is generated from the master in response to the operator's selection of a particular copy size and a particular desired magnification. If N represents the integral decimal value of the BRM$ data then the output of binary rate multiplier 4065 is simply N/(64×64) multipled by the input frequency (output of amplifier 4062). The output of binary rate multiplier 4065 is fed to a divide by 16 circuit 4066 which provides the servo reference frequency utilized as the up input to counter 3056 (See FIG. 41). It may thus be seen that the output of the divide by 16 circuit 4066 may effectively by utilized by provide a large number of different servo reference frequencies for use in controlling the platen servo motor 3002. Additionally, it is seen that these frequencies may not necessarily be integral harmonics or subharmonics of the drum encoded output signals, DRMENC signals. The binary rate multiplying circuit permits fractional multiplication of the drum encoded output signals to thus provide a wide range of possible frequencies for phase lock control. Thus, a large number of magnifications may be selected by the operator and the required platen scan velocity may be implemented with phase lock control for all such selections. Effectively, the operator may select magnifications at imperceptable magnification increments.

FIG. 42 also illustrates the generation of the master machine clock signal, MCH#CLK which has a frequency of 800 Hz. This signal is generated from a 9600 Hz output of the divide by 32 circuit 4064 via a divide by 12 circuit 4068. Phase lock signals (LOCK) are also provided by comparing the 9600 Hz output of the divide by 32 circuit 4064 with the DRMENC signals from the drum encoder. The comparison is made in an exclusive OR circuit 4070 which feeds an inverter which in turn supplies a phase error signal to a fine phase lock comparison circuit 4072 and a coarse phase lock comparison circuit 4074. The fine phase lock comparison circuit 4072 provides an output signal MCLP#LK which tells the master microprocessor if the drum is running close to the desired speed. The coarse phase lock comparison circuit 4074 tells the master microprocessor if the drum is in fact running at all.

Figure 43:
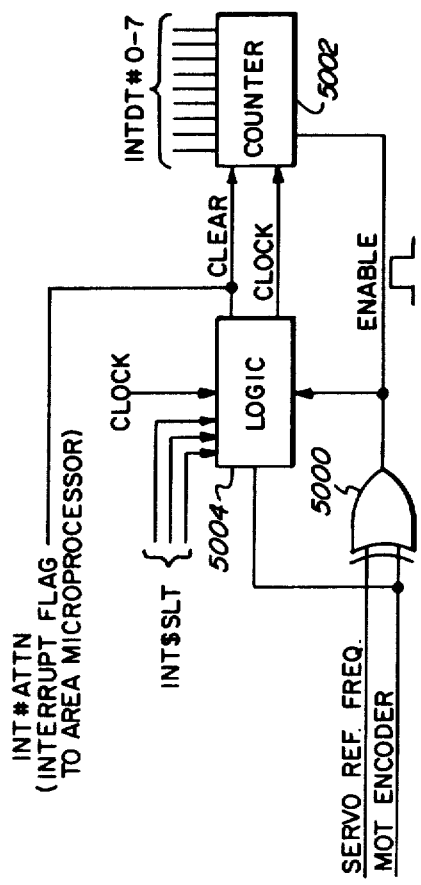

FIG. 43 illustrates the logic circuitry utilized to provide the area microprocessor 1600 with the necessary interrupt data indicative of the phase lock error to allow proper servo control. The motor encoder signals from FIG. 41 together with the servo reference frequency signals from FIG. 42 are fed to an exclusive OR circuit 5000. The output of exclusive OR circuit 5000 is high only for a period of time representing the phase difference between the servo reference frequency and the actual motor encoder frequency. The output of exclusive OR circuit 5000 is utilized to provide an enable signal to counter 5002 which counts a high frequency clock signal via a logic circuit 5004. The high frequency clock signal may be the area microprocessor clock or a signal divided down therefrom to provide multiple resolution ability. The counter utilized may, for example, be a eight bit counter fabricated from Model 74161 chips. The counter is designed to stop after reaching the maximum count number and does not recycle. The logic circuitry simply clears counter 5002 after the next clock pulse subsequent to the disappearance of the enable pulse. The counter contents are fed to the area microprocessor as interrupt data bits INTDT#0-7. Additionally, the clear signal is utilized to provide the interrupt flag or the interrupt attention signal to the area microprocessor. The data from the counter 5002 is first latched via tri-state buffers as indicated in FIG. 23B. The area microprocessor utilizes the data from counter 5002 as indicative of the amount of phase difference between the servo reference frequency and the motor encoder frequency. The interrupt data is processed in the area microprocessor, and a digital value is derived which is substantially converted to analog form (D/A converter 3058 of FIG. 41) for use in providing a reference voltage for the rate loop in the servo control circuit. The D/A conversion circuitry (not shown) may be fabricated utilizing Motorola chip Model No. NC1408SL8 current switches together with a current voltage converter as for example, Model MC1723C.

Provision is also made in the circuitry of FIG. 43 to utilize the MOT ENCODER signal itself on the enable for counter 5002. In this fashion the width of the motor encoder signal corresponds to the motor velocity and the interrupt data byte INTDT# then provides such velocity information to the servo area controller. The selection of the enable signal is made by data selectors within the logic circuit 5004 which are responsive to the interrupt select byte INT$SLT from the area controller.

Servo Controller Software

Figure 44:
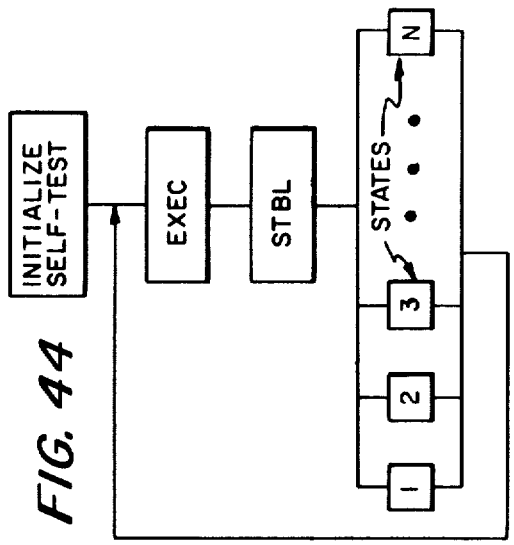
FIG. 44 illustrates an overall flow chart of the operation of the servo controller software.

FIG. 44 illustrates an overall flow chart for the operation of the area microprocessor for the servo controller 10. After an initalization process which includes a self-test of memory units, the area microprocessor enters into an executive routine, which is utilized to select one of a number of different states defined in relation to the RDH, scroll, reduction optics and platen. The program proceeds through each state and returns to the executive program. There are effectively no loops within the entire process except for the main loop exiting from the state and returning to the top of the executive program. The various states for the scroll and platen are listed below:

| SCROLL STATES | | |
| --- | --- | --- |
| Forward Fast | SFDFST | |
| Forward Slow | SFDSLO | |
| Reverse Fast | SRVFST | |
| Reverse Slow | SRVSLO | |
| Stop | SSTOP | |
| | SACTIVE | |
| PLATEN STATES | | |
| +Initialize (Seek Lead Edge) | PLINIT | PLINIT1* |
| Home (Seek Storage) | PLHOME | PLHOME1* |
| +Seek EOS | PLEOS | PLEOS1* |
| Stop | PLSTOP | PLSTOP1 |
| Accelerate | PLACL | PLACL1* |
| Phase Lock | PLOCK | PLOCK1* |
| +Retrace | PRTN | PRTN1* |
| Ready | PRDY | PRDY1* |
| +Seek Garage | PLGARG1 | PLGARG1* |

*Indicates state where status is returned to Master.
+Indicates states entered as result of command from Master.

Figure 45:
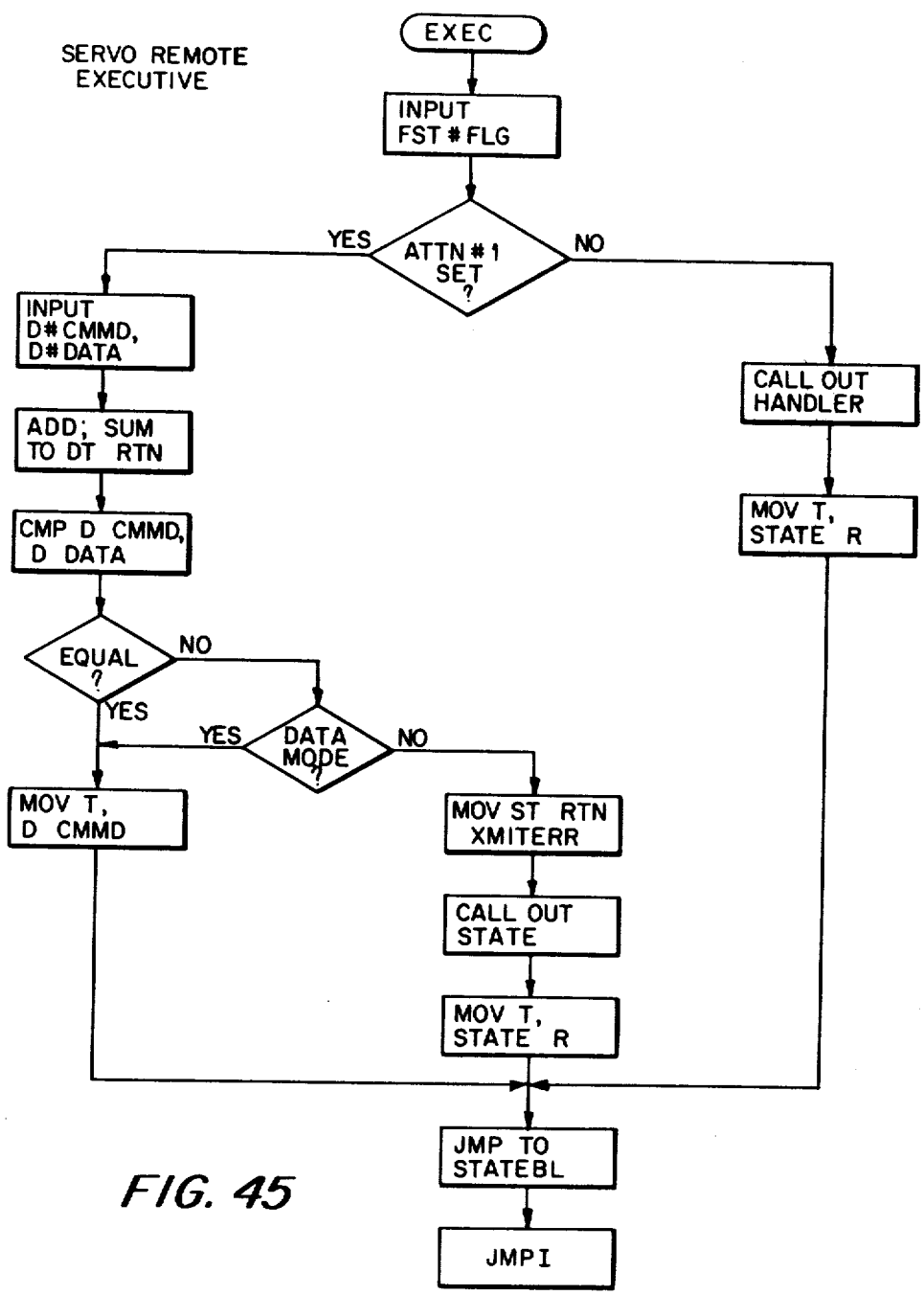
FIG. 45 is a flow chart showing the executive routine utilized in the servo area controller.

A flow charge of the executive program is shown in FIG. 45. The executive routine is entered and the FST#FLG byte is read. If the AM-ATTN#1 bit is set, the area microprocessor knows that there is input data sent from master. The command and data bytes are read and their sum is returned in the status return byte to the master. The command information from master is always sent twice, first in the command word and identically in the data word. The servo controller then compares these two bytes and if they are equal, it recognizes the byte as a command and jumps to the state table. At the same time, the servo controller goes into the data mode expecting data to be sent from the master during the next transmission. The next transmission will again set the attention flag and the data and command information will be compared but this time they will not be equal. If the previous command instruction placed the area microprocessor in the data mode, then the command is removed to the T register and a jump made to the state table. If the previous command did not place the area microprocessor in the data mode, then an error condition must exist and the error is transmitted as part of the return status word to the master. A jump is then made back to the state table and the master will repeat the data transmission. When the executive routine is entered and the attention flag is not set, output handlers are called to provide refresh output data. The next state is that which was set by the previous command instruction. A jump is made to the state table and then an indirect jump is made to the next state.

A detailed area microprocessor computer listing for the executive routine is given in the appendix. The instruction set utilized for the area microprocessor is given in the above-mentioned co-pending application of Merkle et al.

Figure 46:
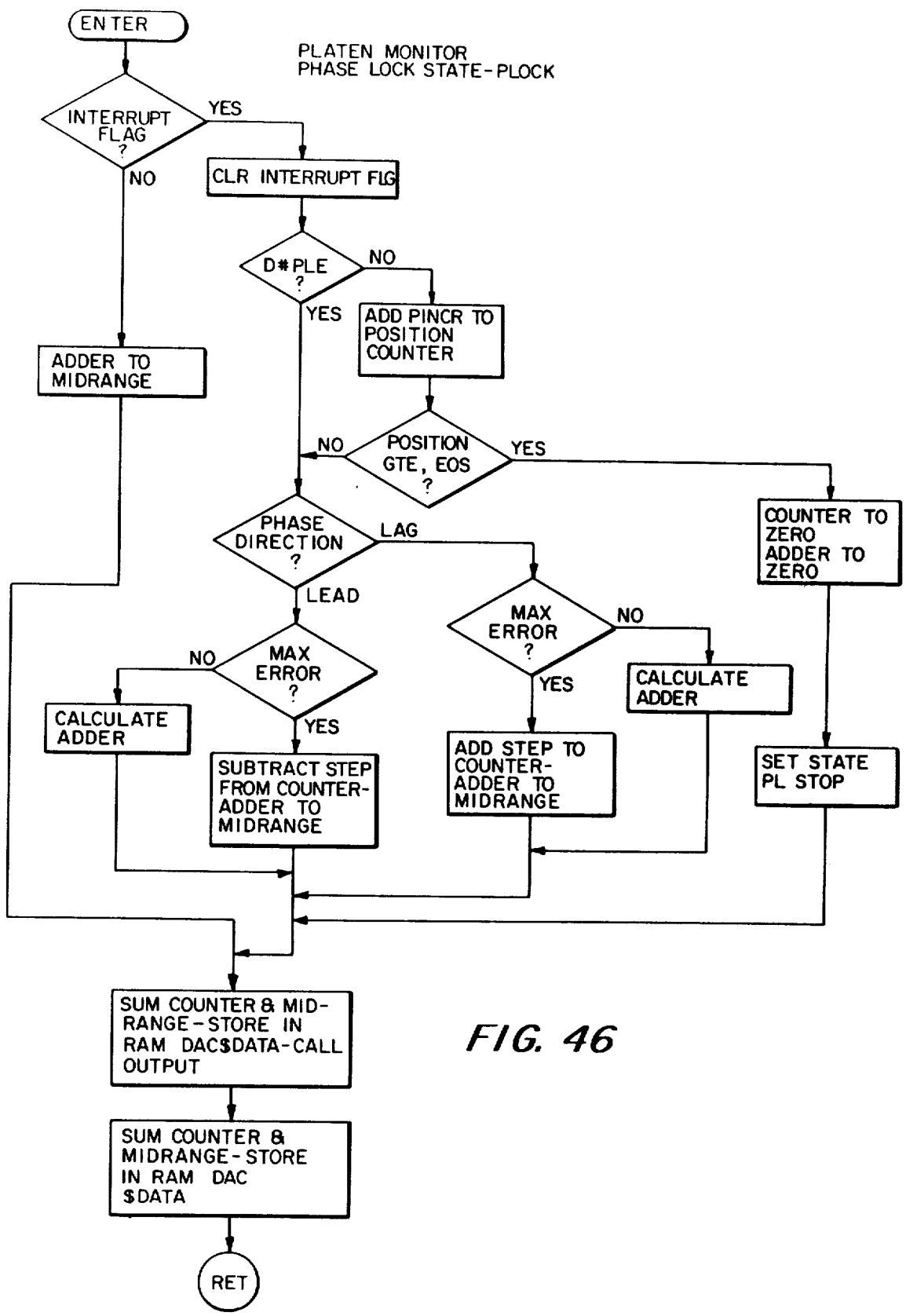
FIG. 46 is a flow chart showing the phase lock state utilized in the servo area controller.
Figure 47:
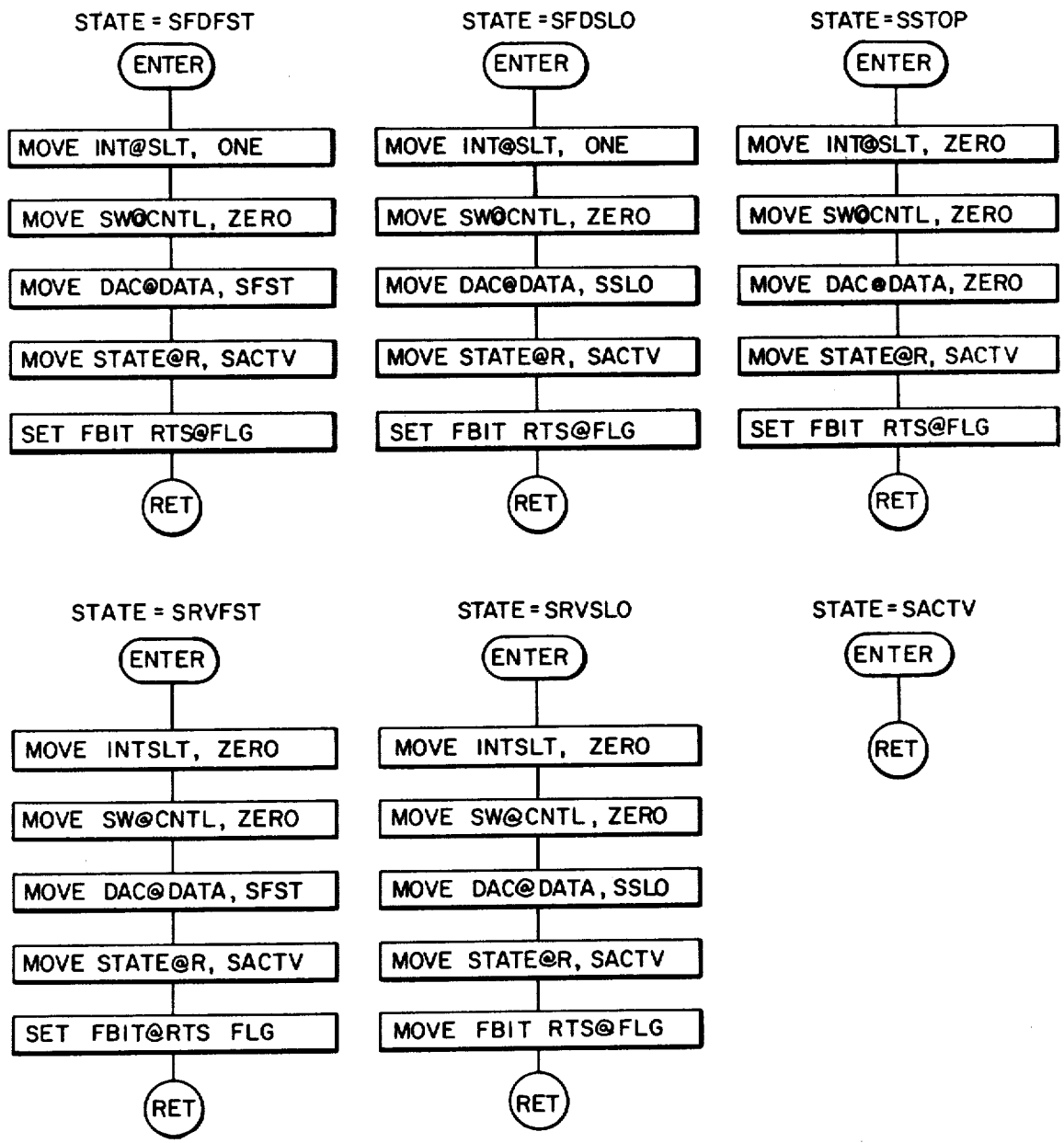
FIG. 47 is a flow chart showing the various scroll states applicable in the servo area controller.
Figure 48:
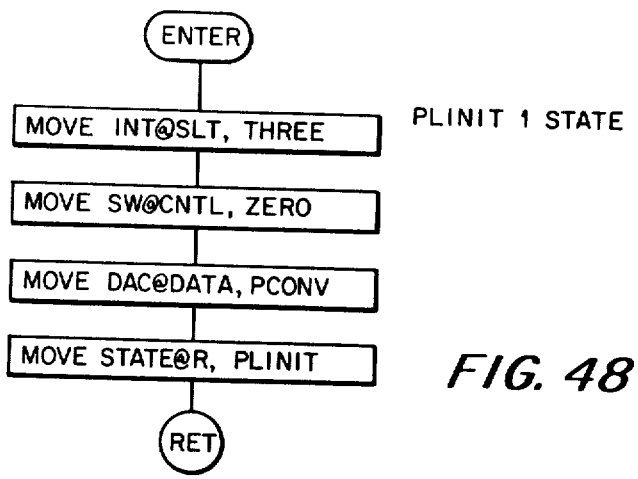
FIGS. 48-54 show various state flow charts for controlling the platen scanning lamp and carriage applicable in the servo area controller.
Figure 50:
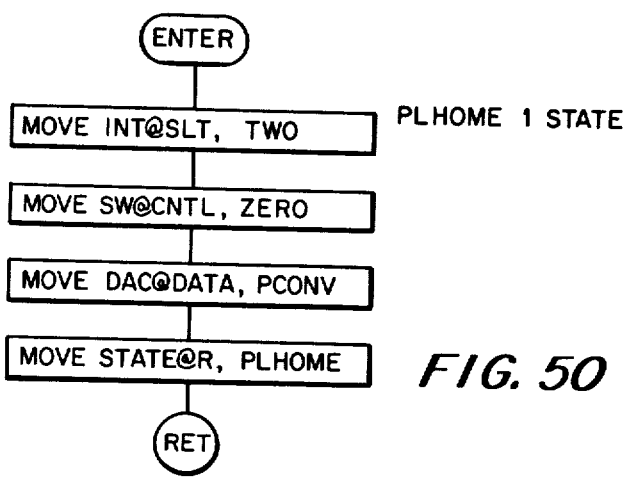
Figure 52:
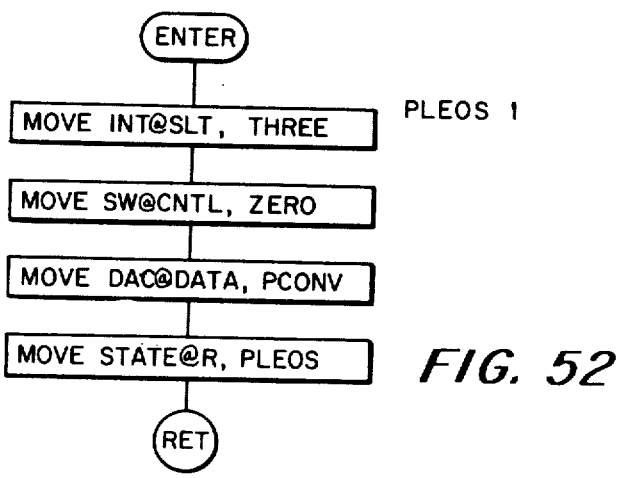
Figure 53:
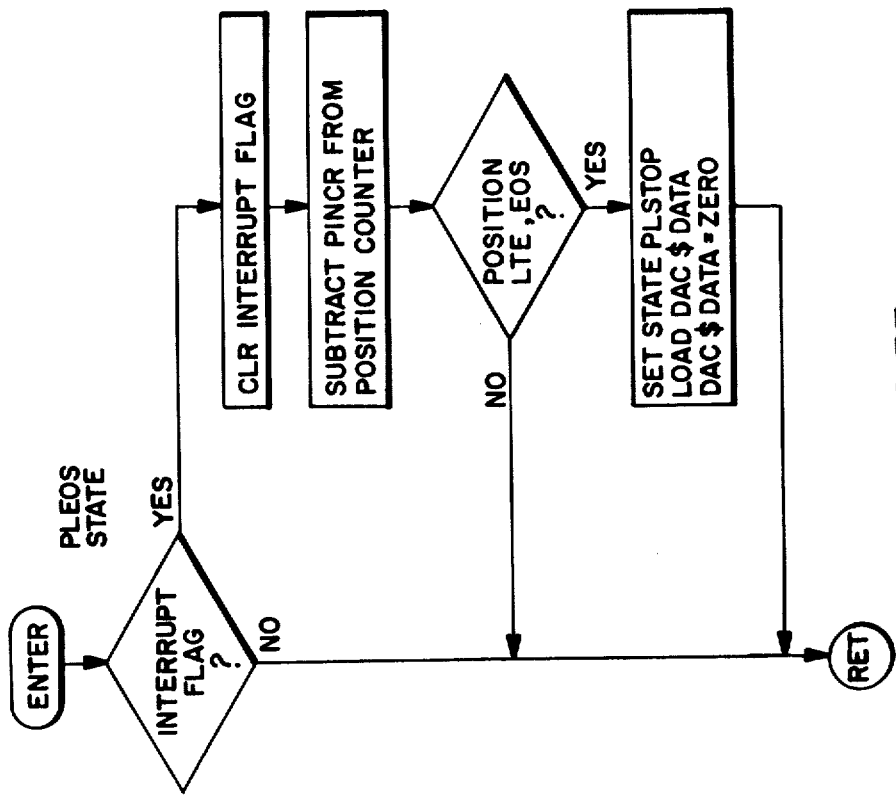
Figure 49:
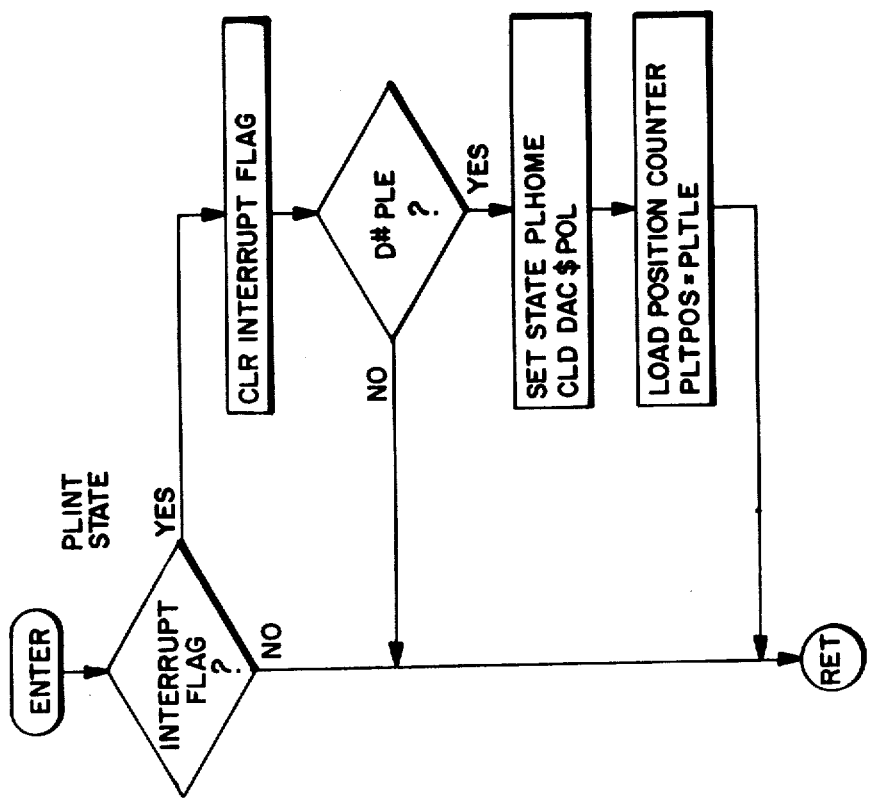
Figure 51:
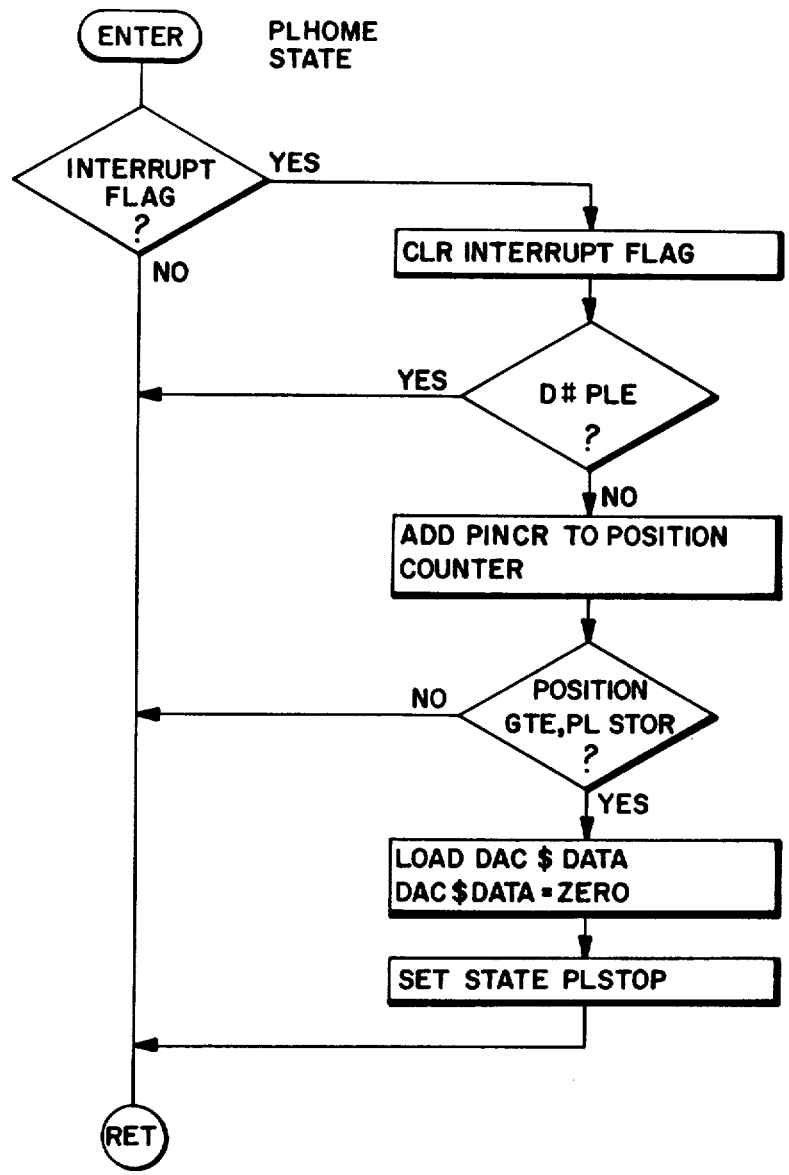
Figure 54:
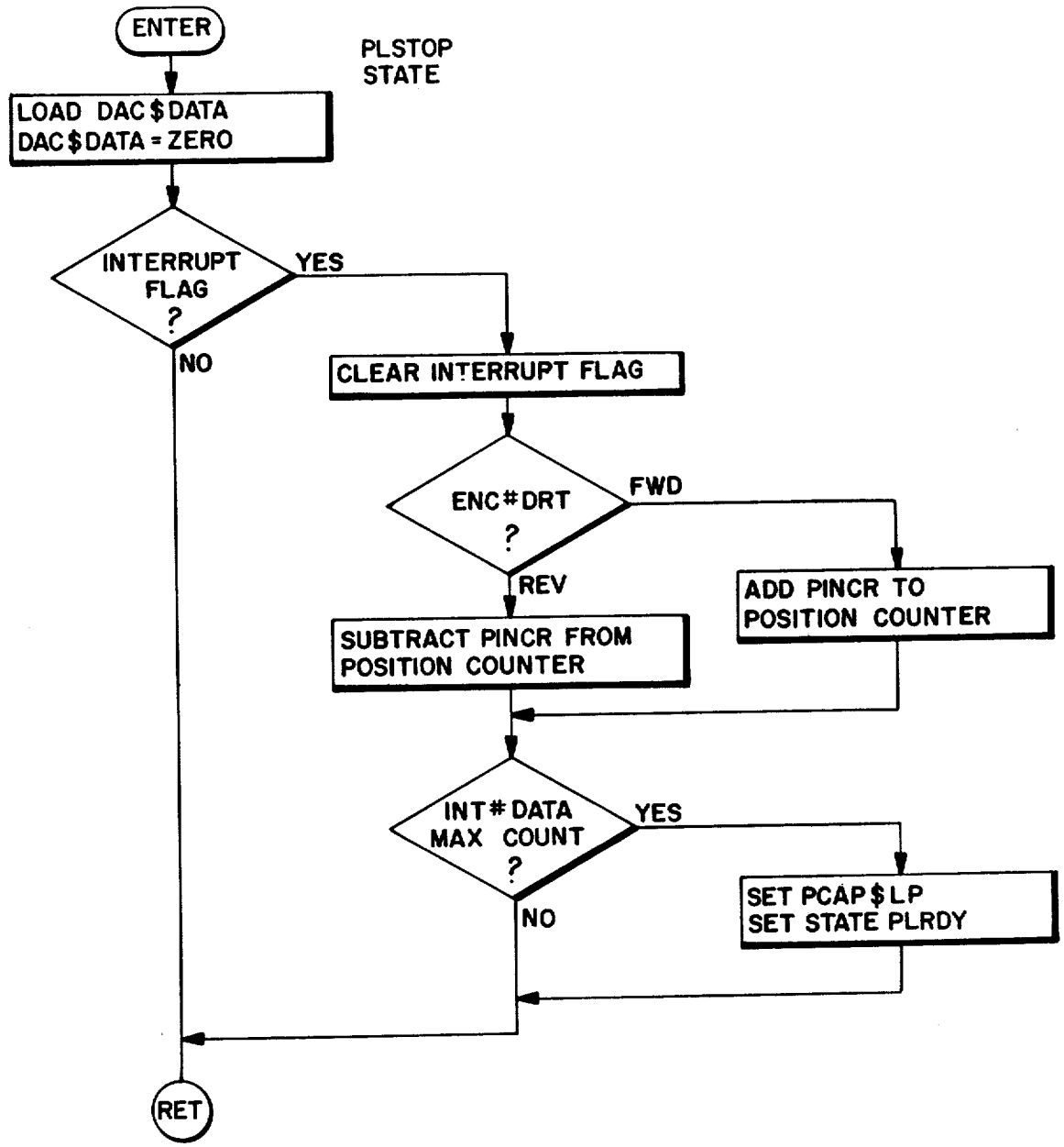

FIG. 46 illustrates a block diagram for the phase lock control. If the interrupt flag is set, then the interrupt is cleared and a check is made to see if the platen leading edge sensor is on or off. If the lamp is off a position increment is added to the position counter and a test is made to see if the new position is greater than or equal to the end of scan position. If the new position is greater or equal to the end of scan position, appropriate counters are zeroed and the next state is set to the stop state, PLSTOP, and a call is made to the output. If the lamp is not yet at the end of scan position, the direction of lamp movement is detected. If a lag condition exists indicating a phase lag between the reference and motor encoder signals the data byte from counter 5002 (FIG. 43) is read and compared to the maximum counter value of counter 5002 (256 or some other predetermined value). An appropriate increment or "step" may be added to the counter controlling reference voltages in the rate loop and additionally, a correction or "adder" value may be set to its mid-range figure. The adder value is simply a small correction to the counter which would be utilized if the error read from the interrupt data byte (counter 5002) is not greater than the maximum pre-determined value desired. The adder value is thus an amplitude modulation on the counter value permitting an instantaneous correction for phase lock variations. The counter value is operative to effect a more constant velocity change, namely, those changes which require a long term correction because of a relatively large phase error. The step size added to counter as well as the value added may, of course, be tailored to the specific servo motors selected, calculated velocity of scan and end scan position. A similar calculation for the adder and counter is provided if the phase direction leads instead of lags.

FIGS. 47 through 54 illustrate the state diagram flow charts for various other scroll and platen states utilized and under control of the servo area controller. Similar flow diagrams apply for the RDH servo and reduction optics control.

Process Controller 12

The area process controller 12 (PCR) is an active area controller and contains an area microprocessor 1600. The process controller cooperates with the master microprocessor in providing process control of various devices within the copier/duplicator. The process controller may be located in the power supply unit and is utilized for all A/D conversions, control of the developer unit (ADC control) electrometer, high voltage corotron outputs, lamp outputs and various developer outputs including the toner dispenser motor. The process controller also provides D/A conversions in order to generate the needed analog signals to control various voltages and currents. The PCR may be incorporated in a closed loop system. In particular, analog data is digitized and processed either in the PCR microprocessor or in the master microprocessor. The processed data is subsequently converted into analog form via the D/A converters in the PCR. The analog data is then applied to control the very devices which were sensed thus completing the closed loop control. Other devices may, of course, be operated in open loop control systems.

A detailed listing of the input and output signals, both analog and digital, is set forth in Table 11.

Figure 55:
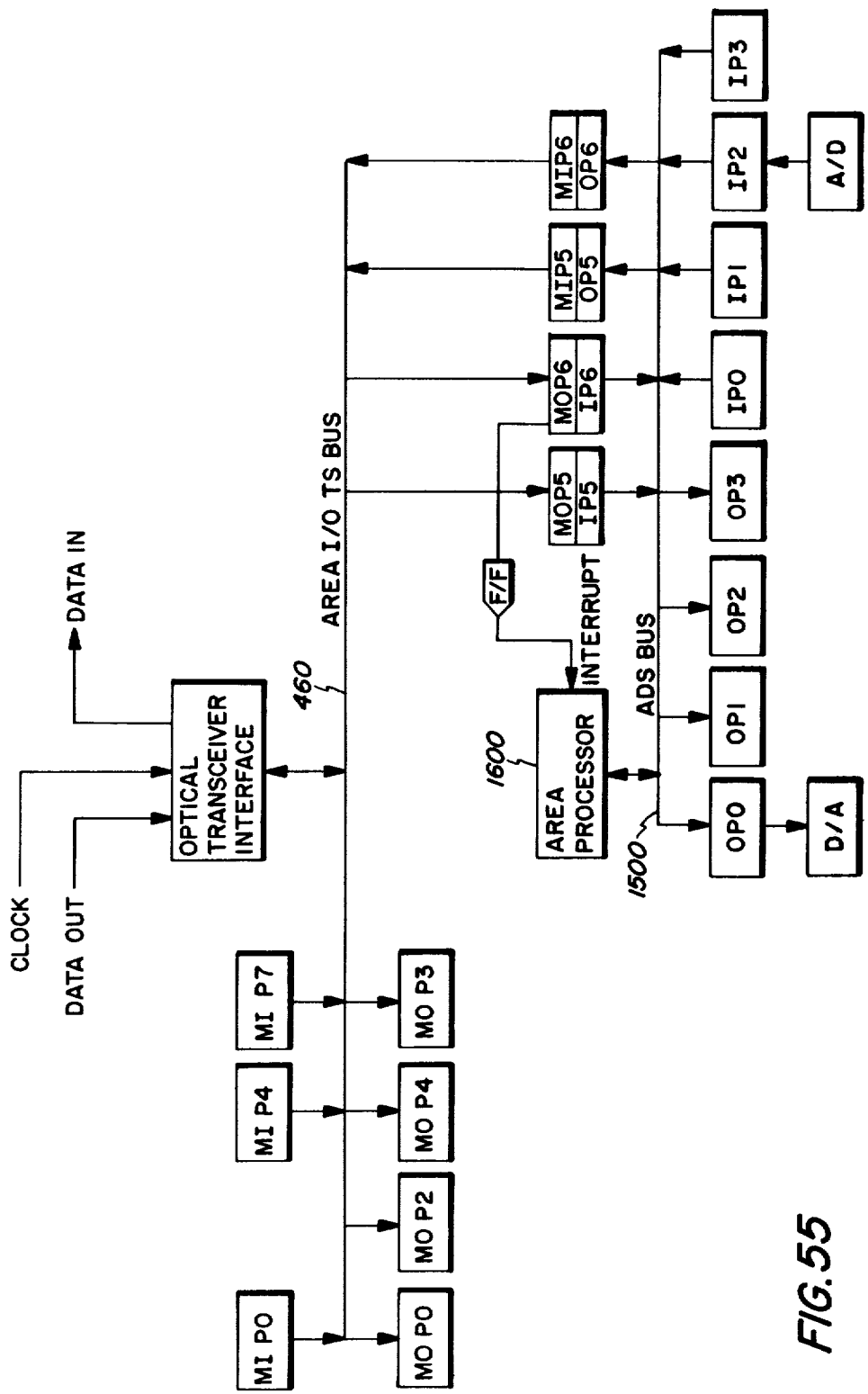
FIG. 55 is a block diagram showing the input and output port connections utilized in the process area controller.

FIG. 55 illustrates the process control area microprocessor 1600 and its interconnection to the various output and input ports. The various signals associated with each port may be found from Table 11. A letter "M" is utilized as a prefix to the OP or IP port designation to indicate a master input or output port. For example, the master output port 5, MOP5, is an input port 5, IP5, with respect to the area processor 1600.

Master/PCR Software Communication

Figure 56:
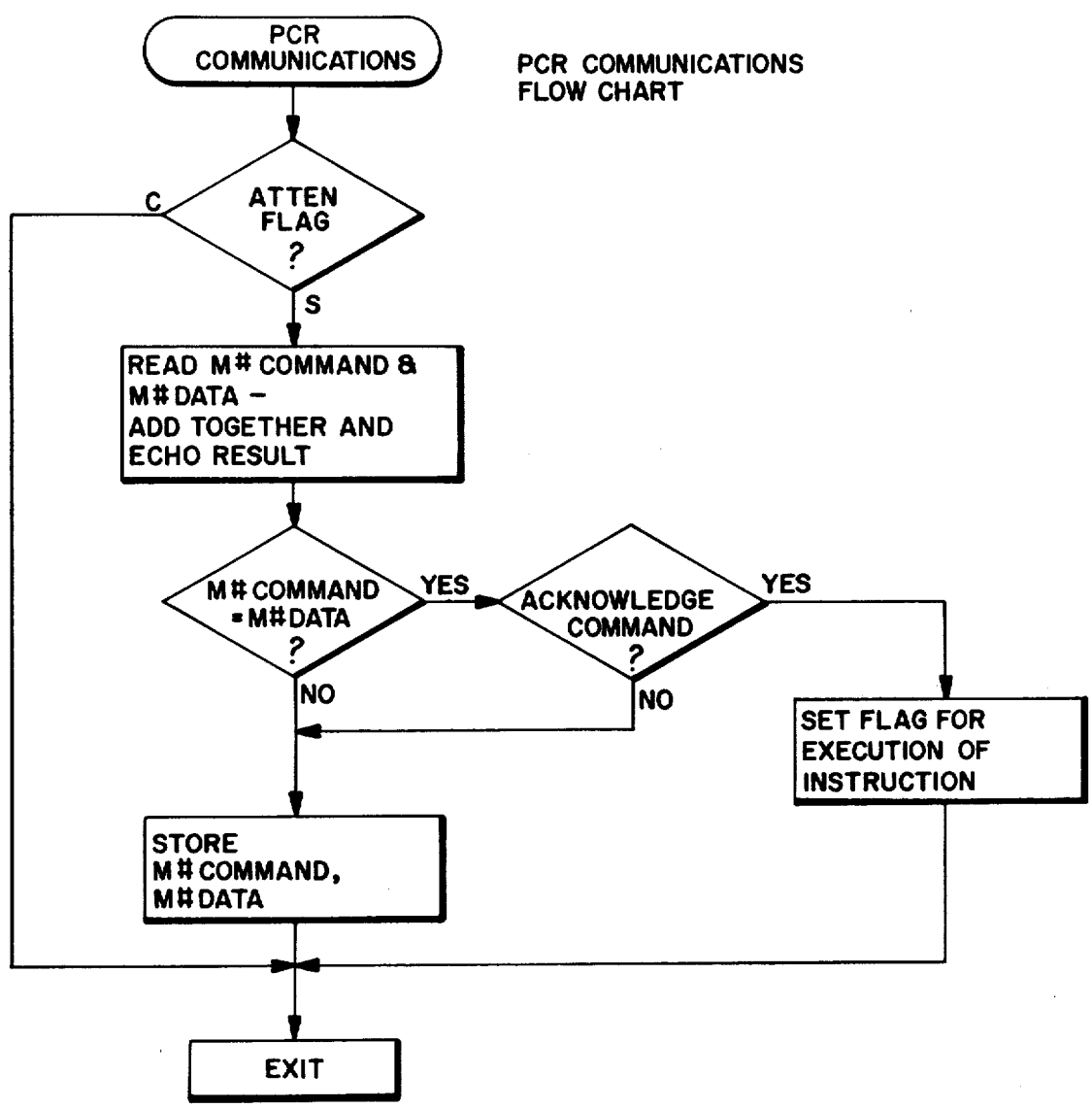
FIG. 56 is a flow chart showing the overall sequence governing the communications between the process controller and the master unit.

FIG. 56 shows a flow chart for the PCR communication with the master unit. The attention flag is set when the master loads information into the command and data ports. The PCR reads the data byte first and then reads the command byte following which the attention flip flop is reset. The command and data bytes are added together and echoed to the master for a communication error check. Upon receipt of an acknowledge command from the master, the instruction is executed by the PCR.

The various command operational codes and format data are shown listed in Table 12. The master may command the PCR to perform an A/D reading or to read and store a setpoint for the internal RAM of the area microprocessor. The digital value of the setpoint is converted into an analog signal to provide appropriate analog voltage or current control. The PCR periodically checks analog voltages or currents, compares their value to the setpoint value and provides new data for the output registers if required (with subsequent D/A conversion) to maintain the setpoint value. The PCR also provides digital output signals to turn on and off device power and voltages as per Table 12. The master also transmits acknowledge signals and "OK to send" signals to the PCR. The PCR may communicate to the master by providing three basic responses: the A/D reading response (the digital value of the analog signal requested), a fault code response (indicating which of a plurality of circuit boards has a fault therein), and the communications response (the echo sum of the data and command bytes).

When the master communicates to the PCR for a A/D reading, the master may designate which of three separate filter techniques should be employed. The PCR will then sample the analog values, convert them to digital form and provide the appropriate filtering requested. FIG. 57 illustrates the three types of filtering utilized in the PCR, namely, the pitch event filtering, the noisey signal filtering and the fast read and negative peak filtering. The pitch event filtering is essentially a sum of eight separate readings; the noisey signal filtering is essentially the sum of sixteen separate readings; and the fast reading or negative peak reading is a single analog reading. The master unit may also specify the range utilized in the A/D and D/A conversions. A 1X range corresponds to a 32 mv/bit conversion factor while a 10X range corresponds to a 3.2 mv/bit factor. The 1X range of course has a very large dynamic range (08 volts) as compared to the 10X dynamic range (0–0.8 volts).

TABLE 11

| Analog Input Signals | |
|---|---|
| Acronym | Description |
| CHG##CV | Charge Coronode Voltage |
| CD##CV | Combined Coronode Voltage |
| CHG##CI | Charge Coronode Current |
| CD##CI | Combined Coronode Current |
| CHG$$SV | Charge Shield Voltage |
| PTRA##SV | Pretransfer Shield Voltage |
| TRAN##SV | Transfer Shield Voltage |
| DETK##SV | Detack Shield Voltage |
| PCLG##SV | Preclean Shield Voltage |
| CHG##SI | Charge Shield Current |
| PTRA##SI | Pretransfer Shield Current |
| TRAN##SI | Transfer Shield Current |
| DETK##SI | Detack Shield Current |
| PCLG | Preclean Shield Current |
| +40##VDC | +40VDC |
| −40##VDC | −40VDC |
| +24##VDC | +24VDC |
| +24V##I | +24VDC Current |
| +12##VDC | +12VDC |
| −12##VDC | −12VDC |
| +5$$VDC | +5VDC |
| SLMP##I | Sodium Lamp Arc Current |
| DEV##BV | Developer Bias Voltage |
| DA#190 DIAG | D/A Diagnostic Test |
| AD##ST | +4VREF A/D Self Test |
| PLMP##TH | Platen Lamp Thermistor |
| MLMP##TH | MACAS Lamp Thermistor |
| FUS##TH | Fuser Thermistor |
| DHTR##I | Drum Htr. Current Monitor |
| L1−2##V | Line 1-2 Voltage Monitor |
| TON##AMP | Toner Power Amp Monitor |
| SER##AMP | Servo Power Amp Monitor |
| ELTR##V | Electrometer Voltage Sense |

TABLE 11-continued

| | | |
|---|---|---|
| | ADC##RD | ADC Sensor Reading |
| | MAIN##W | Main Tray Width Pot |
| | AUX##W | Aux Tray Width Pot |
| | DPX##W | Duplex Tray Width Pot |
| | TRIAC##I | AC Triac Load Current Monitor |
| | LINE 1##I | AC Relay Current Monitor |
| | ZERO##REF | A/D Zero Offset |
| | STCK##W | Stacker Output Tray Width Pot |
| | SERV##DA | Servo D/A Output Monitor |
| | AD##SP1 | Spare 1 |
| | AD##SP2 | Spare 2 |
| | AD##SP3 | Spare 3 |
| | AD##SP4 | Spare 4 |
| | AD##SP5 | Spare 5 |
| | AD##SP6 | Spare 6 |

Analog Output Signals

| Acronym | Description |
|---|---|
| CHG$$SV | Charge Shield Voltage |
| PTRA$$SV | Pretransfer Shield Voltage |
| TRAN$$SI | Transfer Shield Current |
| DETK$$SV | Detack Shield Voltage |
| PCLG$$SV | Preclean Shield Voltage |
| SLMP$$I | Sodium Lamp Arc Current |
| DEV$$BV | Developer Bias Voltage |
| CHG$$CI | Charge Coronode Current |
| CD$$CI | Combined Coronode Current |
| TON$$MOT | Toner Dispense Motor Control |
| MD$$SET | A/D Offset |
| DA$$SP1 | Spare 1 |
| DA$$SP2 | Spare 2 |
| DA$$SP3 | Spare 3 |

Master Digital Inputs

| Byte Name | Port | Acronym | Description |
|---|---|---|---|
| E#DATA | 5 | EDATA#D0-7 | Data Out to Master |
| E#COMAND | 6 | ECOMD#D0-7 | Command Out to Master |
| COM#TA | 0 | FUS#ITLK | Fuser Drawer Interlock |
| | | MIP#SP1 | Spare 1 |
| | | MIP#SP2 | Spare 2 |
| | | MIP#SP3 | Spare 3 |
| | | PLMP#HTR | Address Fault Turnaround MOP3-3 |
| | | TRANS#SH | Address Fault TA MOP2-2 |
| | | MOUT#TA | Master O.C. Turnaround |
| | | COMM#CHK | Communications Turnaround |
| FUS#DEV | 4 | PIRIS#OT | Platen Iris Overtravel Switch |
| | | FUS#PWR | Fuser Heater Power Monitor |
| | | OVER#TMP | Fuser Overtemperature Thermostat |
| | | PIRIS#UP | Address Fault TA MOP4-4 |
| | | MIRIS#OT | MACAS Iris Overtravel Switch |
| | | LOW#TON | Low Toner Sensor |
| | | TON#ITLK | Toner Bottle Interlock Switch |
| | | DEV#ITLK | Developer Interlock Switch |
| E#INT | 7 | EINT#TST | Address Fault TA MOP0-1 |
| | | E#INTBET | PC Response Pseudo-Interrupt |

Master Digital Outputs

| Byte Name | Port | Acronym | Description |
|---|---|---|---|
| M$DATA | 5 | MDATA$D7 | Master Data Out Communications |
| | | MDATA$D0-7 | Master Data Out to Process Controller (PC) |
| M$COMAND | 6 | MCOMD$D0-7 | Master Command Out to PC |
| XERO$PS | 2 | CO$CORON | Combined Coronodes Current On/Off |
| | | CHRG$COR | Charge Coronode Current On/Off |
| | | DEV$BIAS | Developer Bias Voltage On/Off |
| | | PRCLG$SH | Preclean Shield Voltage On/Off |
| | | DETAC$SH | Detack Shield Voltage On/Off |
| | | TRAN$$SH | Transfer Shield Voltage On/Off |
| | | PRTRA$SH | Pretransfer Shield Voltage On/Off |
| | | CHRG$SH | Charge Shield Voltage On/Off |
| LMP$FUS | 3 | INP$GND | Open Input Signals Ground |
| | | FUS$CTL | Fuser Temperature Control |
| | | FUS$ENG | Fuser Rolls Engage (24v 500MA) |
| | | DEV$CLUT | Developer Clutch (24v 400MA) |
| | | PLMP$HTR | Platen Lamp Heater |

TABLE 11-continued

| | | | |
|---|---|---|---|
| | | MLMP$HTR | MACAS Lamp Heater |
| | | LMP$SEL | MACAS/Platen Lamp Select |
| | | SCN$LMPS | Sodium Lamp On/Off |
| ELT$STAT | 4 | INP$PS | Open Input Signals Power Supply |
| | | MIRIS$UP | IRIS |
| | | MIRIS$DN | IRIS |
| | | PIPIS$UP | IRIS |
| | | PIRIS$DN | IRIS |
| | | TON$LED | Toner Bottle LED On/Off (100MA) |
| | | DRM$SOL | Drum Patch |
| | | ELT$SHLD | Electrometer Shield Solenoid |
| ELT$COMM | 0 | ELTR$ST | Electrometer Self Test |
| | | ELTR$RNG | Electrometer Range |
| | | ELT$ZERO | Electrometer Zero |
| | | MOUT$SP1 | Spare 1 |
| | | MOUT$SP2 | Spare 2 |
| | | MOUT$SP3 | Spare 3 |
| | | EINT$TST | Address Fault TA MIP7-6 & Spare O.C. Output |
| | | COMM$CHK | Communications Check Bit MIPO-0 |

PC Digital Inputs

| Byte Name | Port | Acronym | Description |
|---|---|---|---|
| DA#TA | 0 | DA#D0TA-DA#7TA | D/A0-7 Turnaround |
| ACQ#DIAG | 1 | EIN#SP1 | Spare 1 |
| | | AD#MUXTA | Diagnostic Multiplexor Select Turnaround |
| | | AD#NEOC | A/D End of Conversion (Active Low) |
| | | EOUT#TA | O.C. LCC Output Turnaround |
| | | DA#SW3TA | D/A Switch 10 Turnaround |
| | | DA#SW2TA | D/A Switch 9 Turnaround |
| | | DA#SW1TA | D/A Switch 8 Turnaround |
| | | DA#SW0TA | D/A Switch 7 Turnaround |
| AD#DATA | 2 | AD7#ST | A/D Bit 7 Or Start A/D Conversion Turnaround |
| | | AD6#RNG | A/D Bit 6 or A/D Range Turnaround |
| | | AD5#SW5 | A/D Bit 5 or A/D Mux Switch 6 Turnaround |
| | | AD4#SW4 | A/D Bit 4 or A/D Mux Switch 5 Turnaround |
| | | AD3#SW3 | A/D Bit 3 or A/D Mux Switch 3 Turnaround |
| | | AD2#SW2 | A/D Bit 2 or A/D Mux Switch 2 Turnaround |
| | | AD1#SW1 | A/D Bit 1 or A/D Mux Switch 1 Turnaround |
| | | AD0#SW0 | A/D Bit 0 or A/D Mux Switch 0 Turnaround |
| M#RSP | 3 | EIN#SP2 | Spare 2 |
| | | EIN#SP3 | Spare 3 |
| | | EIN#SP4 | Spare 4 |
| | | EIN#SP5 | Spare 5 |
| | | ADDR3#CK | Address Fault TA OP3-3 |
| | | EIN#SP6 | Spare 6 |
| | | M#RSP2 | Master Response 2 |
| | | M#RSP1 | Master Response 1 |
| M#DATA | 5 | MDATA#D0-7 | Master Data Out to PC |
| M#COMAND | 6 | MCOMD#D0-7 | Master Command Out to PC |

PC Digital Outputs

| Byte Name | Port | Acronym | Description |
|---|---|---|---|
| DA$SATA | 0 | DA$D0-7 | D/A Data 0-7 |
| DA$SWS | 1 | EOUT$SP1 | Spare 1 |
| | | AD$MUX | Diagnostic Multiplexor Select (0 A/D Readings) |
| | | EOUT$SP2 | Spare 2 |
| | | EOUT$SP3 | Spare 3 |
| DA$SW3 | 1 | DA#SW3 | D/A Mux Switch 10 |
| | | DA#SW2 | D/A Mux Switch 9 |
| | | DA#SW1 | D/A Mux Switch 8 |
| | | DA$SW0 | D/A Mux Switch 7 |
| AD$SWS | 2 | AD#SW0-5 | A/D Mux Switch 1-6 |
| ADC$WDT | 3 | EOUT$SP4 | Spare 4 |
| | | EOUT$SP5 | Spare 5 |
| | | ADC$LED2 | ADC LED 2 On/Off (400MA) |
| | | ADC$LED1 | ADC LED 1 On/Off (400MA) |
| | | ADDR3$CK | Address Fault TA IP3-3 |

TABLE 11-continued

|  |  | EOUT$SP6 | Spare 6 |
|---|---|---|---|
|  |  | LCC$WDT | LCC Watch Dog Timer |
|  |  | EOUT$SP7 | Spare 7 |
| E$DATA | 5 | EDATA$D0-7 | PC Data Out to Master |
| E$COMAND | 6 | ECOMD$D0-7 | PC Command Out to Master |

TABLE 12

PROCESS CONTROL REMOTE (PCR)/MASTER COMMUNICATION FORMAT

| Master to PCR | - | A/D Reading Command |
|---|---|---|
| Command Byte | - | M$COMAND |
| D7 = 0 | | |
| D6 = 0 | | Command Code |
| D5 = 0 | | |
| D4 | | Spare |
| D3 = 1 | | A/D Neg. Peak Detect |
| D2 = 1 | | ADC Read No LED Current |
| D1 = 1 | | Fast READ |
| D0 = 1 | | PITCH Event |
| Data Byte | - | M$DATA |
| D7 | | Spare |
| D6 | | Range (0 = 1X; 1 = 10X) |
| D5-D0 | | Analog MUX Change Number |
| Master to PCR | - | D/A Setpoint Command |
| Command Byte | - | M$COMAND |
| D7 = 0 | | |
| D6 = 1 | | Command Code |
| D5 = 0 | | |
| D4-D0 | | D/A MUX Switch Number |
| Data Byte | - | M$DATA |
| D7-D0 | | D/A RAM Setpoint Data |
| PCR to Master | - | A/D Reading Command |
| Command Byte | - | E$COMAND |
| D7 = 0 | | |
|  | | Command Code |
| D6 = 0 | | |
| D5-D0 | | A/D Switch Number |
| Data Byte | - | E$DATA |
| D7-D0 | | Encoded A/D Value |
| PCR to Master | - | Fault Code Number |
| Command Byte | - | E$COMAND |
| D7 = 1 | | |
|  | | Command Code |
| D6 = 0 | | |
| D5 = 1 | | Signal Too Noisy |
| D4-D0 | | Spare |
| Data Byte | - | E$DATA |
| D7-D0 | | Fault Code Number |
| PCR to Master | - | Communications Response Command |
| Command Byte | - | E$COMAND |
| D7 = 1 | | |
|  | | Command Code |
| D6 = 1 | | |
| D5-D4 | | Spare |
| Data Byte | - | E$DATA |
| D7-D0 | | Communications Echo-Sum of M$COMAND and M$DATA |

PCR Software

A computer listing for the various routines utilized by the PCR are given in the appendix. It is the function of the PCR microprocessor to control all of the A/D conversions and D/A conversions for communications with the master and host machine. Additionally, the PCR reads analog values, converts them into digital form, and compares them with setpoint values given by master.

Figure 58:
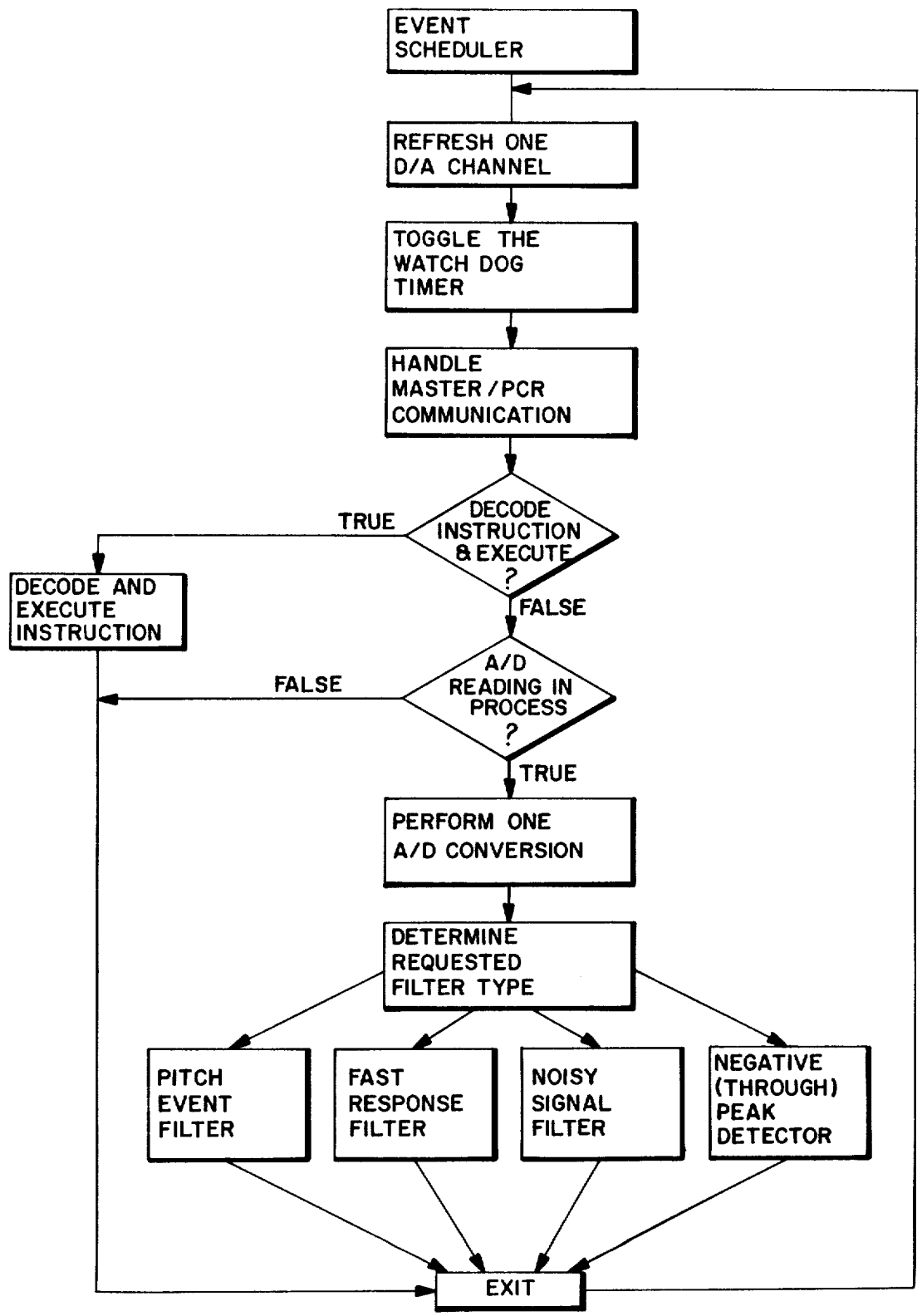
FIGS. 58 and 59 are flow charts showing the key operational steps utilized in operating the process controller.

An event scheduler for the overall operating program of the PCR is shown in FIG. 58. The routine is executed every 1 ms. Consequently, if there are 13 analog outputs then each analog output will be refreshed every 13 milliseconds. After refresh, a watch dog timer is toggled to send a bit to master used for communication checking purposes. A communication handshaking is then implemented between the master and PCR to obtain the command and data bytes from the master unit. If the command instruction is newly received, a branch is made to a decode and execute routine and the program exits. If the instruction has already been received and A/D conversion is performed and the appropriate filter mode requested is implemented as per FIG. 57.

Figure 59:
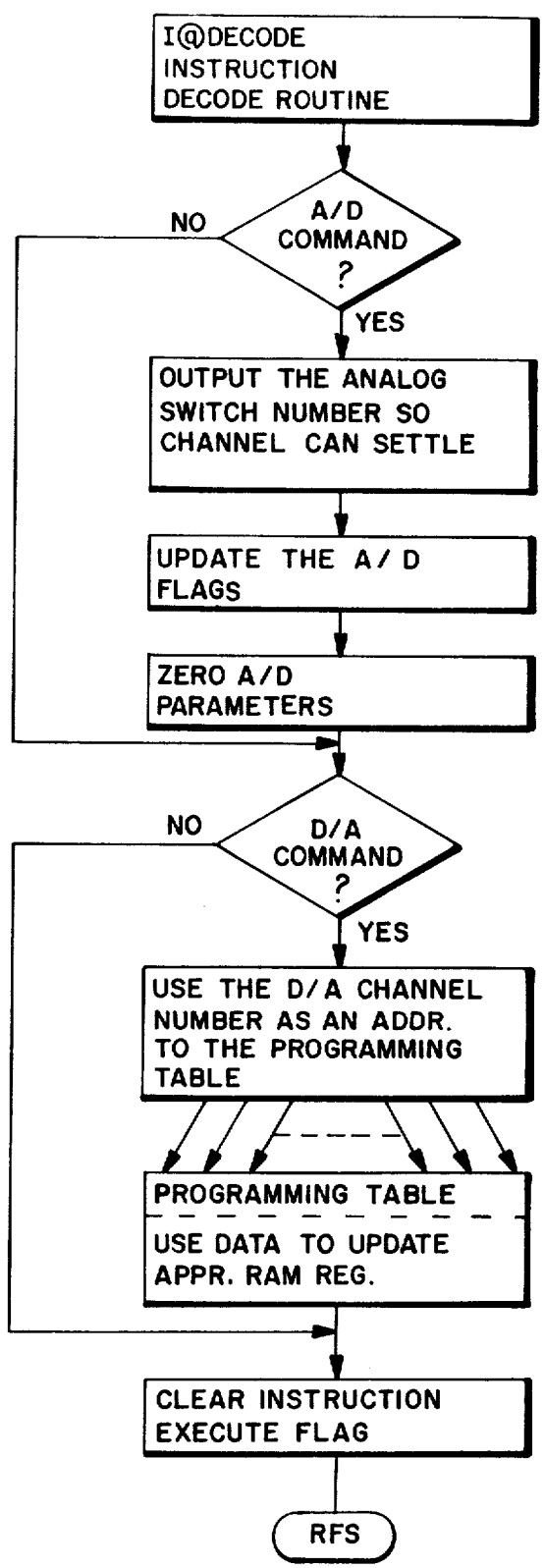

The decode and instruction execute routine is illustrated in FIG. 59 for both a A/D and D/A command byte. A detailed listing of the decode and instruction execute routine as well as the other routines shown in FIG. 58 are given in the appendix. In these listings, the area microprocessor is referred to by the nemonic LCC. The computer listings are heavily annotated to fully explain the detailed computer steps utilized in implementing the details of the PCR functions.

It will be appreciated by those skilled in the art that various modifications and improvements may be made to the detailed embodiment set forth herein without departing from the spirit and intent of the invention as defined in the appended claims. It may additionally be appreciated that numerous features of the disclosed invention have applicability outside of the photocopy machine environment as for example the utilization of the pseudo-interrupt scheme in general for data communications or in controlling machines other than a reproduction machine. It is additionally clear that the pseudo-interrupt scheme set forth herein is not necessarily tied to a distributive processor system wherein active remote controllers are employed, but may find applicability in systems wherein only passive (not programmable) controllers are utilized.

What is claimed is:

1. For use in a reproducing machine having a plurality of devices for controlling said machine, a data communications system comprising:
   a. a programmable master controller including:
      1. master program memory storage means for storing program words defining an operating program,
      2. addressing means for addressing said program words of said master program memory storage means,
      3. an arithmetic and logic unit for processing said program words of said master program memory storage means, and
      4. means for generating command bytes, said generating means operatively connected to said arithmetic and logic unit of said master controller, and
   b. a plurality of additional controllers, each of said additional controllers including:
      1. means for receiving command bytes from said master controller generating means, and
      2. means for providing input data bytes indicative of the operation of at least some of said devices to said master controller arithmetic and logic unit, c. said additional controllers having selected input data bits ORed together to provide at least one of said input data bytes, and d. said additional controllers simultaneously transmitting said selected input bits comprising said one input data byte to said master controller arithmetic and logic unit in response to a predetermined command byte from said master controller generating means.

2. A data communications system as recited in claim 1, wherein said master controller further includes output data byte generating means, said output data byte generating means operatively connected to said arithmetic and logic unit of said master controller, and means for transmitting output data bytes from said output data byte generating means to said additional controllers for controlling said machine.

3. A data communications system as recited in claim 1 wherein said master controller further includes means for generating identifying addresses for said additional controllers and means for transmitting said identifying addresses to said additional controllers, each of said additional controllers including decode logic means for decoding said addresses.

4. A data communications system as recited in claim 1 wherein at least one of said additional controllers is a programmable controller.

5. A data communications system as recited in claim 1 wherein said simultaneously transmitted data bytes provide an address for addressing a predetermined subroutine in said memory storage means.

6. A data communications system as recited in claim 1 including means for transmitting said input data bytes from said additional controllers in bit serial form to said master controller arithmetic and logic unit.

* * * * *